US010824607B2

(12) United States Patent
Xia et al.

(10) Patent No.: US 10,824,607 B2
(45) Date of Patent: Nov. 3, 2020

(54) TOPOLOGICAL DATA ANALYSIS OF DATA FROM A FACT TABLE AND RELATED DIMENSION TABLES

(71) Applicant: Ayasdi AI LLC, Menlo Park, CA (US)

(72) Inventors: Huang Xia, Sunnyvale, CA (US); Ronaldo Ama, Palo Alto, CA (US)

(73) Assignee: Ayasdi AI LLC, Menlo Park, CA (US)

( * ) Notice: Subject to any disclaimer, the term of this patent is extended or adjusted under 35 U.S.C. 154(b) by 99 days.

(21) Appl. No.: 15/657,061

(22) Filed: Jul. 21, 2017

(65) Prior Publication Data

US 2018/0025035 A1     Jan. 25, 2018

Related U.S. Application Data

(60) Provisional application No. 62/365,280, filed on Jul. 21, 2016.

(51) Int. Cl.
*G06F 16/22*    (2019.01)
*G06F 16/901*    (2019.01)
*G06F 16/28*    (2019.01)

(52) U.S. Cl.
CPC ...... *G06F 16/2219* (2019.01); *G06F 16/2282* (2019.01); *G06F 16/287* (2019.01); *G06F 16/9024* (2019.01)

(58) Field of Classification Search
CPC combination set(s) only.
See application file for complete search history.

(56) References Cited

U.S. PATENT DOCUMENTS

| 6,533,724 | B2 * | 3/2003 | McNair | G06F 19/3431 128/898 |
| 7,120,485 | B2 * | 10/2006 | Glass | A61B 5/02405 600/515 |
| 8,095,498 | B2 * | 1/2012 | Rollins | G06Q 10/10 707/600 |
| 8,571,909 | B2 * | 10/2013 | Miller | G06Q 10/00 705/7.11 |
| 8,787,962 | B2 * | 7/2014 | Kundargi | H04W 52/343 455/127.1 |

(Continued)

OTHER PUBLICATIONS

International Application No. PCT/US2017/043409, International Search Report and Written Opinion dated Oct. 25, 2017.
U.S. Appl. No. 62/365,362, filed Jul. 21, 2016.

*Primary Examiner* — Miranda Le
(74) *Attorney, Agent, or Firm* — Ahmann Kloke LLP

(57) ABSTRACT

A method comprises receiving a selection of data from a fact table and one or more dimension tables stored in a data warehouse, mapping data points from the selection of the data from the fact table and the one or more dimension tables to a reference space utilizing a lens function, generating a cover of the reference space using a resolution function, clustering the data points mapped to the reference space using the cover and a metric function to determine each node of a plurality of nodes of a graph, each node including at least one data point, determining a plurality of segments of the graph, each segment including at least one node, and generating a segment data structure identifying each segment as well as membership of each segment, the membership of each segment including at least one node from the plurality of nodes in the graph.

19 Claims, 40 Drawing Sheets

(56) References Cited

U.S. PATENT DOCUMENTS

| | | | |
|---|---|---|---|
| 8,972,406 B2* | 3/2015 | Friedlander | G06F 16/951 |
| | | | 707/737 |
| 9,262,514 B2* | 2/2016 | Eckardt, III | G06F 16/3323 |
| 9,557,438 B2* | 1/2017 | Wessling | G01V 11/002 |
| 2004/0183800 A1* | 9/2004 | Peterson | G06T 11/206 |
| | | | 345/440 |
| 2006/0085437 A1* | 4/2006 | Brodhun | G06F 16/288 |
| 2007/0299691 A1* | 12/2007 | Friedlander | G06Q 50/22 |
| | | | 705/2 |
| 2010/0274785 A1 | 10/2010 | Procopiuc | |
| 2011/0268364 A1 | 11/2011 | Hido | |
| 2014/0214495 A1* | 7/2014 | Kutty | G06Q 10/0637 |
| | | | 705/7.36 |
| 2015/0100605 A1 | 4/2015 | Golden | |
| 2016/0012149 A1 | 1/2016 | Muchinsky | |
| 2016/0055261 A1 | 2/2016 | Reinhardt | |
| 2016/0131569 A1* | 5/2016 | Mai | G01N 15/1475 |
| | | | 382/128 |
| 2016/0196518 A1* | 7/2016 | Zabawa | G06F 16/13 |
| | | | 705/7.36 |
| 2016/0246871 A1 | 8/2016 | Singh | |
| 2016/0350389 A1 | 12/2016 | Kloke | |

* cited by examiner

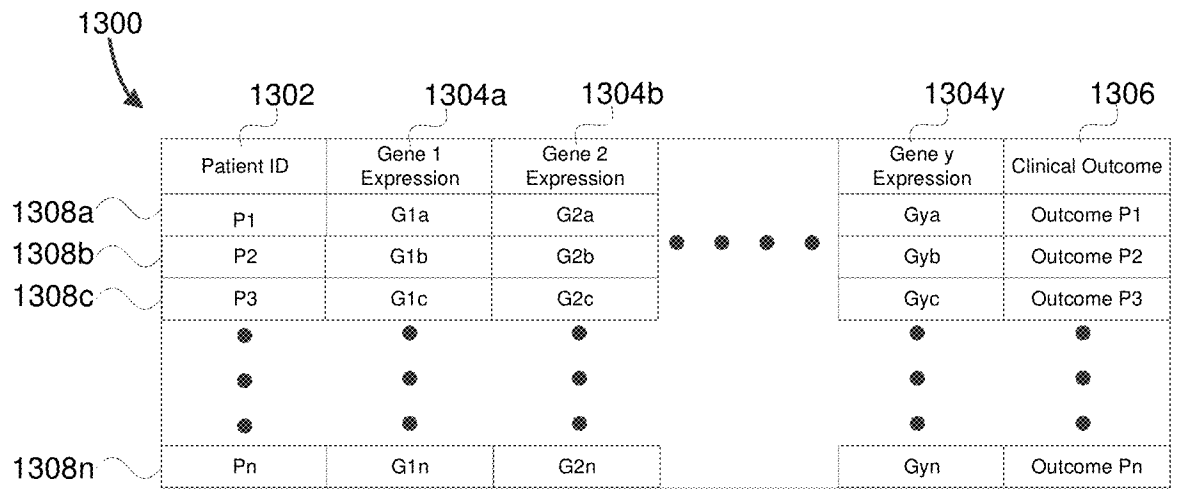

| Patient ID | Gene 1 Expression | Gene 2 Expression | ... | Gene y Expression | Clinical Outcome |
|---|---|---|---|---|---|
| P1 | G1a | G2a | ... | Gya | Outcome P1 |
| P2 | G1b | G2b | ... | Gyb | Outcome P2 |
| P3 | G1c | G2c | ... | Gyc | Outcome P3 |
| ⋮ | ⋮ | ⋮ | | ⋮ | ⋮ |
| Pn | G1n | G2n | ... | Gyn | Outcome Pn |

FIG. 13

Patients 2018

| Patient ID 2110 | Address 2112 | Demo. ID 2114 | Past Diagnosis 2116 |
|---|---|---|---|
| 1 | XXX | A, C, D | A, Z |
| 9 | YYY | B, D | D |
| 27 | ZZZ | Q | E |
| ••• | ••• | ••• | ••• |

Medicine 2026

| Medicine ID 2102 | Interaction A 2104 | Interaction B 2106 | Cost/Dose 2108 |
|---|---|---|---|
| 1121 | A:B | B:DD | $232 |
| 1122 | B:A | B:DA | $8.32 |
| 1123 | B:ZZ:A | C:BDZ | $213 |
| ••• | ••• | ••• | ••• |

Hospital 2022

| Hospital ID 2118 | Rating 2120 | Size 2122 |
|---|---|---|
| 83 | AAAA | >300 |
| 97 | AA | 100<X<300 |
| 113 | B | <80 |
| ••• | ••• | ••• |

FIG. 21

| 2710 Node_Color | |
|---|---|
| N1 | C1 |
| N2 | C1 |
| N3 | C2 |
| ••• | |

| 2708 Nodes_Segments | |
|---|---|
| N1 | S1 |
| N2 | S1 |
| N3 | S3 |
| ••• | |

| 2706 Edges | | |
|---|---|---|
| N1 | N2 | |
| N1 | N8 | |
| N10 | N15 | |
| ••• | | |

| 2704 Points_Nodes | |
|---|---|
| 1 | N1 |
| 1 | N8 |
| 2 | N389 |
| ••• | |

| 2702 Data Points | |
|---|---|
| 1 | A |
| 2 | B |
| 3 | C |
| ••• | |

FIG. 27

| Feature Table 2900 | | | |
|---|---|---|---|
| Segment ID 2902 | Tested Feature 2904 | KS Value 2906 | p Value 2908 |
| S1 | Medicine Ma | 0.8201 | 0.05 |
| S1 | Medicine Mxy | 0.2 | 0.03 |
| S1 | Hospital ID | ... | ... |
| S2 | Medicine Ma | ... | ... |
| S2 | Medicine Mxy | ... | ... |

TOPOLOGICAL DATA ANALYSIS OF DATA FROM A FACT TABLE AND RELATED DIMENSION TABLES

CROSS-REFERENCE TO RELATED APPLICATIONS

This application claims priority to U.S. Patent Application Ser. No. 62/365,280, filed Jul. 21, 2016 and entitled "Integrate TDA with Enterprise Data Warehouse to Enable Advance Machine Learning," which is hereby incorporated herein by reference.

BACKGROUND

1. Field of the Invention(s)

Embodiments discussed herein are directed to topological data analysis of data from fact tables and related dimension tables, and more particularly topological data analysis of data from a data warehouse.

2. Related Art

As the collection and storage of data has increased, there is an increased need to analyze and make sense of large amounts of data. Examples of large datasets may be found in financial services companies, oil exploration, insurance, health care, biotech, and academia. Unfortunately, previous methods of analysis of large multidimensional datasets tend to be insufficient (if possible at all) to identify important relationships and may be computationally inefficient.

In order to process large datasets, some previous methods of analysis use clustering. Clustering often breaks important relationships and is often too blunt an instrument to assist in the identification of important relationships in the data. Similarly, previous methods of linear regression, projection pursuit, principal component analysis, and multidimensional scaling often do not reveal important relationships. Further, existing linear algebraic and analytic methods are too sensitive to large scale distances and, as a result, lose detail.

Even if the data is analyzed, sophisticated experts are often necessary to interpret and understand the output of previous methods. Although some previous methods allow graphs that depict some relationships in the data, the graphs are not interactive and require considerable time for a team of such experts to understand the relationships. Further, the output of previous methods does not allow for exploratory data analysis where the analysis can be quickly modified to discover new relationships. Rather, previous methods require the formulation of a hypothesis before testing.

SUMMARY OF THE INVENTION(S)

An example method comprises receiving a selection of data from a fact table and one or more dimension tables related to the fact table, the data including a plurality of values from a plurality of dimensions from the fact table and the one or more dimension tables, the fact table and the one or more dimension tables being stored in a data warehouse, receiving a lens function identifier, a metric function identifier, and a resolution function identifier, mapping data points from the selection of the data from the fact table and the one or more dimension tables to a reference space utilizing a lens function identified by the lens function identifier, generating a cover of the reference space using a resolution function identified by the resolution identifier, clustering the data points mapped to the reference space using the cover and a metric function identified by the metric function identifier to determine each node of a plurality of nodes of a graph, each node including at least one data point, determining a plurality of segments of the graph, each segment including at least one node of the plurality of nodes, and generating a segment data structure identifying each segment as well as membership of each segment, the membership of each segment including at least one node from the plurality of nodes in the graph.

In some embodiments, the fact table and the one or more dimension tables are in a star schema. In various embodiments, the fact table and the one or more dimension tables are in a snowflake schema. Each node of the plurality of nodes may belong to only one segment of the plurality of segments (each of the plurality of segments containing one or more nodes that are not shared with other segments of the plurality of segments). The segment table may be provided to the data warehouse to be linked to at least one of the plurality of one or more dimension tables to enable further analysis of the fact table and the one or more dimension tables with the segment data structure.

In some embodiments, the method further comprises receiving a selection of dimensions to enable identification of significant dimensions relevant to one or more of the plurality of segments, for each segment, scoring significance for each dimension of the selection of the dimensions to a particular segment, comparing the scored significance to a significance threshold, identifying dimensions with particular significance based on the comparison, and generating a feature data structure including the identified dimensions with particular significance. Scoring significance for each of the dimensions of the selection of the dimensions and comparing the scored significance to the significance threshold may comprise generating a p-value for each of the dimensions of the selection of the dimensions and comparing each p-value to a p-value threshold to determine significance. Scoring significance for each of the dimensions of the selection of the dimensions and comparing the scored significance to the significance threshold may comprise generating a Kolmogorov-Smirnov value for each of the dimensions of the selection of the dimensions and comparing each Kolmogorov-Smirnov to a Kolmogorov-Smirnov value threshold to determine significance. The method may further comprise providing the feature data structure to the data warehouse to be linked to at least one of the plurality of one or more dimension tables to enable further analysis of the fact table and the one or more dimension tables with the feature data structure.

In various embodiments, the method further comprises receiving a selection of values from one or more dimensions to enable identification of significant values relevant to one or more of the plurality of segments, for each segment, scoring significance for each value from one or more dimensions of the selection of the values to a particular segment, comparing the scored significance to a significance threshold, identifying values with particular significance based on the comparison, and generating a feature data structure including the identified values with particular significance. The selection of values from the one or more dimensions may include, for example, different particular outcomes.

An example non-transitory computer readable medium may comprise instructions executable by a processor to perform a method. The method may comprise receiving a selection of data from a fact table and one or more dimension tables related to the fact table, the data including a plurality of values from a plurality of dimensions from the fact table and the one or more dimension tables, the fact table and the one or more dimension tables being stored in a data warehouse, receiving a lens function identifier, a metric function identifier, and a resolution function identifier, mapping data points from the selection of the data from the fact table and the one or more dimension tables to a reference space utilizing a lens function identified by the lens function identifier, generating a cover of the reference space using a resolution function identified by the resolution identifier, clustering the data points mapped to the reference space using the cover and a metric function identified by the metric function identifier to determine each node of a plurality of nodes of a graph, each node including at least one data point, determining a plurality of segments of the graph, each segment including at least one node of the plurality of nodes, and generating a segment data structure identifying each segment as well as membership of each segment, the membership of each segment including at least one node from the plurality of nodes in the graph.

An example system may comprise one or more processors and memory. The memory may contain instructions executable by at least one of the one or more processors to receive a selection of data from a fact table and one or more dimension tables related to the fact table, the data including a plurality of values from a plurality of dimensions from the fact table and the one or more dimension tables, the fact table and the one or more dimension tables being stored in a data warehouse, receive a lens function identifier, a metric function identifier, and a resolution function identifier, map data points from the selection of the data from the fact table and the one or more dimension tables to a reference space utilizing a lens function identified by the lens function identifier, generate a cover of the reference space using a resolution function identified by the resolution identifier, cluster the data points mapped to the reference space using the cover and a metric function identified by the metric function identifier to determine each node of a plurality of nodes of a graph, each node including at least one data point, determine a plurality of segments of the graph, each segment including at least one node of the plurality of nodes, and generate a segment data structure identifying each segment as well as membership of each segment, the membership of each segment including at least one node from the plurality of nodes in the graph.

An example method comprises receiving a data set from any number of data sources, receiving a lens function identifier, a metric function identifier, and a resolution function identifier, mapping data points from the data a reference space utilizing a lens function identified by the lens function identifier, generating a cover of the reference space using a resolution function identified by the resolution identifier, clustering the data points mapped to the reference space using the cover and a metric function identified by the metric function identifier to determine each node of a plurality of nodes of a graph, each node including at least one data point, generating a graph including the plurality of nodes, the graph including an edge between every two nodes that share at least one data point as a member, and generating a first data structure and a second data structure, the first data structure identifying membership of each node of the plurality of nodes, the membership including one or more of the data points, the second data structure identifying each edge between two nodes of the plurality of nodes, the second data structure further identifying the nodes of the plurality of nodes that are connected by each edge, the first and second data structure being capable of being queryable using a query language. The method may further comprise generating a visualization of the graph.

In some embodiments, receiving the data set comprises receiving a selection of data from a fact table and one or more dimension tables related to the fact table, the data including a plurality of values from a plurality of dimensions from the fact table and the one or more dimension tables, the fact table and the one or more dimension tables being stored in a data warehouse.

The method may further comprise providing the first data structure and the second data structure a data warehouse system, the data warehouse system storing a fact table and one or more dimension tables related to the fact table, whereby the first data structure is linked to at least one of the one or more dimension tables. In some embodiments, the method may further comprise receiving analytical results of a query using a query language, the query being directed to receive information regarding data in the fact table, one or more dimension tables, and the first data structure.

In some embodiments, the method further comprises selecting different colors for different subsets of the plurality of nodes, each color being based on values of at least one dimension. Information from the at least one dimension may not considered in generating the graph. The method may further comprise generating a third data structure, the third data structure identifying a color of the different colors for each node in the graph, the third data structure being queryable using a query language.

The first data structure and the second data structure may be each a table. The method may further comprise determining a plurality of segments of the graph, each segment including at least one node of the plurality of nodes and generating a fourth data structure identifying each segment as well as membership of each segment, the membership of each segment including at least one node from the plurality of nodes in the graph, the fourth data structure being queryable using the query language. In some embodiments, the method may further comprise providing the first data structure, the second data structure, and the third data structure to a digital device to enable insights from the graph to be further analyzed using the query language. In various embodiments, the method may further comprise receiving a selection of dimensions to enable identification of significant dimensions relevant to one or more of the plurality of segments, for each segment, scoring significance for each dimension of the selection of the dimensions to a particular segment, comparing the scored significance to a significance threshold, identifying dimensions with particular significance based on the comparison, and generating a feature data structure including the identified dimensions with particular significance, the feature data structure being queryable using the query language.

An example non-transitory computer readable medium may comprise instructions executable by a processor to perform a method. The method may comprise receiving a data set from any number of data sources, receiving a lens function identifier, a metric function identifier, and a resolution function identifier, mapping data points from the data a reference space utilizing a lens function identified by the lens function identifier, generating a cover of the reference space using a resolution function identified by the resolution identifier, clustering the data points mapped to the reference space using the cover and a metric function identified by the metric function identifier to determine each node of a plurality of nodes of a graph, each node including at least one data point, generating a graph including the plurality of nodes, the graph including an edge between every two nodes that share at least one data point as a member, and generating a first data structure and a second data structure, the first data structure identifying membership of each node of the plurality of nodes, the membership including one or more of the data points, the second data structure identifying each edge between two nodes of the plurality of nodes, the second data structure further identifying the nodes of the plurality of nodes that are connected by each edge, the first and second data structure being capable of being queryable using a query language. The method may further comprise generating a visualization of the graph.

An example system may comprise one or more processors and memory. The memory may contain instructions executable by at least one of the one or more processors to receive a data set from any number of data sources, receive a lens function identifier, a metric function identifier, and a resolution function identifier, map data points from the data set to a reference space utilizing a lens function identified by the lens function identifier, generate a cover of the reference space using a resolution function identified by the resolution identifier, cluster the data points mapped to the reference space using the cover and a metric function identified by the metric function identifier to determine each node of a plurality of nodes of a graph, each node including at least one data point, generate a graph including the plurality of nodes, the graph including an edge between every two nodes that share at least one data point as a member, and generate a first data structure and a second data structure, the first data structure identifying membership of each node of the plurality of nodes, the membership including one or more of the data points, the second data structure identifying each edge between two nodes of the plurality of nodes, the second data structure further identifying the nodes of the plurality of nodes that are connected by each edge, the first and second data structure being capable of being queryable using a query language.

BRIEF DESCRIPTION OF THE DRAWINGS

FIG. 13 is an example data structure including biological data for a number of patients that may be used to generate the cancer map visualization in some embodiments.

FIG. 21 depicts an example patient dimension table, an example hospital dimension table, and an example medicine dimension table.

FIG. 27 depicts a variety of example graph dimension tables that may be generated by the dimension engine.

FIG. 29 depicts an example feature table generated by a feature engine.

FIG. 35 is an example report of an autogrouped graph of data points that depicts the grouped data in some embodiments.

DETAILED DESCRIPTION OF DRAWINGS

Some embodiments described herein may be a part of the subject of Topological Data Analysis (TDA). TDA is an area of research which has produced methods for studying point cloud data sets from a geometric point of view. Other data analysis techniques use "approximation by models" of various types. Examples of other data analysis techniques include regression methods which model data as a graph of a function in one or more variables. Unfortunately, certain qualitative properties (which one can readily observe when the data is two-dimensional) may be of a great deal of importance for understanding, and these features may not be readily represented within such models.

Figure 1A:
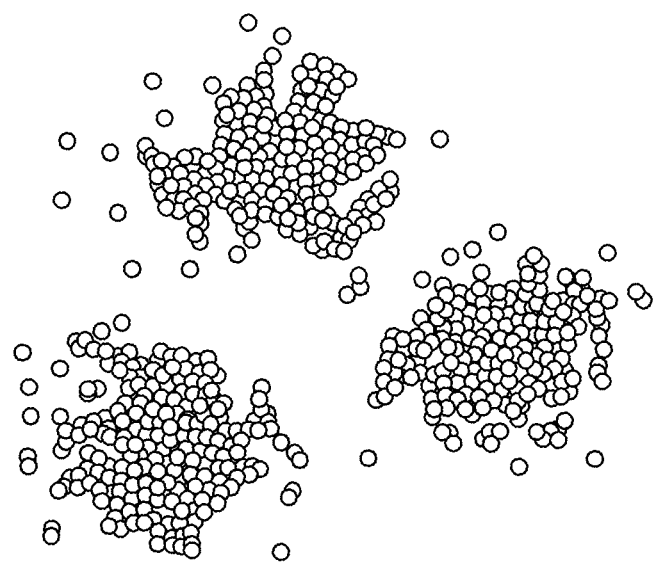
FIG. 1A is an example graph representing data that appears to be divided into three disconnected groups.

FIG. 1A is an example graph representing data that appears to be divided into three disconnected groups. In this example, the data for this graph may be associated with various physical characteristics related to different population groups or biomedical data related to different forms of a disease. Seeing that the data breaks into groups in this fashion can give insight into the data, once one understands what characterizes the groups.

Figure 1B:
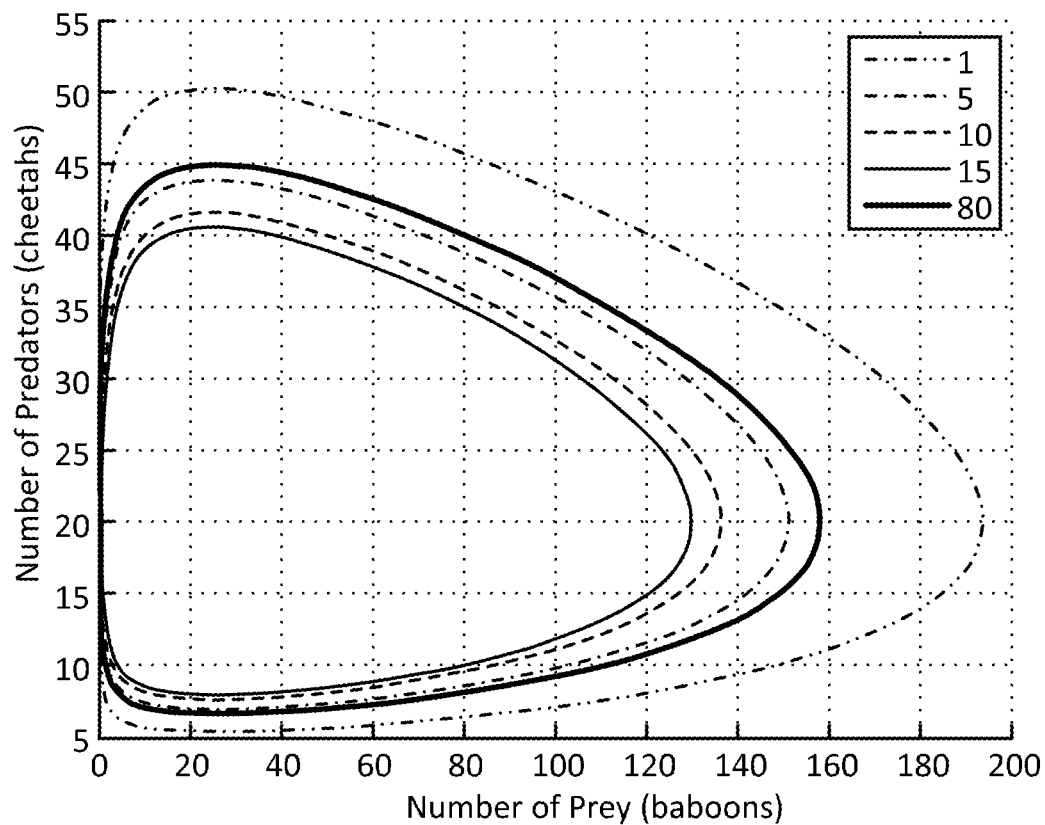
FIG. 1B is an example graph representing data set obtained from a Lotka-Volterra equation modeling the populations of predators and prey over time.

FIG. 1B is an example graph representing data set obtained from a Lotka-Volterra equation modeling the populations of predators and prey over time. From FIG. 1B, one observation about this data is that it is arranged in a loop. The loop is not exactly circular, but it is topologically a circle. The exact form of the equations, while interesting, may not be of as much importance as this qualitative observation which reflects the fact that the underlying phenomenon is recurrent or periodic. When looking for periodic or recurrent phenomena, methods may be developed which can detect the presence of loops without defining explicit models. For example, periodicity may be detectable without having to first develop a fully accurate model of the dynamics.

Figure 1C:
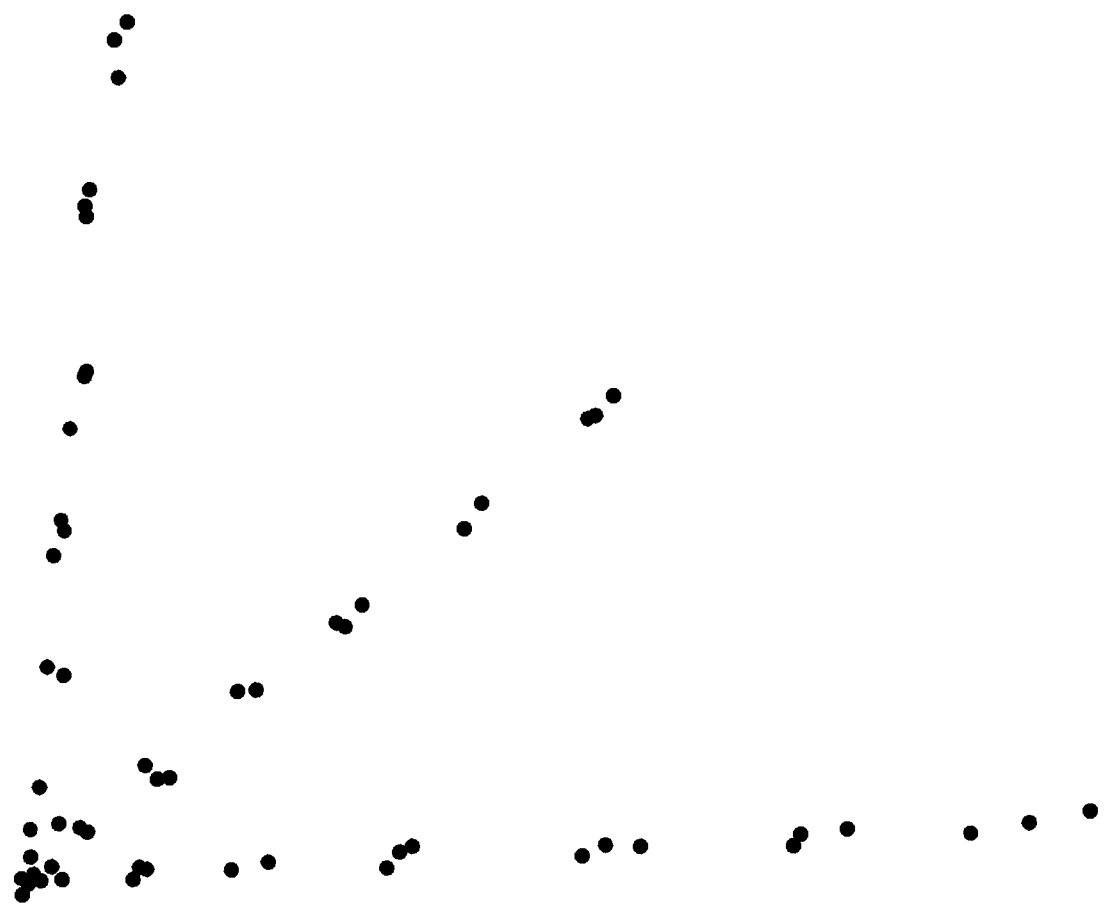
FIG. 1C is an example graph of data sets whereby the data does not break up into disconnected groups, but instead has a structure in which there are lines (or flares) emanating from a central group.

FIG. 1C is an example graph of data sets whereby the data does not break up into disconnected groups, but instead has a structure in which there are lines (or flares) emanating from a central group. In this case, the data also suggests the presence of three distinct groups, but the connectedness of the data does not reflect this. This particular data that is the basis for the example graph in FIG. 1C arises from a study of single nucleotide polymorphisms (SNPs).

In each of the examples above, aspects of the shape of the data are relevant in reflecting information about the data. Connectedness (the simplest property of shape) reflects the presence of a discrete classification of the data into disparate groups. The presence of loops, another simple aspect of shape, often reflect periodic or recurrent behavior. Finally, in the third example, the shape containing flares suggests a classification of the data descriptive of ways in which phenomena can deviate from the norm, which would typically be represented by the central core. These examples support the idea that the shape of data (suitably defined) is an important aspect of its structure, and that it is therefore important to develop methods for analyzing and understanding its shape. The part of mathematics which concerns itself with the study of shape is called topology, and topological data analysis attempts to adapt methods for studying shape which have been developed in pure mathematics to the study of the shape of data, suitably defined.

One question is how notions of geometry or shape are translated into information about point clouds, which are, after all, finite sets? What we mean by shape or geometry can come from a dissimilarity function or metric (e.g., a non-negative, symmetric, real-valued function d on the set of pairs of points in the data set which may also satisfy the triangle inequality, and $d(x; y)=0$ if and only if $x=y$). Such functions exist in profusion for many data sets. For example, when data comes in the form of a numerical matrix, where the rows correspond to the data points and the columns are the fields describing the data, the n-dimensional Euclidean distance function is natural when there are n fields. Similarly, in this example, there are Pearson correlation distances, cosine distances, and other choices.

When the data is not Euclidean, for example if one is considering genomic sequences, various notions of distance may be defined using measures of similarity based on Basic Local Alignment Search Tool (BLAST) type similarity scores. Further, a measure of similarity can come in non-numeric forms, such as social networks of friends or similarities of hobbies, buying patterns, tweeting, and/or professional interests. In any of these ways the notion of shape may be formulated via the establishment of a useful notion of similarity of data points.

One of the advantages of TDA is that TDA may depend on nothing more than such a notion, which is a very primitive or low-level model. TDA may rely on many fewer assumptions than standard linear or algebraic models, for example. Further, the methodology may provide new ways of visualizing and compressing data sets, which facilitate understanding and monitoring data. The methodology may enable study of interrelationships among disparate data sets and/or multiscale/multiresolution study of data sets. Moreover, the methodology may enable interactivity in the analysis of data, using point and click methods.

In some embodiments, TDA may be a very useful complement to more traditional methods, such as Principal Component Analysis (PCA), multidimensional scaling, and hierarchical clustering. These existing methods are often quite useful, but suffer from significant limitations. PCA, for example, is an essentially linear procedure and there are therefore limits to its utility in highly non-linear situations. Multidimensional scaling is a method which is not intrinsically linear, but can in many situations wash out detail, since it may overweight large distances. In addition, when metrics do not satisfy an intrinsic flatness condition, it may have difficulty in faithfully representing the data. Hierarchical clustering does exhibit multiscale behavior, but represents data only as disjoint clusters, rather than retaining any of the geometry of the data set. In all four cases, these limitations matter for many varied kinds of data.

We now summarize example properties of an example construction, in some embodiments, which may be used for representing the shape of data sets in a useful, understandable fashion as a finite graph:

The input may be a collection of data points equipped in some way with a distance or dissimilarity function, or other description. This can be given implicitly when the data is in the form of a matrix, or explicitly as a matrix of distances or even the generating edges of a mathematical network.

One construction may also use one or more lens functions (i.e. real valued functions on the data). Lens function(s) may depend directly on the metric. For example, lens function(s) might be the result of a density estimator or a measure of centrality or data depth. Lens function(s) may, in some embodiments, depend on a particular representation of the data, as when one uses the first one or two coordinates of a principal component or multidimensional scaling analysis. In some embodiments, the lens function(s) may be columns which expert knowledge identifies as being intrinsically interesting, as in cholesterol levels and BMI in a study of heart disease.

In some embodiments, the construction may depend on a choice of two or more processing parameters, resolution, and gain. Increase in resolution typically results in more nodes and an increase in the gain increases the number of edges in a visualization and/or graph in a reference space as further described herein.

The output may be, for example, a visualization (e.g., a display of connected nodes or "network") or simplicial complex. One specific combinatorial formulation in one embodiment may be that the vertices form a finite set, and then the additional structure may be a collection of edges (unordered pairs of vertices) which are pictured as connections in this network.

In various embodiments, a system for handling, analyzing, and visualizing data using drag and drop methods as opposed to text based methods is described herein. Philosophically, data analytic tools are not necessarily regarded as "solvers," but rather as tools for interacting with data. For example, data analysis may consist of several iterations of a process in which computational tools point to regions of interest in a data set. The data set may then be examined by people with domain expertise concerning the data, and the data set may then be subjected to further computational analysis. In some embodiments, methods described herein provide for going back and forth between mathematical constructs, including interactive visualizations (e.g., graphs), on the one hand and data on the other.

In one example of data analysis in some embodiments described herein, an exemplary clustering tool is discussed which may be more powerful than existing technology, in that one can find structure within clusters and study how clusters change over a period of time or over a change of scale or resolution.

An example interactive visualization tool (e.g., a visualization module which is further described herein) may produce combinatorial output in the form of a graph which can be readily visualized. In some embodiments, the example interactive visualization tool may be less sensitive to changes in notions of distance than current methods, such as multidimensional scaling.

Some embodiments described herein permit manipulation of the data from a visualization. For example, portions of the data which are deemed to be interesting from the visualization can be selected and converted into database objects, which can then be further analyzed. Some embodiments described herein permit the location of data points of interest within the visualization, so that the connection between a given visualization and the information the visualization represents may be readily understood.

Figure 2:
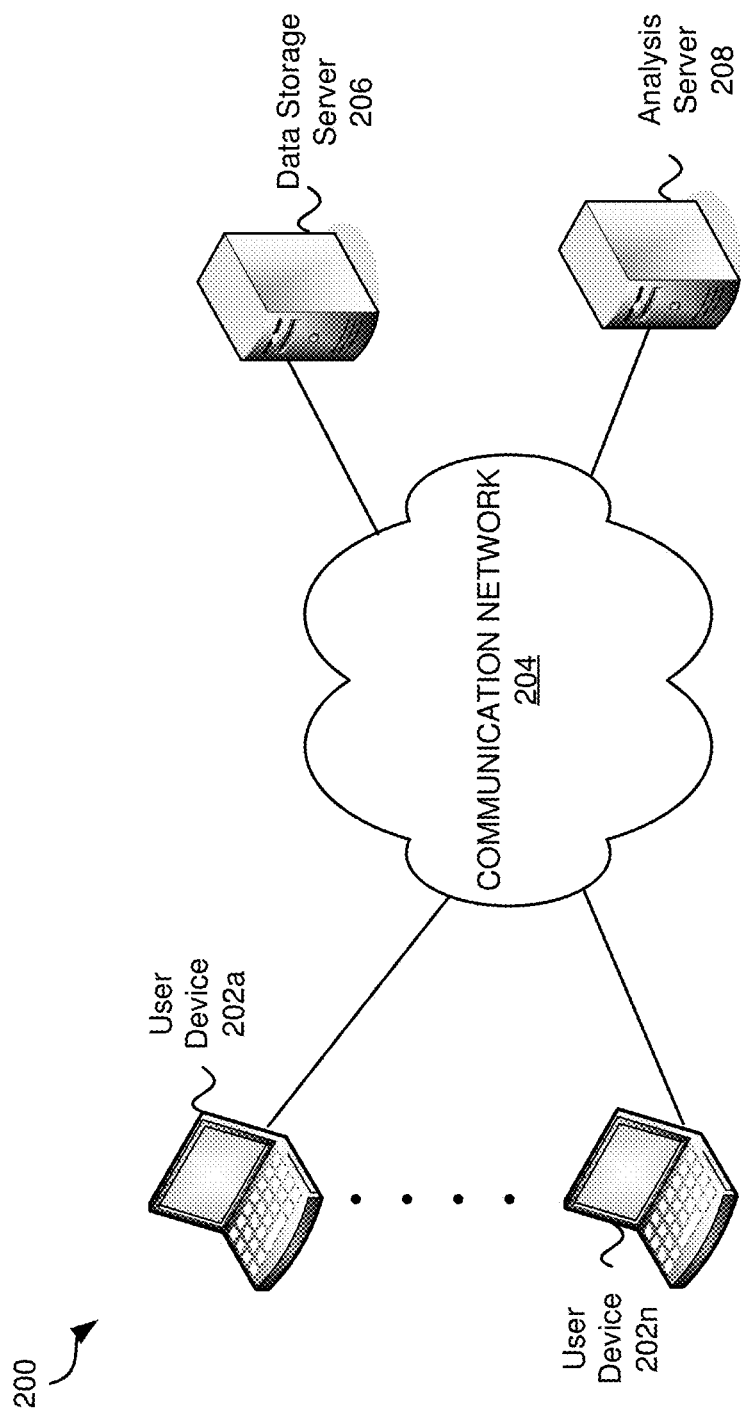
FIG. 2 is an example environment in which embodiments may be practiced.

FIG. 2 is an example environment 200 in which embodiments may be practiced. In various embodiments, data analysis and interactive visualization may be performed locally (e.g., with software and/or hardware on a local digital device), across a network (e.g., via cloud computing), or a combination of both. In many of these embodiments, a data structure is accessed to obtain the data for the analysis, the analysis is performed based on properties and parameters selected by a user, and an interactive visualization is generated and displayed. There are many advantages between performing all or some activities locally and many advantages of performing all or some activities over a network.

Environment 200 comprises user devices 202a-202n, a communication network 204, data storage server 206, and analysis server 208. Environment 200 depicts an embodiment wherein functions are performed across a network. In this example, the user(s) may take advantage of cloud computing by storing data in a data storage server 206 over a communication network 204. The analysis server 208 may perform analysis and generation of an interactive visualization.

User devices 202a-202n may be any digital devices. A digital device is any device that includes memory and a processor. Digital devices are further described in FIG. 18. The user devices 202a-202n may be any kind of digital device that may be used to access, analyze and/or view data including, but not limited to a desktop computer, laptop, notebook, or other computing device.

In various embodiments, a user, such as a data analyst, may generate and/or receive a database or other data structure with the user device 202a to be saved to the data storage server 206. The user device 202a may communicate with the analysis server 208 via the communication network 204 to perform analysis, examination, and visualization of data within the database.

The user device 202a may comprise any number of client programs. One or more of the client programs may interact with one or more applications on the analysis server 208. In other embodiments, the user device 202a may communicate with the analysis server 208 using a browser or other standard program. In various embodiments, the user device 202a communicates with the analysis server 208 via a virtual private network. Those skilled in the art will appreciate that that communication between the user device 202a, the data storage server 206, and/or the analysis server 208 may be encrypted or otherwise secured.

The communication network 204 may be any network that allows digital devices to communicate. The communication network 204 may be the Internet and/or include LAN and WANs. The communication network 204 may support wireless and/or wired communication.

The data storage server 206 is a digital device that is configured to store data. In various embodiments, the data storage server 206 stores databases and/or other data structures. The data storage server 206 may be a single server or a combination of servers. In one example the data storage server 206 may be a secure server wherein a user may store data over a secured connection (e.g., via https). The data may be encrypted and backed-up. In some embodiments, the data storage server 206 is operated by a third-party such as Amazon's S3 service.

The database or other data structure may comprise large high-dimensional datasets. These datasets are traditionally very difficult to analyze and, as a result, relationships within the data may not be identifiable using previous methods. Further, previous methods may be computationally inefficient.

The analysis server 208 may include any number of digital devices configured to analyze data (e.g., the data in the stored database and/or other dataset received and/or generated by the user device 202a). Although only one digital device is depicted in FIG. 2 corresponding to the analysis server 208, it will be appreciated that any number of functions of the analysis server 208 may be performed by any number of digital devices.

In various embodiments, the analysis server 208 may perform many functions to interpret, examine, analyze, and display data and/or relationships within data. In some embodiments, the analysis server 208 performs, at least in part, topological analysis of large datasets applying metrics, filters, and resolution parameters chosen by the user. The analysis is further discussed regarding FIG. 8 herein.

The analysis server 208 may generate graphs in memory, visualized graphs, and/or an interactive visualization of the output of the analysis. The interactive visualization allows the user to observe and explore relationships in the data. In various embodiments, the interactive visualization allows the user to select nodes comprising data that has been clustered. The user may then access the underlying data, perform further analysis (e.g., statistical analysis) on the underlying data, and manually reorient the graph(s) (e.g., structures of nodes and edges described herein) within the interactive visualization. The analysis server 208 may also allow for the user to interact with the data, see the graphic result. The interactive visualization is further discussed in FIGS. 9-11.

The graphs in memory and/or visualized graphs may also include nodes and/or edges as described herein. Graphs that are generated in memory may not be depicted to a user but rather may be in memory of a digital device. Visualized graphs are rendered graphs that may be depicted to the user (e.g., using user device 202a).

In some embodiments, the analysis server 208 interacts with the user device(s) 202a-202n over a private and/or secure communication network. The user device 202a may include a client program that allows the user to interact with the data storage server 206, the analysis server 208, another user device (e.g., user device 202n), a database, and/or an analysis application executed on the analysis server 208.

It will be appreciated that all or part of the data analysis may occur at the user device 202a. Further, all or part of the interaction with the visualization (e.g., graphic) may be performed on the user device 202a. Alternately, all or part of the data analysis may occur on any number of digital devices including, for example, on the analysis server 208.

Although two user devices 202a and 202n are depicted, those skilled in the art will appreciate that there may be any number of user devices in any location (e.g., remote from each other). Similarly, there may be any number of communication networks, data storage servers, and analysis servers.

Cloud computing may allow for greater access to large datasets (e.g., via a commercial storage service) over a faster connection. Further, those skilled in the art will appreciate that services and computing resources offered to the user(s) may be scalable.

Figure 3:
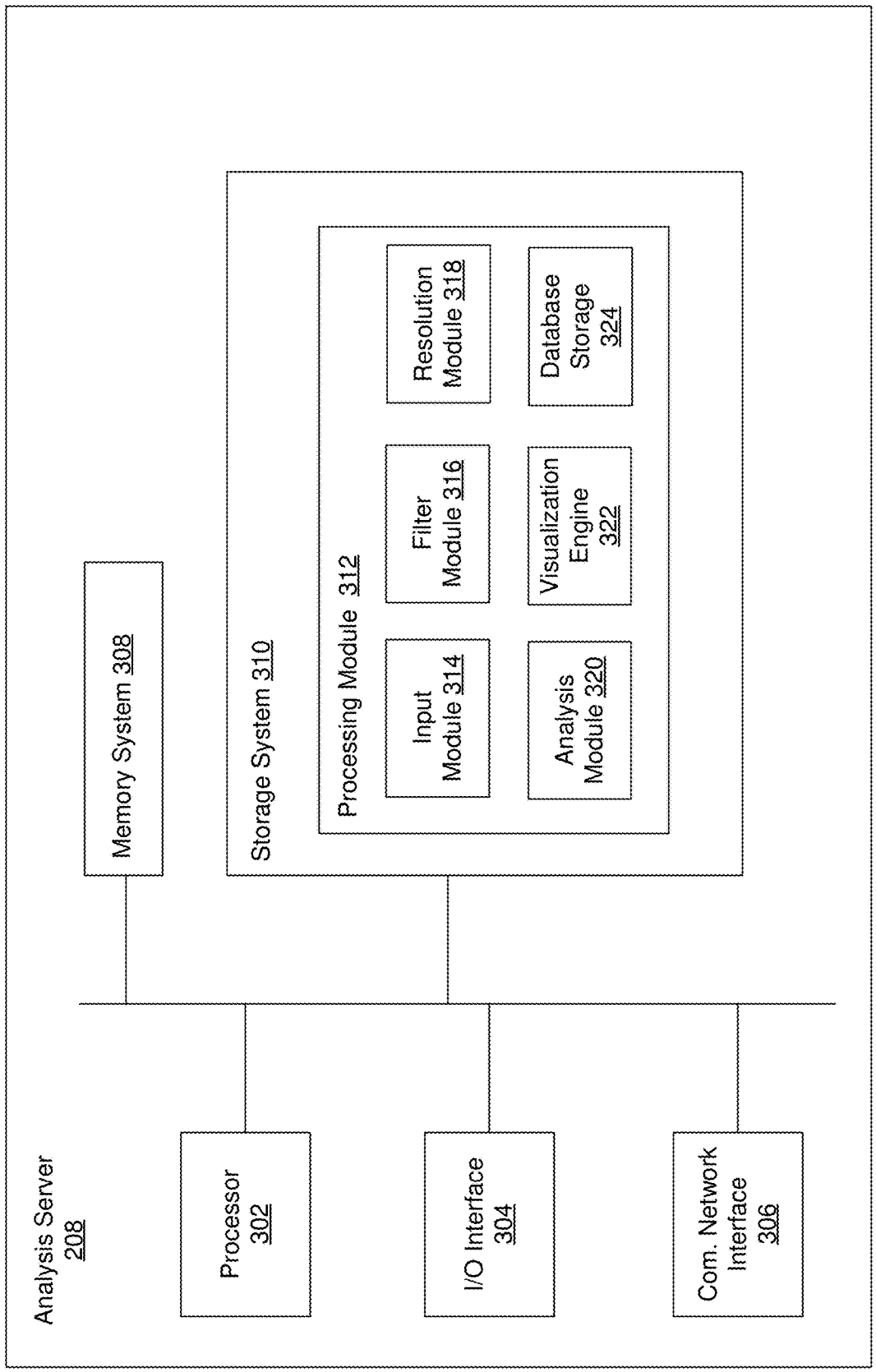
FIG. 3 is a block diagram of an example analysis server.

FIG. 3 is a block diagram of an example analysis server 208. In some embodiments, the analysis server 208 comprises a processor 302, input/output (I/O) interface 304, a communication network interface 306, a memory system 308, a storage system 310, and a processing module 312. The processor 302 may comprise any processor or combination of processors with one or more cores.

The input/output (I/O) interface 304 may comprise interfaces for various I/O devices such as, for example, a keyboard, mouse, and display device. The example communication network interface 306 is configured to allow the analysis server 208 to communication with the communication network 204 (see FIG. 2). The communication network interface 306 may support communication over an Ethernet connection, a serial connection, a parallel connection, and/or an ATA connection. The communication network interface 306 may also support wireless communication (e.g., 802.11 a/b/g/n, WiMax, LTE, WiFi). It will be apparent to those skilled in the art that the communication network interface 306 can support many wired and wireless standards.

The memory system 308 may be any kind of memory including RAM, ROM, or flash, cache, virtual memory, etc. In various embodiments, working data is stored within the memory system 308. The data within the memory system 308 may be cleared or ultimately transferred to the storage system 310.

The storage system 310 includes any storage configured to retrieve and store data. Some examples of the storage system 310 include flash drives, hard drives, optical drives, and/or magnetic tape. Each of the memory system 308 and the storage system 310 comprises a non-transitory computer-readable medium, which stores instructions (e.g., software programs) executable by processor 302.

The storage system 310 comprises a plurality of modules utilized by embodiments of discussed herein. A module may be hardware, software (e.g., including instructions executable by a processor), or a combination of both. In one embodiment, the storage system 310 includes a processing module 312. The processing module 312 may include memory and/or hardware and includes an input module 314, a filter module 316, a resolution module 318, an analysis module 320, a visualization engine 322, and database storage 324. Alternative embodiments of the analysis server 208 and/or the storage system 310 may comprise more, less, or functionally equivalent components and modules.

The input module 314 may be configured to receive commands and preferences from the user device 202a. In various examples, the input module 314 receives selections from the user which will be used to perform the analysis. The output of the analysis may be an interactive visualization.

The input module 314 may provide the user a variety of interface windows allowing the user to select and access a database, choose fields associated with the database, choose a metric, choose one or more filters, and identify resolution parameters for the analysis. In one example, the input module 314 receives a database identifier and accesses a large multidimensional database. The input module 314 may scan the database and provide the user with an interface window allowing the user to identify an ID field. An ID field is an identifier for each data point. In one example, the identifier is unique. The same column name may be present in the table from which filters are selected. After the ID field is selected, the input module 314 may then provide the user with another interface window to allow the user to choose one or more data fields from a table of the database.

Although interactive windows may be described herein, those skilled in the art will appreciate that any window, graphical user interface, and/or command line may be used to receive or prompt a user or user device 202a for information.

The filter module 316 may subsequently provide the user with an interface window to allow the user to select a metric to be used in analysis of the data within the chosen data fields. The filter module 316 may also allow the user to select and/or define one or more filters.

The resolution module 318 may allow the user to select a resolution, including filter parameters. In one example, the user enters a number of intervals and a percentage overlap for a filter.

The analysis module 320 may perform data analysis based on the database and the information provided by the user. In various embodiments, the analysis module 320 performs an algebraic topological analysis to identify structures and relationships within data and clusters of data. Those skilled in the art will appreciate that the analysis module 320 may use parallel algorithms or use generalizations of various statistical techniques (e.g., generalizing the bootstrap to zig-zag methods) to increase the size of data sets that can be processed. The analysis is further discussed herein (e.g., see discussion regarding FIG. 8). It will be appreciated that the analysis module 320 is not limited to algebraic topological analysis but may perform any analysis.

The visualization engine 322 generates an interactive visualization based on the output from the analysis module 320. The interactive visualization allows the user to see all or part of the analysis graphically. The interactive visualization also allows the user to interact with the visualization. For example, the user may select portions of a graph from within the visualization to see and/or interact with the underlying data and/or underlying analysis. The user may then change the parameters of the analysis (e.g., change the metric, filter(s), or resolution(s)) which allows the user to visually identify relationships in the data that may be otherwise undetectable using prior means. The interactive visualization is further described herein (e.g., see discussion regarding FIGS. 9-11).

The database storage 324 is configured to store all or part of the database that is being accessed. In some embodiments, the database storage 324 may store saved portions of the database. Further, the database storage 324 may be used to store user preferences, parameters, and analysis output thereby allowing the user to perform many different functions on the database without losing previous work.

Those skilled in the art will appreciate that that all or part of the processing module 312 may be at the user device 202a or the data storage server 206. In some embodiments, all or some of the functionality of the processing module 312 may be performed by the user device 202a.

In various embodiments, systems and methods discussed herein may be implemented with one or more digital devices. In some examples, some embodiments discussed herein may be implemented by a computer program (instructions) executed by a processor. The computer program may provide a graphical user interface. Although such a computer program is discussed, those skilled in the art will appreciate that embodiments may be performed using any of the following, either alone or in combination, including, but not limited to, a computer program, multiple computer programs, firmware, and/or hardware.

A module and/or engine may include any processor or combination of processors. In some examples, a module and/or engine may include or be a part of a processor, digital signal processor (DSP), application specific integrated circuit (ASIC), an integrated circuit, and/or the like. In various embodiments, the module and/or engine may be software or firmware.

Figure 4:
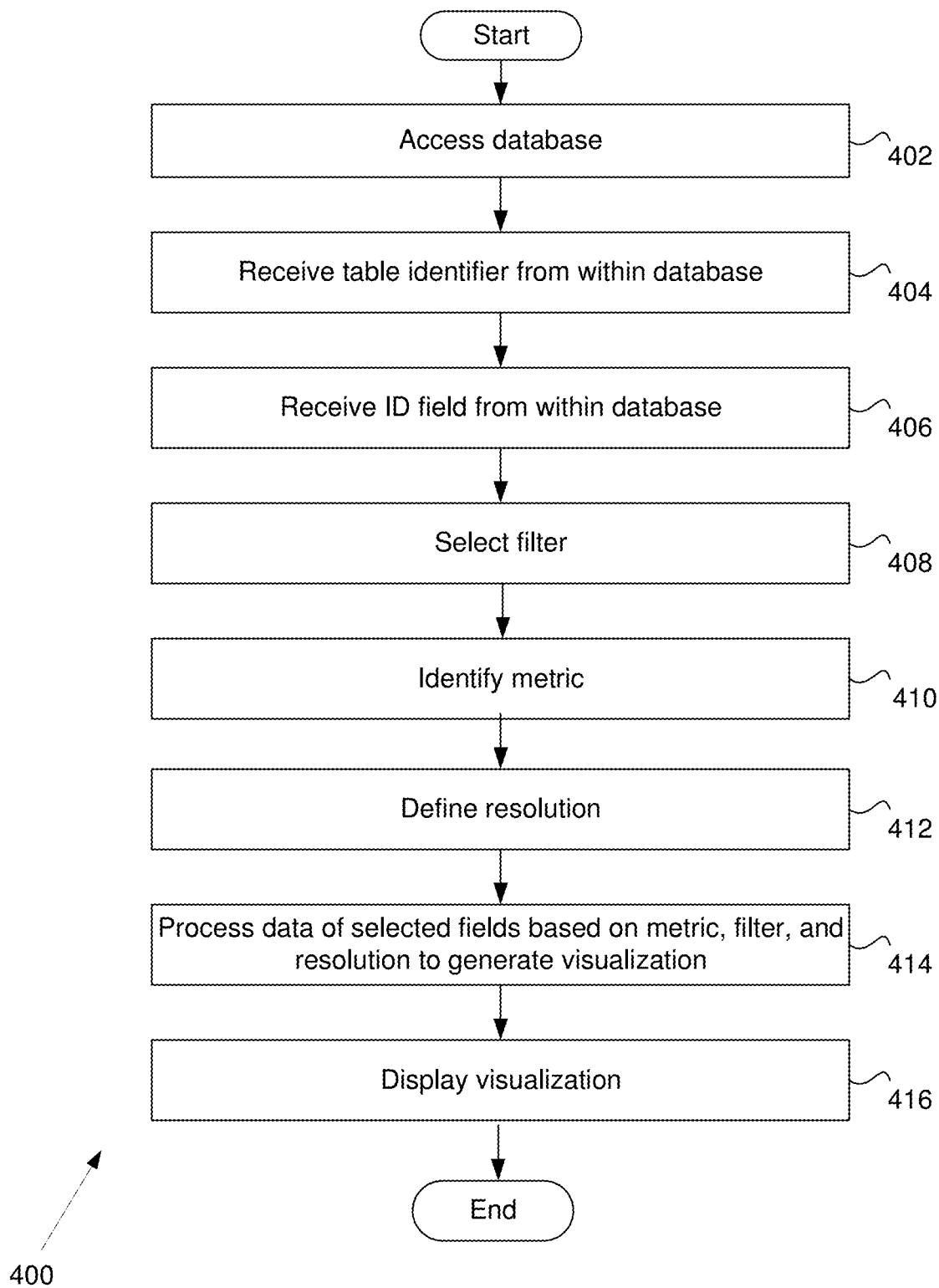
FIG. 4 is a flow chart depicting an example method of dataset analysis and visualization in some embodiments.

FIG. 4 is a flow chart 400 depicting an example method of dataset analysis and visualization in some embodiments. In step 402, the input module 314 accesses a database. The database may be any data structure containing data (e.g., a very large dataset of multidimensional data). In some embodiments, the database may be a relational database. In some examples, the relational database may be used with MySQL, Oracle, Microsoft SQL Server, Aster nCluster, Teradata, and/or Vertica. Those skilled in the art will appreciate that the database may not be a relational database.

In some embodiments, the input module 314 receives a database identifier and a location of the database (e.g., the data storage server 206) from the user device 202a (see FIG. 2). The input module 314 may then access the identified database. In various embodiments, the input module 314 may read data from many different sources, including, but not limited to MS Excel files, text files (e.g., delimited or CSV), Matlab .mat format, or any other file.

In some embodiments, the input module 314 receives an IP address or hostname of a server hosting the database, a username, password, and the database identifier. This information (herein referred to as "connection information") may be cached for later use. It will be appreciated that the database may be locally accessed and that all, some, or none of the connection information may be required. In one example, the user device 202a may have full access to the database stored locally on the user device 202a so the IP address is unnecessary. In another example, the user device 202a may already have loaded the database and the input module 314 merely begins by accessing the loaded database.

In various embodiments, the identified database stores data within tables. A table may have a "column specification" which stores the names of the columns and their data types. A "row" in a table, may be a tuple with one entry for each column of the correct type. In one example, a table to store employee records might have a column specification such as:

employee_id primary key int (this may store the employee's ID as an integer, and uniquely identifies a row)
age int
gender char(1) (gender of the employee may be a single character either M or F)
salary double (salary of an employee may be a floating point number)
name varchar (name of the employee may be a variable-length string)

In this example, each employee corresponds to a row in this table. Further, the tables in this example relational database are organized into logical units called databases. An analogy to file systems is that databases can be thought of as folders and files as tables. Access to databases may be controlled by the database administrator by assigning a username/password pair to authenticate users.

Once the database is accessed, the input module 314 may allow the user to access a previously stored analysis or to begin a new analysis. If the user begins a new analysis, the input module 314 may provide the user device 202a with an interface window allowing the user to identify a table from within the database. In one example, the input module 314 provides a list of available tables from the identified database.

In step 404, the input module 314 receives a table identifier identifying a table from within the database. The input module 314 may then provide the user with a list of available ID fields from the table identifier. In step 406, the input module 314 receives the ID field identifier from the user and/or user device 202a. The ID field is, in some embodiments, the primary key.

Having selected the primary key, the input module 314 may generate a new interface window to allow the user to select data fields for analysis. In step 408, the input module 314 receives data field identifiers from the user device 202a. The data within the data fields may be later analyzed by the analysis module 320.

In step 408, the filter module 316 selects one or more filters. In some embodiments, the filter module 316 and/or the input module 314 generates an interface window allowing the user of the user device 202a options for a variety of different metrics and filter preferences. The interface window may be a drop down menu identifying a variety of distance metrics to be used in the analysis.

In some embodiments, the user selects and/or provides filter identifier(s) to the filter module 316. The role of the filters in the analysis is also further described herein. The filters, for example, may be user defined, geometric, or based on data which has been pre-processed. In some embodiments, the data based filters are numerical arrays which can assign a set of real numbers to each row in the table or each point in the data generally.

A variety of geometric filters may be available for the user to choose. Geometric filters may include, but are not limited to:
- Density
- L1 Eccentricity
- L-infinity Eccentricity
- Witness based Density
- Witness based Eccentricity
- Eccentricity as distance from a fixed point
- Approximate Kurtosis of the Eccentricity In step 410, the filter module 316 identifies a metric. Metric options may include, but are not limited to, Euclidean, DB Metric, variance normalized Euclidean, and total normalized Euclidean. The metric and the analysis are further described herein.

In step 412, the resolution module 318 defines the resolution to be used with a filter in the analysis. The resolution may comprise a number of intervals and an overlap parameter. In various embodiments, the resolution module 318 allows the user to adjust the number of intervals and overlap parameter (e.g., percentage overlap) for one or more filters.

In step 414, the analysis module 320 processes data of selected fields based on the metric, filter(s), and resolution(s) to generate the visualization. This process is further discussed herein (e.g., see discussion regarding FIG. 8).

In step 416, the visualization engine 322 displays the interactive visualization. In various embodiments, the visualization may be rendered in two or three dimensional space. The visualization engine 322 may use an optimization algorithm for an objective function which is correlated with good visualization (e.g., the energy of the embedding). The visualization may show a collection of nodes corresponding to each of the partial clusters in the analysis output and edges connecting them as specified by the output. The interactive visualization is further discussed herein (e.g., see discussion regarding FIGS. 9-11).

Although many examples discuss the input module 314 as providing interface windows, it will be appreciated that all or some of the interface may be provided by a client on the user device 202a. Further, in some embodiments, the user device 202a may be running all or some of the processing module 312.

Figure 5:
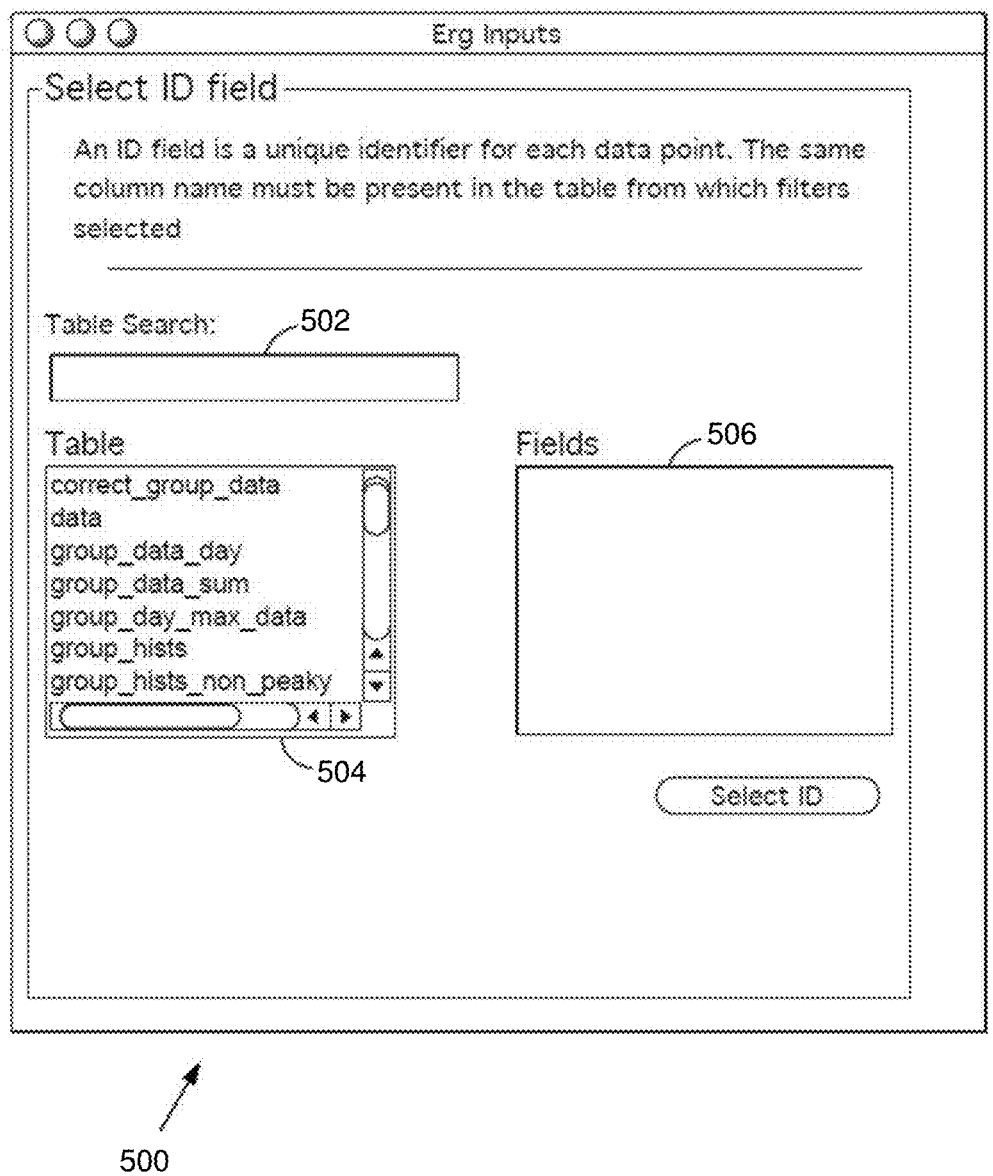
FIG. 5 is an example ID field selection interface window in some embodiments.
Figure 6A:
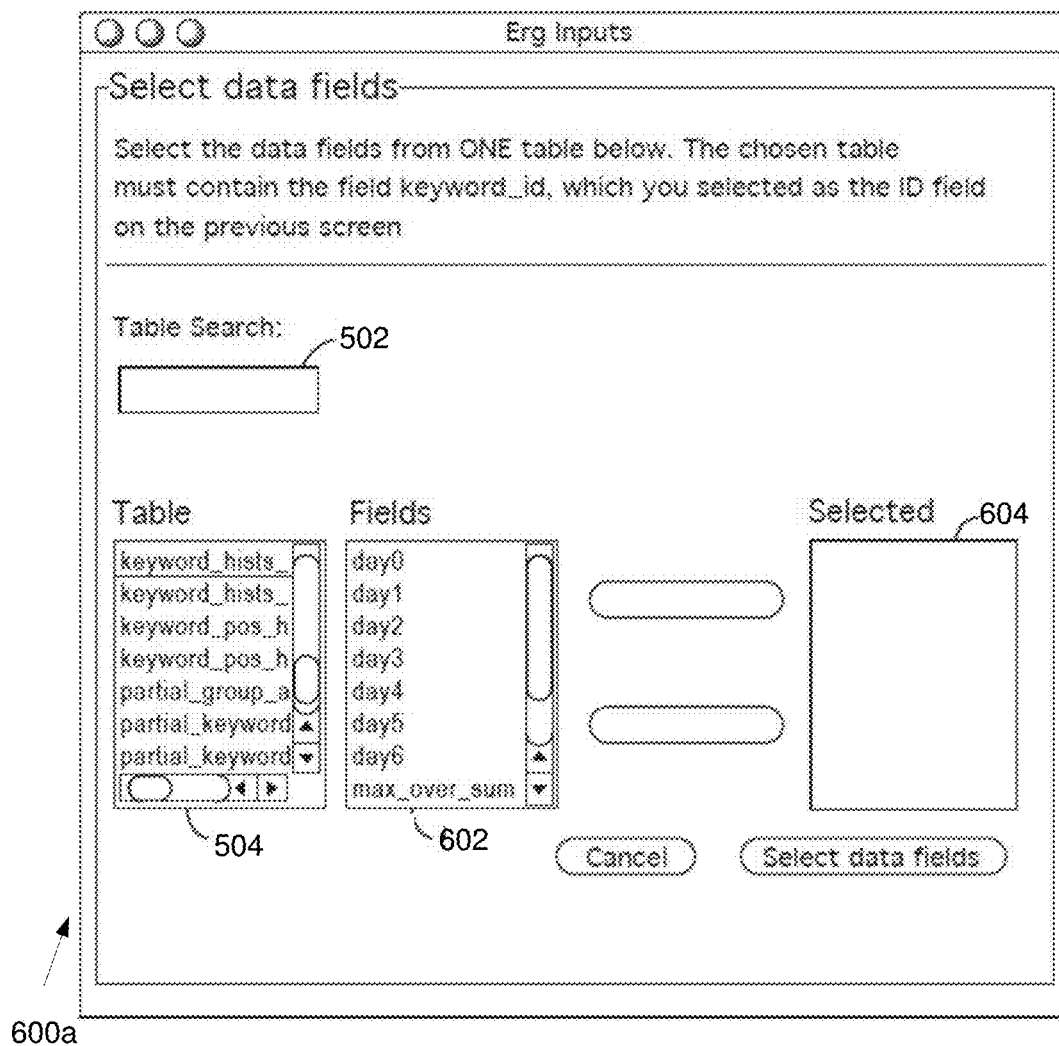
FIG. 6A is an example data field selection interface window in some embodiments.
Figure 6B:
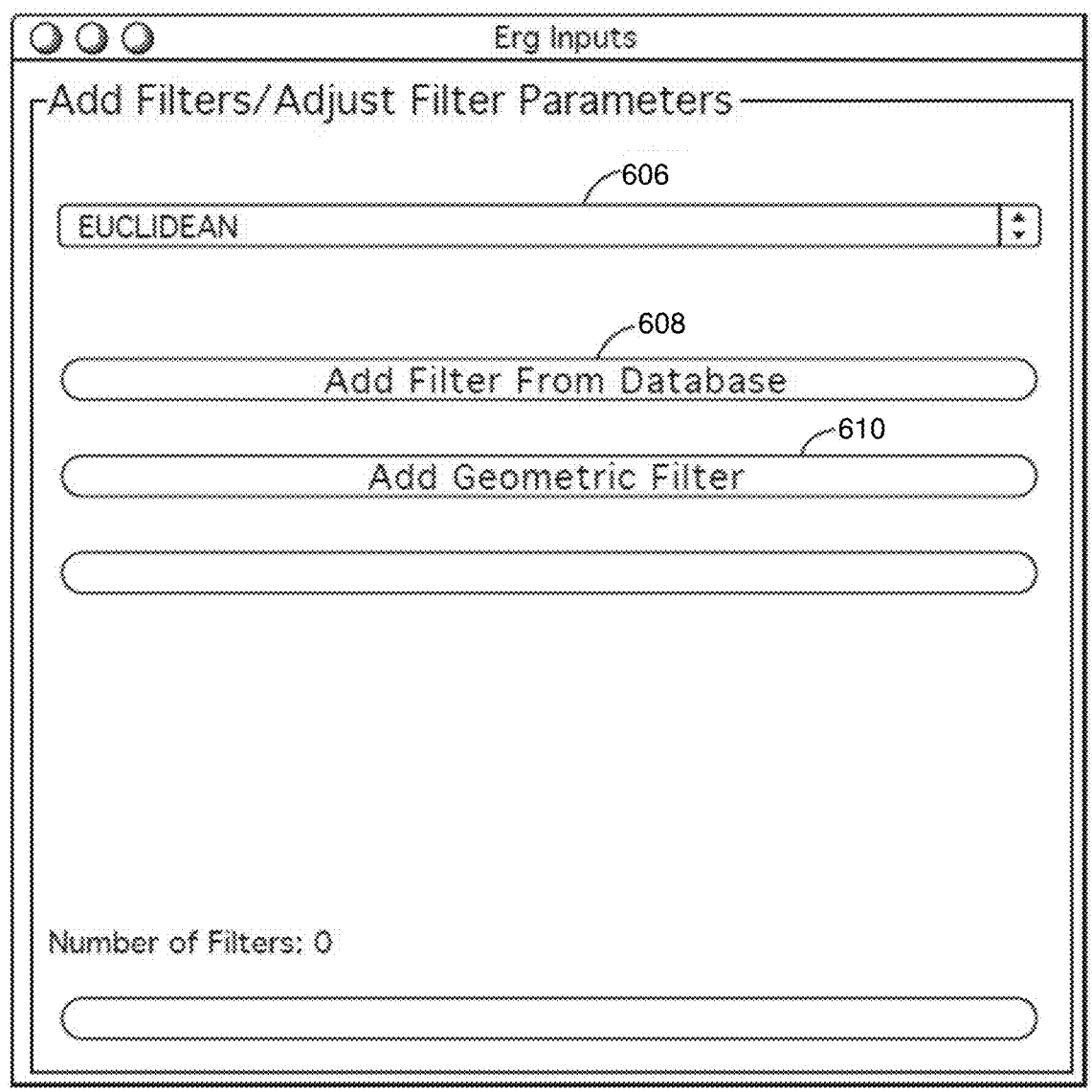
FIG. 6B is an example metric and filter selection interface window in some embodiments.
Figure 7:
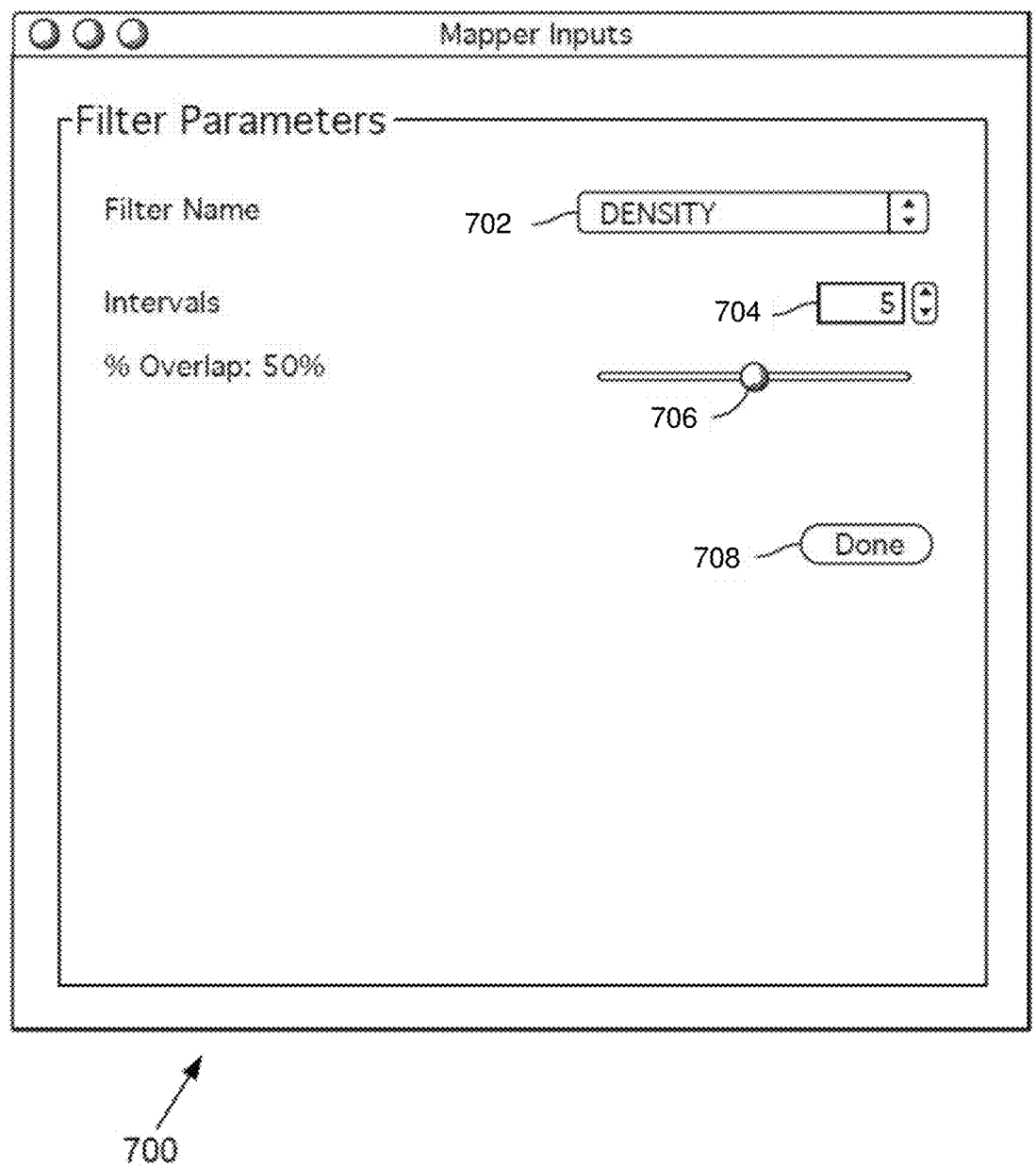
FIG. 7 is an example filter parameter interface window in some embodiments.

FIGS. 5-7 depict various interface windows to allow the user to make selections, enter information (e.g., fields, metrics, and filters), provide parameters (e.g., resolution), and provide data (e.g., identify the database) to be used with analysis. It will be appreciated that any graphical user interface or command line may be used to make selections, enter information, provide parameters, and provide data.

FIG. 5 is an exemplary ID field selection interface window 500 in some embodiments. The ID field selection interface window 500 allows the user to identify an ID field. The ID field selection interface window 500 comprises a table search field 502, a table list 504, and a fields selection window 506.

In various embodiments, the input module 314 identifies and accesses a database from the database storage 324, user device 202a, or the data storage server 206. The input module 314 may then generate the ID field selection interface window 500 and provide a list of available tables of the selected database in the table list 504. The user may click on a table or search for a table by entering a search query (e.g., a keyword) in the table search field 502. Once a table is identified (e.g., clicked on by the user), the fields selection window 506 may provide a list of available fields in the selected table. The user may then choose a field from the fields selection window 506 to be the ID field. In some embodiments, any number of fields may be chosen to be the ID field(s).

FIG. 6A is an example data field selection interface window 600a in some embodiments. The data field selection interface window 600a allows the user to identify data fields. The data field selection interface window 600a comprises a table search field 502, a table list 504, a fields selection window 602, and a selected window 604.

In various embodiments, after selection of the ID field, the input module 314 provides a list of available tables of the selected database in the table list 504. The user may click on a table or search for a table by entering a search query (e.g., a keyword) in the table search field 502. Once a table is identified (e.g., clicked on by the user), the fields selection window 506 may provide a list of available fields in the selected table. The user may then choose any number of fields from the fields selection window 602 to be data fields. The selected data fields may appear in the selected window 604. The user may also deselect fields that appear in the selected window 604.

Those skilled in the art will appreciate that the table selected by the user in the table list 504 may be the same table selected with regard to FIG. 5. In some embodiments, however, the user may select a different table. Further, the user may, in various embodiments, select fields from a variety of different tables.

FIG. 6B is an example metric and filter selection interface window 600b in some embodiments. The metric and filter selection interface window 600b allows the user to identify a metric, add filter(s), and adjust filter parameters. The metric and filter selection interface window 600b comprises a metric pull down menu 606, an add filter from database button 608, and an add geometric filter button 610.

In various embodiments, the user may click on the metric pull down menu 606 to view a variety of metric options. Various metric options are described herein. In some embodiments, the user may define a metric. The user defined metric may then be used with the analysis.

In one example, finite metric space data may be constructed from a data repository (i.e., database, spreadsheet, or Matlab file) or data warehouse system. This may mean selecting a collection of fields whose entries will specify the metric using the standard Euclidean metric for these fields, when they are floating point or integer variables. Other notions of distance, such as graph distance between collections of points, may be supported.

The analysis module 320 may perform analysis using the metric as a part of a distance function. The distance function can be expressed by a formula, a distance matrix, or other routine which computes it. The user may add a filter from a database by clicking on the add filter from database button 608. The metric space may arise from a relational database, a Matlab file, an Excel spreadsheet, data warehouse system, or other methods for storing and manipulating data. The metric and filter selection interface window 600b may allow the user to browse for other filters to use in the analysis. The analysis and metric function are further described herein (e.g., see discussion regarding FIG. 8).

The user may also add a geometric filter 610 by clicking on the add geometric filter button 610. In various embodiments, the metric and filter selection interface window 600b may provide a list of geometric filters from which the user may choose.

FIG. 7 is an example filter parameter interface window 700 in some embodiments. The filter parameter interface window 700 allows the user to determine a resolution for one or more selected filters (e.g., filters selected in the metric and filter selection interface window 600). The filter parameter interface window 700 comprises a filter name menu 702, an interval field 704, an overlap bar 706, and a done button 708.

The filter parameter interface window 700 allows the user to select a filter from the filter name menu 702. In some embodiments, the filter name menu 702 is a drop down box indicating all filters selected by the user in the metric and filter selection interface window 600. Once a filter is chosen, the name of the filter may appear in the filter name menu 702. The user may then change the intervals and overlap for one, some, or all selected filters.

The interval field 704 allows the user to define a number of intervals for the filter identified in the filter name menu 702. The user may enter a number of intervals or scroll up or down to get to a desired number of intervals. Any number of intervals may be selected by the user. The function of the intervals is further discussed herein (e.g., see discussion regarding FIG. 8).

The overlap bar 706 allows the user to define the degree of overlap of the intervals for the filter identified in the filter name menu 702. In one example, the overlap bar 706 includes a slider that allows the user to define the percentage overlap for the interval to be used with the identified filter. Any percentage overlap may be set by the user.

Once the intervals and overlap are defined for the desired filters, the user may click the done button. The user may then go back to the metric and filter selection interface window 600 and see a new option to run the analysis. In some embodiments, the option to run the analysis may be available in the filter parameter interface window 700. Once the analysis is complete, the result may appear in an interactive visualization further described herein (e.g., see discussion regarding FIGS. 9-11).

It will be appreciated that interface windows in FIGS. 4-7 are examples. The example interface windows are not limited to the functional objects (e.g., buttons, pull down menus, scroll fields, and search fields) shown. Any number of different functional objects may be used. Further, as described herein, any other interface, command line, or graphical user interface may be used.

Figure 8:
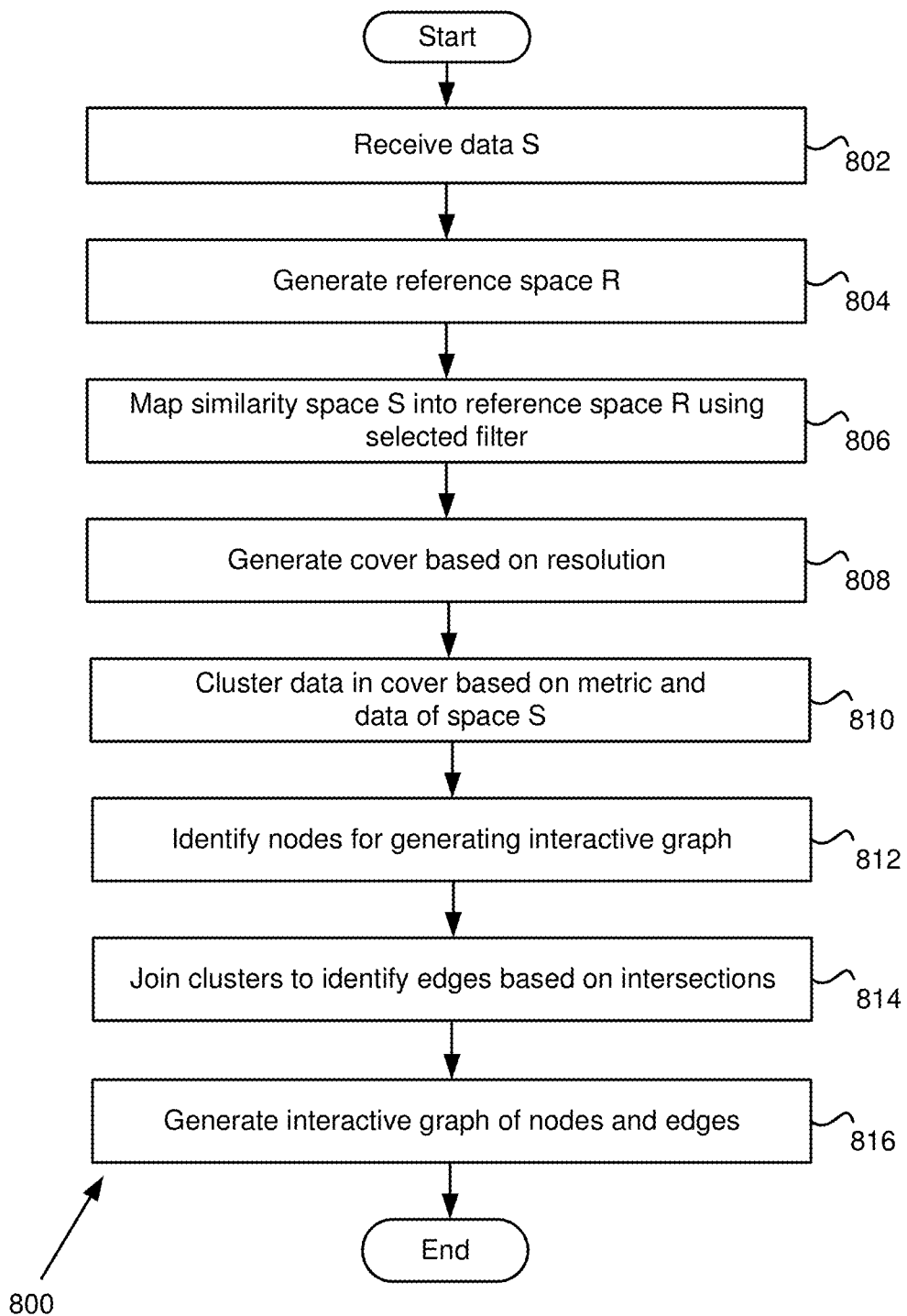
FIG. 8 is a flowchart for data analysis and generating a visualization in some embodiments.

FIG. 8 is a flowchart 800 for data analysis and generating an interactive visualization in some embodiments. In various embodiments, the processing on data and user-specified options is motivated by techniques from topology and, in some embodiments, algebraic topology. These techniques may be robust and general. In one example, these techniques apply to almost any kind of data for which some qualitative idea of "closeness" or "similarity" exists. The techniques discussed herein may be robust because the results may be relatively insensitive to noise in the data and even to errors in the specific details of the qualitative measure of similarity, which, in some embodiments, may be generally refer to as "the distance function" or "metric." It will be appreciated that while the description of the algorithms below may seem general, the implementation of techniques described herein may apply to any level of generality.

In step 802, the input module 314 receives data S. In one example, a user identifies a data structure and then identifies ID and data fields. Data S may be based on the information within the ID and data fields. In various embodiments, data S is treated as being processed as a finite "similarity space," where data S has a real-valued function d defined on pairs of points s and t in S, such that:

$$d(s,s)=0$$

$$d(s,t)=d(t,s)$$

$$d(s,t)>=0$$

These conditions may be similar to requirements for a finite metric space, but the conditions may be weaker. In various examples, the function is a metric.

It will be appreciated that data S may be a finite metric space, or a generalization thereof, such as a graph or weighted graph. In some embodiments, data S be specified by a formula, an algorithm, or by a distance matrix which specifies explicitly every pairwise distance.

In step 804, the input module 314 generates reference space R. In one example, reference space R may be a well-known metric space (e.g., such as the real line). The reference space R may be defined by the user. In step 806, the analysis module 320 generates a map ref( ) from S into R. The map ref( ) from S into R may be called the "reference map."

In one example, a reference of map from S is to a reference metric space R. R may be Euclidean space of some dimension, but it may also be the circle, torus, a tree, or other metric space. The map can be described by one or more filters (i.e., real valued functions on S). These filters can be defined by geometric invariants, such as the output of a density estimator, a notion of data depth, or functions specified by the origin of S as arising from a data set.

In step 808, the resolution module 318 generates a cover of R based on the resolution received from the user (e.g., filter(s), intervals, and overlap—see discussion regarding FIG. 7 for example). The cover of R may be a finite collection of open sets (in the metric of R) such that every point in R lies in at least one of these sets. In various examples, R is k-dimensional Euclidean space, where k is the number of filter functions. More precisely in this example, R is a box in k-dimensional Euclidean space given by the product of the intervals [min_k, max_k], where min_k is the minimum value of the k-th filter function on S, and max_k is the maximum value.

For example, suppose there are 2 filter functions, F1 and F2, and that F1's values range from −1 to +1, and F2's values range from 0 to 5. Then the reference space is the rectangle in the x/y plane with corners (−1,0), (1,0), (−1, 5), (1, 5), as every point s of S will give rise to a pair (F1(s), F2(s)) that lies within that rectangle.

In various embodiments, the cover of R is given by taking products of intervals of the covers of [min_k,max_k] for each of the k filters. In one example, if the user requests 2 intervals and a 50% overlap for F1, the cover of the interval [−1,+1] will be the two intervals (−1.5, 0.5), (−0.5, 1.5). If the user requests 5 intervals and a 30% overlap for F2, then that cover of [0, 5] will be (−0.3, 1.3), (0.7, 2.3), (1.7, 3.3), (2.7, 4.3), (3.7, 5.3). These intervals may give rise to a cover of the 2-dimensional box by taking all possible pairs of intervals where the first of the pair is chosen from the cover for F1 and the second from the cover for F2. This may give rise to 2*5, or 10, open boxes that covered the 2-dimensional reference space. However, those skilled in the art will appreciate that the intervals may not be uniform, or that the covers of a k-dimensional box may not be constructed by products of intervals. In some embodiments, there are many other choices of intervals. Further, in various embodiments, a wide range of covers and/or more general reference spaces may be used.

In one example, given a cover, $C_1, \ldots, C_m$, of R, the reference map is used to assign a set of indices to each point in S, which are the indices of the $C_j$ such that ref(s) belongs to $C_j$. This function may be called ref_tags(s). In a language such as Java, ref_tags would be a method that returned an int[ ]. Since the C's cover R in this example, ref(s) must lie in at least one of them, but the elements of the cover usually overlap one another, which means that points that "land near the edges" may well reside in multiple cover sets. In considering the two filter example, if F1(s) is −0.99, and F2(s) is 0.001, then ref(s) is (−0.99, 0.001), and this lies in the cover element (−1.5, 0.5)×(−0.3,1.3). Supposing that was labeled $C_1$, the reference map may assign s to the set {1}. On the other hand, if t is mapped by F1, F2 to (0.1, 2.1), then ref(t) will be in (−1.5,0.5)×(0.7, 2.3), (−0.5, 1.5)×(0.7, 2.3), (−1.5,0.5)×(1.7,3.3), and (−0.5, 1.5)×(1.7,3.3), so the set of indices would have four elements for t.

Having computed, for each point, which "cover tags" it is assigned to, for each cover element, $C_d$, the points may be constructed, whose tags included, as set S(d). This may mean that every point s is in S(d) for some d, but some points may belong to more than one such set. In some embodiments, there is, however, no requirement that each S(d) is non-empty, and it is frequently the case that some of these sets are empty. In the non-parallelized version of some embodiments, each point x is processed in turn, and x is inserted into a hash-bucket for each j in ref_tags(t) (that is, this may be how S(d) sets are computed).

It will be appreciated that the cover of the reference space R may be controlled by the number of intervals and the overlap identified in the resolution (e.g., see further discussion regarding FIG. 7). For example, the more intervals, the finer the resolution in S—that is, the fewer points in each S(d), but the more similar (with respect to the filters) these points may be. The greater the overlap, the more times that clusters in S(d) may intersect clusters in S(e)—this means that more "relationships" between points may appear, but, in some embodiments, the greater the overlap, the more likely that accidental relationships may appear.

In step 810, the analysis module 320 clusters each S(d) based on the metric, filter, and the space S. In some embodiments, a dynamic single-linkage clustering algorithm may be used to partition S(d). It will be appreciated that any number of clustering algorithms may be used with embodiments discussed herein. For example, the clustering scheme may be k-means clustering for some k, single linkage clustering, average linkage clustering, or any method specified by the user.

The significance of the user-specified inputs may now be seen. In some embodiments, a filter may amount to a "forced stretching" in a certain direction. In some embodiments, the analysis module 320 may not cluster two points unless ALL of the filter values are sufficiently "related" (recall that while normally related may mean "close," the cover may impose a much more general relationship on the filter values, such as relating two points s and t if ref(s) and ref(t) are sufficiently close to the same circle in the plane). In various embodiments, the ability of a user to impose one or more "critical measures" makes this technique more powerful than regular clustering, and the fact that these filters can be anything, is what makes it so general.

The output may be a simplicial complex, from which one can extract its 1-skeleton. The nodes of the complex may be partial clusters, (i.e., clusters constructed from subsets of S specified as the preimages of sets in the given covering of the reference space R).

In step 812, the visualization engine 322 identifies nodes which are associated with a subset of the partition elements of all of the S(d) for generating an interactive visualization.

For example, suppose that S={1, 2, 3, 4}, and the cover is $C_1$, $C_2$, $C_3$. Then if ref_tags(1)={1, 2, 3} and ref_tags(2)={2, 3}, and ref_tags(3)={3}, and finally ref_tags(4)={1, 3}, then S(1) in this example is {1, 4}, S(2)={1,2}, and S(3)={1,2, 3,4}. If 1 and 2 are close enough to be clustered, and 3 and 4 are, but nothing else, then the clustering for S(1) may be {1} {3}, and for S(2) it may be {1,2}, and for S(3) it may be {1,2}, {3,4}. So the generated graph has, in this example, at most four nodes, given by the sets {1}, {4}, {1,2}, and {3,4} (note that {1,2} appears in two different clusterings). Of the sets of points that are used, two nodes intersect provided that the associated node sets have a non-empty intersection (although this could easily be modified to allow users to require that the intersection is "large enough" either in absolute or relative terms).

Nodes may be eliminated for any number of reasons. For example, a node may be eliminated as having too few points and/or not being connected to anything else. In some embodiments, the criteria for the elimination of nodes (if any) may be under user control or have application-specific requirements imposed on it. For example, if the points are consumers divided by area code, for instance, clusters with too few people in area codes served by a company could be eliminated. If a cluster was found with "enough" customers, however, this might indicate that expansion into area codes of the other consumers in the cluster could be warranted.

In step 814, the visualization engine 322 joins clusters to identify edges (e.g., connecting lines between nodes). Once the nodes are constructed, the intersections (e.g., edges) may be computed "all at once," by computing, for each point, the set of node sets (not ref_tags, this time). That is, for each s in S, node_id_set(s) may be computed, which is an into. In some embodiments, if the cover is well behaved, then this operation is linear in the size of the set S, and we then iterate over each pair in node_id_set(s). There may be an edge between two node_id's if they both belong to the same node_id_set( ) value, and the number of points in the intersection is precisely the number of different node_id sets in which that pair is seen. This means that, except for the clustering step (which is often quadratic in the size of the sets S(d), but whose size may be controlled by the choice of cover), all of the other steps in the graph construction algorithm may be linear in the size of S, and may be computed quite efficiently.

Figure 9:
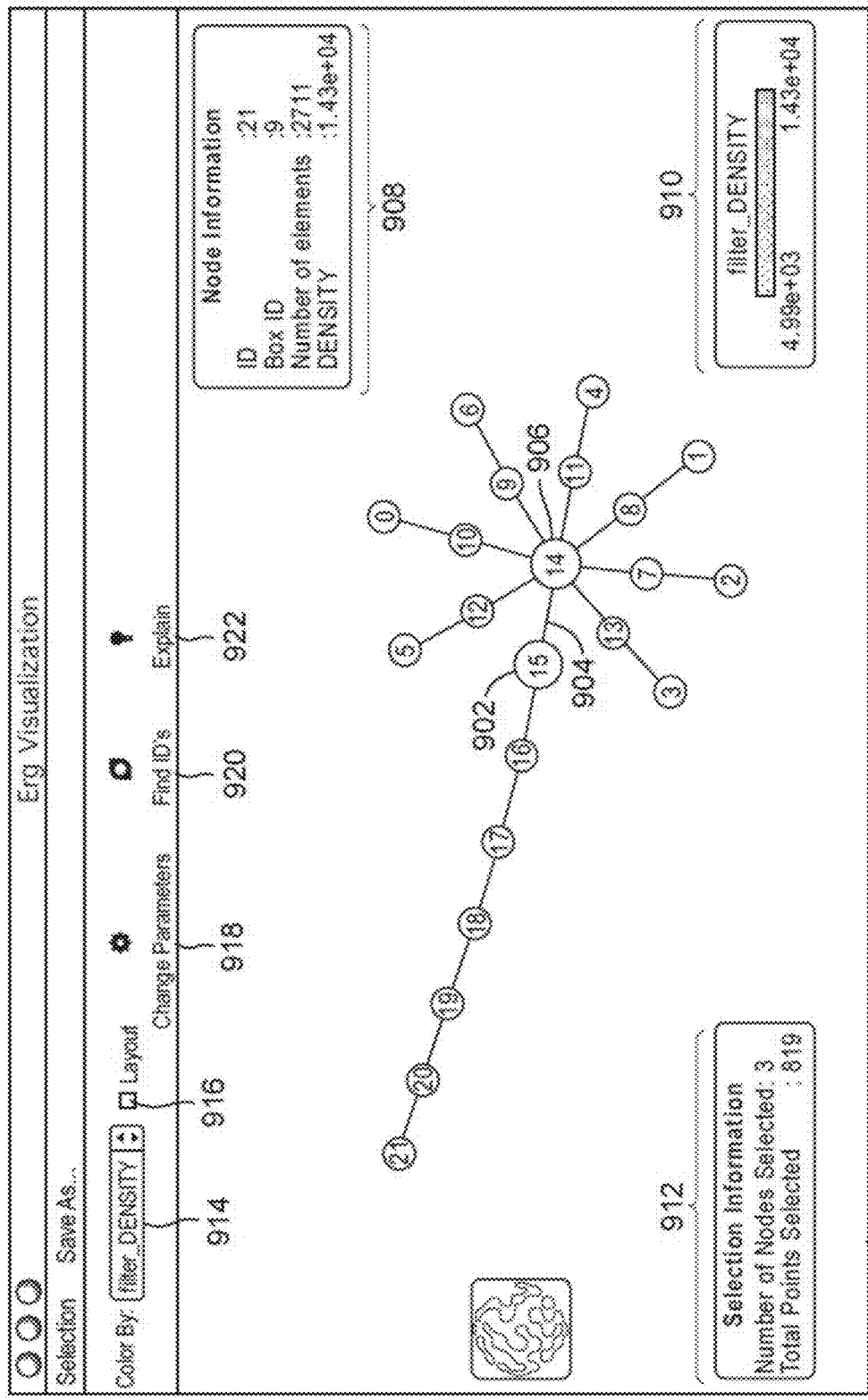
FIG. 9 is an example interactive visualization in some embodiments.
Figure 10:
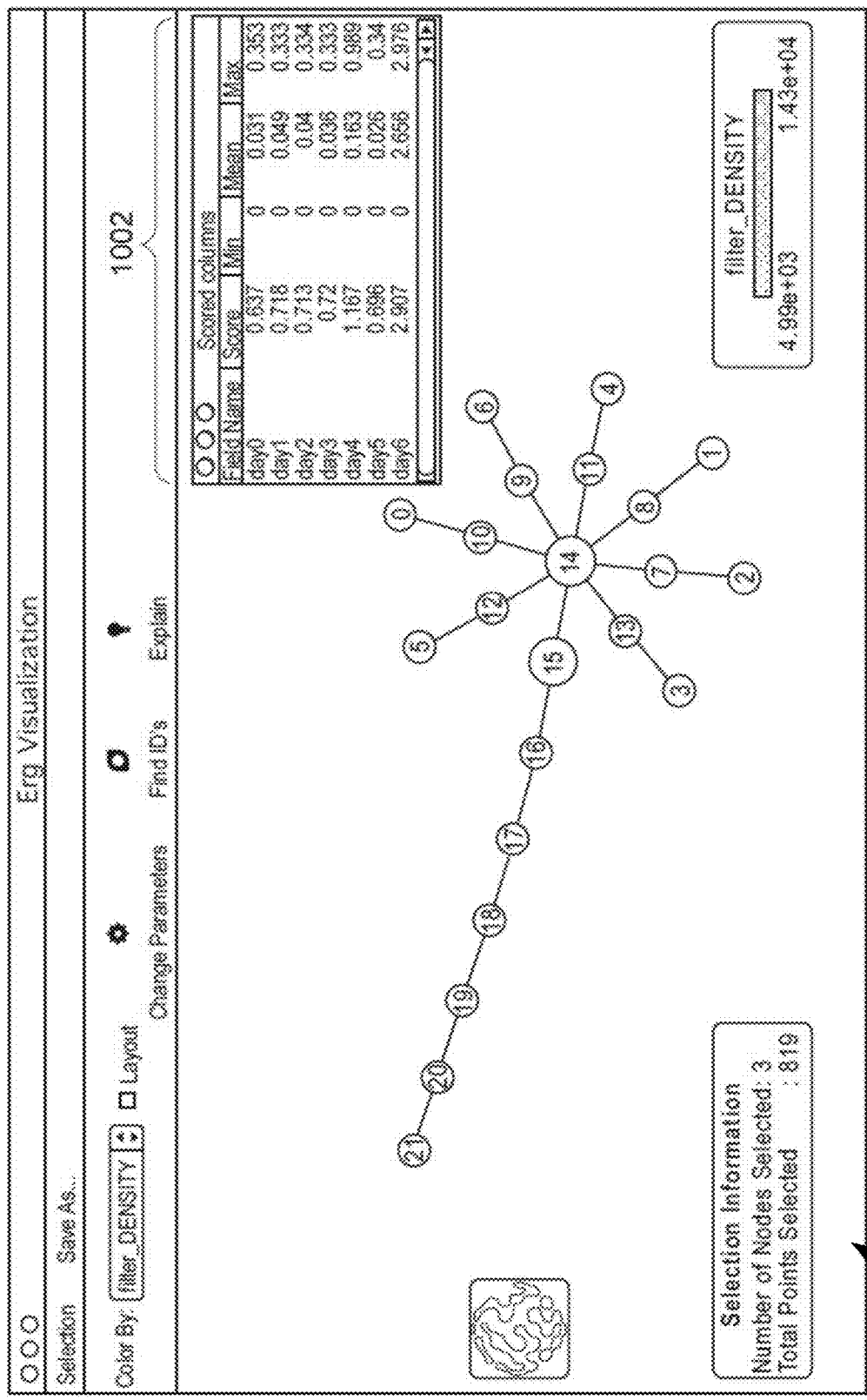
FIG. 10 is an example interactive visualization displaying an explain information window in some embodiments.

In step 816, the visualization engine 322 generates the interactive visualization of interconnected nodes (e.g., nodes and edges displayed in FIGS. 9 and 10).

It will be appreciated that it is possible, in some embodiments, to make sense in a fairly deep way of connections between various ref( ) maps and/or choices of clustering. Further, in addition to computing edges (pairs of nodes), the embodiments described herein may be extended to compute triples of nodes, etc. For example, the analysis module 320 may compute simplicial complexes of any dimension (by a variety of rules) on nodes, and apply techniques from homology theory to the graphs to help users understand a structure in an automatic (or semi-automatic) way.

Further, it will be appreciated that uniform intervals in the covering may not always be a good choice. For example, if the points are exponentially distributed with respect to a given filter, uniform intervals can fail—in such case adaptive interval sizing may yield uniformly-sized S(d) sets, for instance.

Further, in various embodiments, an interface may be used to encode techniques for incorporating third-party extensions to data access and display techniques. Further, an interface may be used to for third-party extensions to underlying infrastructure to allow for new methods for generating coverings, and defining new reference spaces.

FIG. 9 is an example interactive visualization 900 in some embodiments. The display of the interactive visualization may be considered a "graph" in the mathematical sense. The interactive visualization comprises of two types of objects: nodes (e.g., nodes 902 and 906) (which may be balls and may be colored) and the edges (e.g., edge 904) (the black lines). The edges connect pairs of nodes (e.g., edge 904 connects node 902 with node 906). As discussed herein, each node may represent a collection of data points (rows in the database identified by the user). In one example, connected nodes tend to include data points which are "similar to" (e.g., clustered with) each other. The collection of data points may be referred to as being "in the node." The interactive visualization may be two-dimensional, three-dimensional, or a combination of both.

In various embodiments, connected nodes and edges may form a graph or structure. There may be multiple graphs in the interactive visualization. In one example, the interactive visualization may display two or more unconnected structures of nodes and edges.

The visual properties of the nodes and edges (such as, but not limited to, color, stroke color, text, texture, shape, coordinates of the nodes on the screen) can encode any data based property of the data points within each node. For example, coloring of the nodes and/or the edges may indicate (but is not limited to) the following:

Values of fields or filters
Any general functions of the data in the nodes (e.g., if the data were unemployment rates by state, then GDP of the states may be identifiable by color the nodes)
Number of data points in the node The interactive visualization 900 may contain a "bar" 910 which may comprise a legend indicating patterns and/or coloring of the nodes (e.g., balls) and may also identify what the patterns and/or colors indicate. For example, in FIG. 9, bar 910 may indicate that color of some nodes is based on the density filter with blue (on the far left of the bar 910) indicating "4.99e+03" and red (on the far right of the bar 910) indicating "1.43e+04." In general this might be expanded to show any other legend by which nodes and/or edges are colored. It will be appreciated that, in some embodiments, the user may control the color as well as what the color (and/or stroke color, text, texture, shape, coordinates of the nodes on the screen) indicates.

The user may also drag and drop objects of the interactive visualization 900. In various embodiments, the user may reorient structures of nodes and edges by dragging one or more nodes to another portion of the interactive visualization (e.g., a window). In one example, the user may select node 902, hold node 902, and drag the node across the window. The node 902 will follow the user's cursor, dragging the structure of edges and/or nodes either directly or indirectly connected to the node 902. In some embodiments, the interactive visualization 900 may depict multiple unconnected structures. Each structure may include nodes, however, none of the nodes of either structure are connected to each other. If the user selects and drags a node of the first structure, only the first structure will be reoriented with respect to the user action. The other structure will remain unchanged. The user may wish to reorient the structure in order to view nodes, select nodes, and/or better understand the relationships of the underlying data.

In one example, a user may drag a node to reorient the interactive visualization (e.g., reorient the structure of nodes and edges). While the user selects and/or drags the node, the nodes of the structure associated with the selected node may move apart from each other in order to provide greater visibility. Once the user lets go (e.g., deselects or drops the node that was dragged), the nodes of the structure may continue to move apart from each other.

In various embodiments, once the visualization engine 322 generates the interactive display, the depicted structures may move by spreading out the nodes from each other. In one example, the nodes spread from each other slowly allowing the user to view nodes distinguish from each other as well as the edges. In some embodiments, the visualization engine 322 optimizes the spread of the nodes for the user's view. In one example, the structure(s) stop moving once an optimal view has been reached.

It will be appreciated that the interactive visualization 900 may respond to gestures (e.g., multi-touch), stylus, or other interactions allowing the user to reorient nodes and edges and/or interacting with the underlying data.

The interactive visualization 900 may also respond to user actions such as when the user drags, clicks, or hovers a mouse cursor over a node. In some embodiments, when the user selects a node or edge, node information or edge information may be displayed. In one example, when a node is selected (e.g., clicked on by a user with a mouse or a mouse cursor hovers over the node), a node information box 908 may appear that indicates information regarding the selected node. In this example, the node information box 908 indicates an ID, box ID, number of elements (e.g., data points associated with the node), and density of the data associated with the node.

The user may also select multiple nodes and/or edges by clicking separate on each object, or drawing a shape (such as a box) around the desired objects. Once the objects are selected, a selection information box 912 may display some information regarding the selection. For example, selection information box 912 indicates the number of nodes selected and the total points (e.g., data points or elements) of the selected nodes.

The interactive visualization 900 may also allow a user to further interact with the display. Color option 914 allows the user to display different information based on color of the objects. Color option 914 in FIG. 9 is set to filter Density, however, other filters may be chosen and the objects re-colored based on the selection. It will be appreciated that the objects may be colored based on any filter, property of data, or characterization. When a new option is chosen in the color option 914, the information and/or colors depicted in the color bar 910 may be updated to reflect the change.

Layout checkbox 916 may allow the user to anchor the interactive visualization 900. In one example, the layout checkbox 916 is checked indicating that the interactive visualization 900 is anchored. As a result, the user will not be able to select and drag the node and/or related structure. Although other functions may still be available, the layout checkbox 916 may help the user keep from accidentally moving and/or reorienting nodes, edges, and/or related structures. It will be appreciated the layout checkbox 916 may indicate that the interactive visualization 900 is anchored when the layout checkbox 916 is unchecked and that when the layout checkbox 916 is checked the interactive visualization 900 is no longer anchored.

The change parameters button 918 may allow a user to change the parameters (e.g., add/remove filters and/or change the resolution of one or more filters). In one example, when the change parameters button 918 is activated, the user may be directed back to the metric and filter selection interface window 600 (see FIG. 6) which allows the user to add or remove filters (or change the metric). The user may then view the filter parameter interface 700 (see FIG. 7) and change parameters (e.g., intervals and overlap) for one or more filters. The analysis module 320 may then re-analyze the data based on the changes and display a new interactive visualization 900 without again having to specify the data sets, filters, etc.

The find ID's button 920 may allow a user to search for data within the interactive visualization 900. In one example, the user may click the find ID's button 920 and receive a window allowing the user to identify data or identify a range of data. Data may be identified by ID or searching for the data based on properties of data and/or metadata. If data is found and selected, the interactive visualization 900 may highlight the nodes associated with the selected data. For example, selecting a single row or collection of rows of a database or spreadsheet may produce a highlighting of nodes whose corresponding partial cluster contains any element of that selection.

In various embodiments, the user may select one or more objects and click on the explain button 922 to receive in-depth information regarding the selection. In some embodiments, when the user selects the explain button 922, the information about the data from which the selection is based may be displayed. The function of the explain button 922 is further discussed herein (e.g., see discussion regarding FIG. 10).

In various embodiments, the interactive visualization 900 may allow the user to specify and identify subsets of interest, such as output filtering, to remove clusters or connections which are too small or otherwise uninteresting. Further, the interactive visualization 900 may provide more general coloring and display techniques, including, for example, allowing a user to highlight nodes based on a user-specified predicate, and coloring the nodes based on the intensity of user-specified weighting functions.

The interactive visualization 900 may comprise any number of menu items. The "Selection" menu may allow the following functions:
  Select singletons (select nodes which are not connected to other nodes)
  Select all (selects all the nodes and edges)
  Select all nodes (selects all nodes)
  Select all edges
  Clear selection (no selection)
  Invert Selection (selects the complementary set of nodes or edges)
  Select "small" nodes (allows the user to threshold nodes based on how many points they have)
  Select leaves (selects all nodes which are connected to long "chains" in the graph)
  Remove selected nodes
  Show in a table (shows the selected nodes and their associated data in a table)
  Save selected nodes (saves the selected data to whatever format the user chooses. This may allow the user to subset the data and create new data sources which may be used for further analysis.)

In one example of the "show in a table" option, information from a selection of nodes may be displayed. The information may be specific to the origin of the data. In various embodiments, elements of a database table may be listed, however, other methods specified by the user may also be included. For example, in the case of microarray data from gene expression data, heat maps may be used to view the results of the selections.

The interactive visualization 900 may comprise any number of menu items. The "Save" menu may allow may allow the user to save the whole output in a variety of different formats such as (but not limited to):
  Image files (PNG/JPG/PDF/SVG etc.)
  Binary output (The interactive output is saved in the binary format. The user may reopen this file at any time to get this interactive window again)

In some embodiments, graphs may be saved in a format such that the graphs may be used for presentations. This may include simply saving the image as a pdf or png file, but it may also mean saving an executable .xml file, which may permit other users to use the search and save capability to the database on the file without having to recreate the analysis.

In various embodiments, a relationship between a first and a second analysis output/interactive visualization for differing values of the interval length and overlap percentage may be displayed. The formal relationship between the first and second analysis output/interactive visualization may be that when one cover refines the next, there is a map of simplicial complexes from the output of the first to the output of the second. This can be displayed by applying a restricted form of a three-dimensional graph embedding algorithm, in which a graph is the union of the graphs for the various parameter values and in which the connections are the connections in the individual graphs as well as connections from one node to its image in the following graph. The constituent graphs may be placed in its own plane in 3D space. In some embodiments, there is a restriction that each constituent graph remain within its associated plane. Each constituent graph may be displayed individually, but a small change of parameter value may result in the visualization of the adjacent constituent graph. In some embodiments, nodes in the initial graph will move to nodes in the next graph, in a readily visualizable way.

FIG. 10 is an example interactive visualization 1000 displaying an explain information window 1002 in some embodiments. In various embodiments, the user may select a plurality of nodes and click on the explain button. When the explain button is clicked, the explain information window 1002 may be generated. The explain information window 1002 may identify the data associated with the selected object(s) as well as information (e.g., statistical information) associated with the data.

In some embodiments, the explain button allows the user to get a sense for which fields within the selected data fields are responsible for "similarity" of data in the selected nodes and the differentiating characteristics. There can be many ways of scoring the data fields. The explain information window 1002 (i.e., the scoring window in FIG. 10) is shown along with the selected nodes. The highest scoring fields may distinguish variables with respect to the rest of the data.

In one example, the explain information window 1002 indicates that data from fields day0-day6 has been selected. The minimum value of the data in all of the fields is 0. The explain information window 1002 also indicates the maximum values. For example, the maximum value of all of the data associated with the day0 field across all of the points of the selected nodes is 0.353. The average (i.e., mean) of all of the data associated with the day0 field across all of the points of the selected nodes is 0.031. The score may be a relative (e.g., normalized) value indicating the relative function of the filter; here, the score may indicate the relative density of the data associated with the day0 field across all of the points of the selected nodes. Those skilled in the art will appreciate that any information regarding the data and/or selected nodes may appear in the explain information window 1002.

It will be appreciated that the data and the interactive visualization 1000 may be interacted with in any number of ways. The user may interact with the data directly to see where the graph corresponds to the data, make changes to the analysis and view the changes in the graph, modify the graph and view changes to the data, or perform any kind of interaction.

Figure 11:
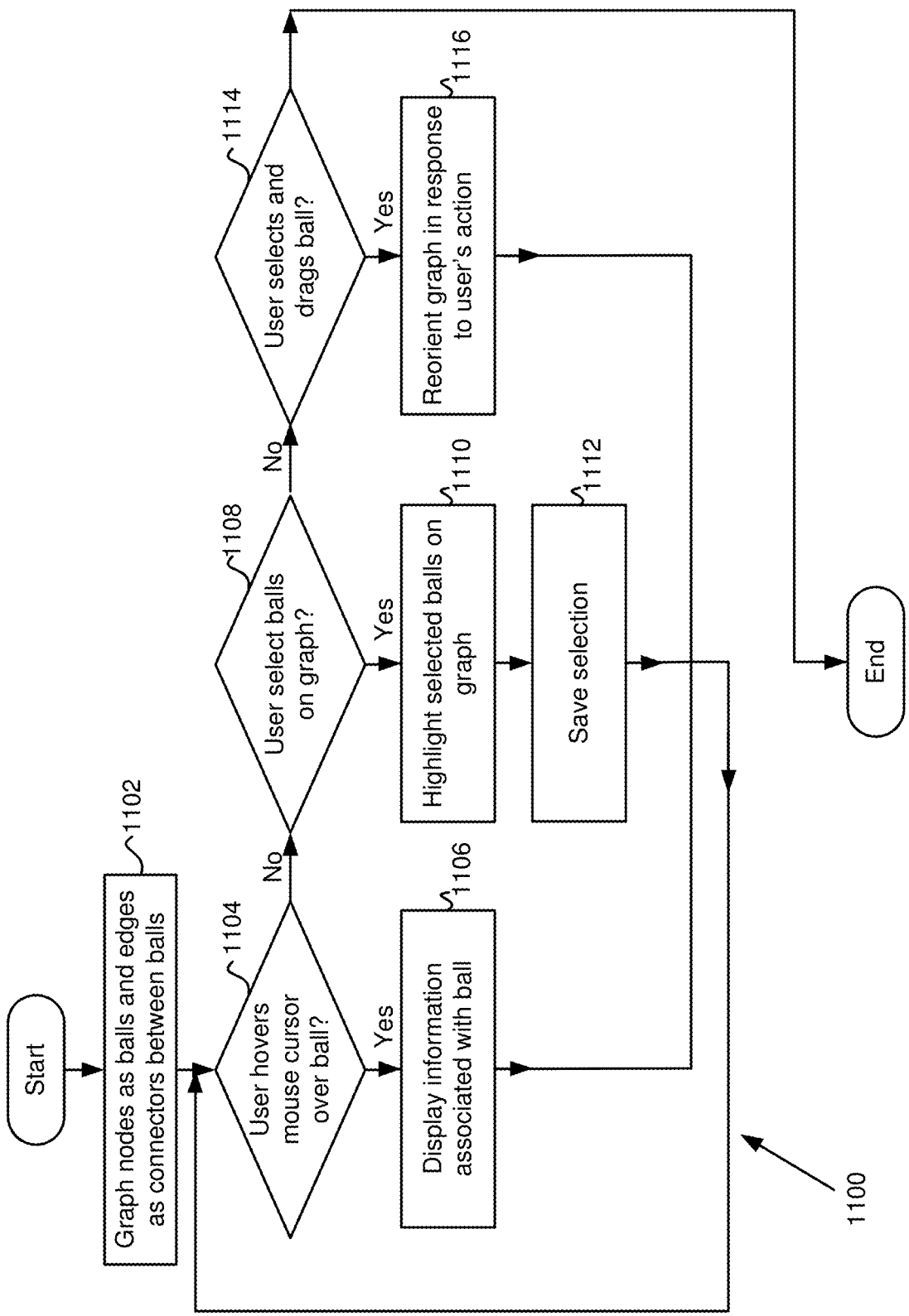
FIG. 11 is a flowchart of functionality of the interactive visualization in some embodiments.

FIG. 11 is a flowchart 1100 of functionality of the interactive visualization in some embodiments. In step 1102, the visualization engine 322 receives the analysis from the analysis module 320 and graphs nodes as balls and edges as connectors between balls 1202 to create interactive visualization 900 (see FIG. 9).

In step 1104, the visualization engine 322 determines if the user is hovering a mouse cursor over (or has selected) a ball (i.e., a node). If the user is hovering a mouse cursor over a ball or is selecting a ball, then information may be displayed regarding the data associated with the ball. In one example, the visualization engine 322 displays a node information window 908.

If the visualization engine 322 does not determine that the user is hovering a mouse cursor over (or has selected) a ball, then the visualization engine 322 determines if the user has selected balls on the graph (e.g., by clicking on a plurality of balls or drawing a box around a plurality of balls). If the user has selected a plurality of balls on the graph, the visualization engine 322 may highlight the selected balls on the graph in step 1110. The visualization engine 322 may also display information regarding the selection (e.g., by displaying a selection information window 912). The user may also click on the explain button 922 to receive more information associated with the selection (e.g., the visualization engine 322 may display the explain information window 1002).

In step 1112, the user may save the selection. For example, the visualization engine 322 may save the underlying data, selected metric, filters, and/or resolution. The user may then access the saved information and create a new structure in another interactive visualization 900 thereby allowing the user to focus attention on a subset of the data.

If the visualization engine 322 does not determine that the user has selected balls on the graph, the visualization engine 322 may determine if the user selects and drags a ball on the graph in step 1114. If the user selects and drags a ball on the graph, the visualization engine 322 may reorient the selected balls and any connected edges and balls based on the user's action in step 1116. The user may reorient all or part of the structure at any level of granularity.

It will be appreciated that although FIG. 11 discussed the user hovering over, selecting, and/or dragging a ball, the user may interact with any object in the interactive visualization 900 (e.g., the user may hover over, select, and/or drag an edge). The user may also zoom in or zoom out using the interactive visualization 900 to focus on all or a part of the structure (e.g., one or more balls and/or edges). Any number of actions and operations may be performed using the interactive visualization 900.

Further, although balls are discussed and depicted in FIGS. 9-11, it will be appreciated that the nodes may be any shape and appear as any kind of object. Further, although some embodiments described herein discuss an interactive visualization being generated based on the output of algebraic topology, the interactive visualization may be generated based on any kind of analysis and is not limited.

For years, researchers have been collecting huge amounts of data on breast cancer, yet we are still battling the disease. Complexity, rather than quantity, is one of the fundamental issues in extracting knowledge from data. A topological data exploration and visualization platform may assist the analysis and assessment of complex data. In various embodiments, a predictive and visual cancer map generated by the topological data exploration and visualization platform may assist physicians to determine treatment options.

In one example, a breast cancer map visualization may be generated based on the large amount of available information already generated by many researchers. Physicians may send biopsy data directly to a cloud-based server which may localize a new patient's data within the breast cancer map visualization. The breast cancer map visualization may be annotated (e.g., labeled) such that the physician may view outcomes of patients with similar profiles as well as different kinds of statistical information such as survival probabilities. Each new data point from a patient may be incorporated into the breast cancer map visualization to improve accuracy of the breast cancer map visualization over time.

Although the following examples are largely focused on cancer map visualizations, it will be appreciated that at least some of the embodiments described herein may apply to any biological condition and not be limited to cancer and/or disease. For example, some embodiments, may apply to different industries.

Figure 12:
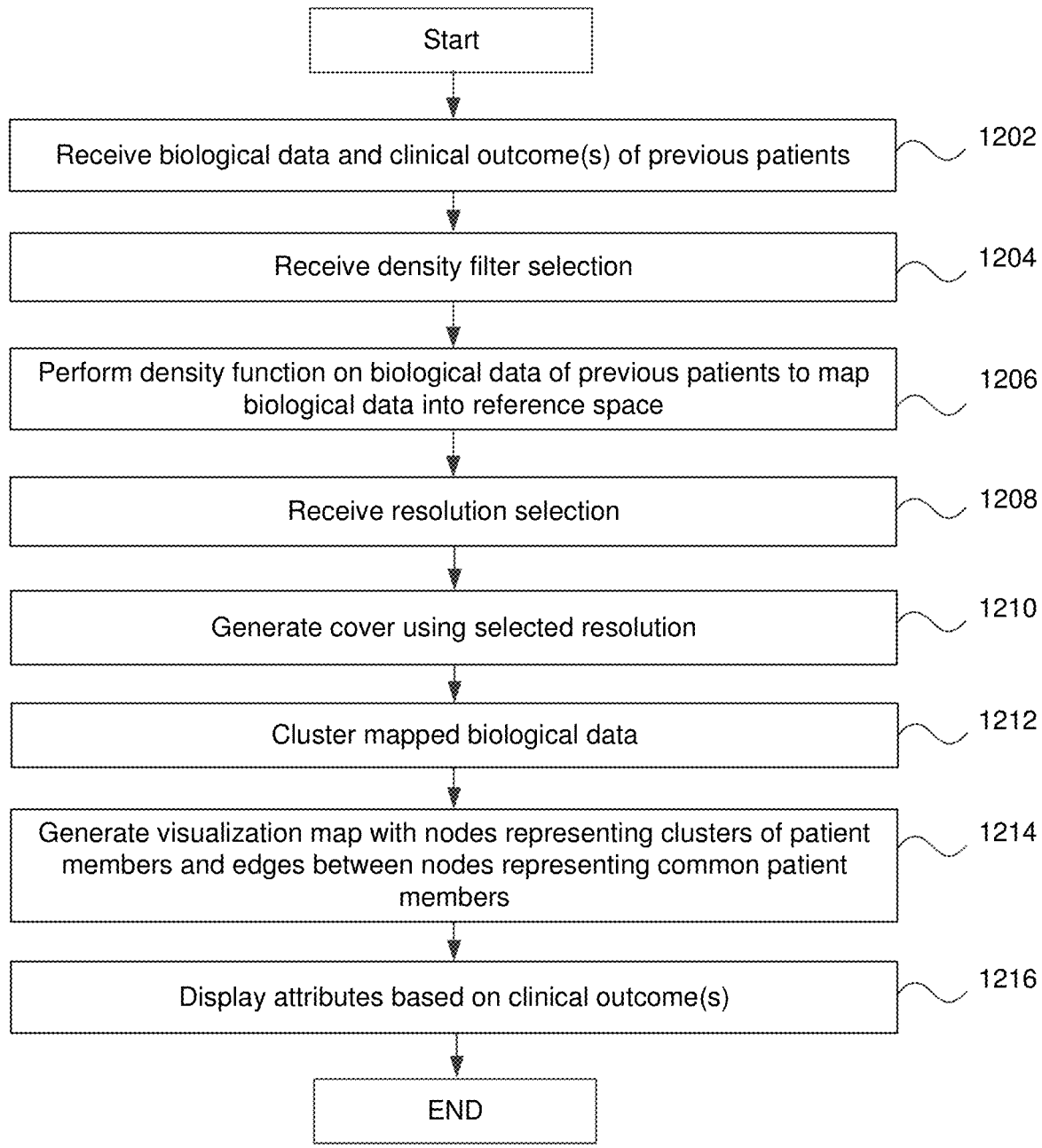
FIG. 12 is a flowchart of for generating a cancer map visualization utilizing biological data of a plurality of patients in some embodiments.

FIG. 12 is a flowchart for generating a cancer map visualization utilizing biological data of a plurality of patients in some embodiments. In various embodiments, the processing of data and user-specified options is motivated by techniques from topology and, in some embodiments, algebraic topology. As discussed herein, these techniques may be robust and general. In one example, these techniques apply to almost any kind of data for which some qualitative idea of "closeness" or "similarity" exists. It will be appreciated that the implementation of techniques described herein may apply to any level of generality.

In various embodiments, a cancer map visualization is generated using genomic data linked to clinical outcomes (i.e., medical characteristics) which may be used by physicians during diagnosis and/or treatment. Initially, publicly available data sets may be integrated to construct the topological map visualizations of patients (e.g., breast cancer patients). It will be appreciated that any private, public, or combination of private and public data sets may be integrated to construct the topological map visualizations. A map visualization may be based on biological data such as, but not limited to, gene expression, sequencing, and copy number variation. As such, the map visualization may comprise many patients with many different types of collected data. Unlike traditional methods of analysis where distinct studies of breast cancer appear as separate entities, the map visualization may fuse disparate data sets while utilizing many datasets and data types.

In various embodiments, a new patient may be localized on the map visualization. With the map visualization for subtypes of a particular disease and a new patient diagnosed with the disease, point(s) may be located among the data points used in computing the map visualization (e.g., nearest neighbor) which is closest to the new patient point. The new patient may be labeled with nodes in the map visualization containing the closest neighbor. These nodes may be highlighted to give a physician the location of the new patient among the patients in the reference data set. The highlighted nodes may also give the physician the location of the new patient relative to annotated disease subtypes.

The visualization map may be interactive and/or searchable in real-time thereby potentially enabling extended analysis and providing speedy insight into treatment.

In step 1202, biological data and clinical outcomes of previous patients may be received. The clinical outcomes may be medical characteristics. Biological data is any data that may represent a condition (e.g., a medical condition) of a person. Biological data may include any health related, medical, physical, physiological, pharmaceutical data associated with one or more patients. In one example, biological data may include measurements of gene expressions for any number of genes. In another example, biological data may include sequencing information (e.g., RNA sequencing).

In various embodiments, biological data for a plurality of patients may be publicly available. For example, various medical health facilities and/or public entities may provide gene expression data for a variety of patients. In addition to the biological data, information regarding any number of clinical outcomes, treatments, therapies, diagnoses and/or prognoses may also be provided. Those skilled in the art will appreciate that any kind of information may be provided in addition to the biological data.

The biological data, in one example, may be similar to data S as discussed with regard to step 802 of FIG. 8. The biological data may include ID fields that identify patients and data fields that are related to the biological information (e.g., gene expression measurements).

FIG. 13 is an example data structure 1300 including biological data 1304$a$-1304$y$ for a number of patients 1308$a$-1308$n$ that may be used to generate the cancer map visualization in some embodiments. Column 1302 represents different patient identifiers for different patients. The patient identifiers may be any identifier.

At least some biological data may be contained within gene expression measurements 1304$a$-1304$y$. In FIG. 13, "y" represents any number. For example, there may be 50,000 or more separate columns for different gene expressions related to a single patient or related to one or more samples from a patient. It will be appreciated that column 1304$a$ may represent a gene expression measurement for each patient (if any for some patients) associated with the patient identifiers in column 1302. The column 1304$b$ may represent a gene expression measurement of one or more genes that are different than that of column 1304$a$. As discussed, there may be any number of columns representing different gene expression measurements.

Column 1306 may include any number of clinical outcomes, prognoses, diagnoses, reactions, treatments, and/or any other information associated with each patient. All or some of the information contained in column 1306 may be displayed (e.g., by a label or an annotation that is displayed on the visualization or available to the user of the visualization via clicking) on or for the visualization.

Rows 1308$a$-1308$n$ each contains biological data associated with the patient identifier of the row. For example, gene expressions in row 1308$a$ are associated with patient identifier P1. As similarly discussed with regard to "y" herein, "n" represents any number. For example, there may be 100,000 or more separate rows for different patients.

It will be appreciated that there may be any number of data structures that contain any amount of biological data for any number of patients. The data structure(s) may be utilized to generate any number of map visualizations.

In step 1204, the analysis server may receive a filter selection. In some embodiments, the filter selection is a density estimation function. It will be appreciated that the filter selection may include a selection of one or more functions to generate a reference space.

In step 1206, the analysis server performs the selected filter(s) on the biological data of the previous patients to map the biological data into a reference space. In one example, a density estimation function, which is well known in the art, may be performed on the biological data (e.g., data associated with gene expression measurement data 1304$a$-1304$y$) to relate each patient identifier to one or more locations in the reference space (e.g., on a real line).

In step 1208, the analysis server may receive a resolution selection. The resolution may be utilized to identify overlapping portions of the reference space (e.g., a cover of the reference space R) in step 1210.

As discussed herein, the cover of R may be a finite collection of open sets (in the metric of R) such that every point in R lies in at least one of these sets. In various examples, R is k-dimensional Euclidean space, where k is the number of filter functions. Those skilled in the art will appreciate that the cover of the reference space R may be controlled by the number of intervals and the overlap identified in the resolution (e.g., see FIG. 7). For example, the more intervals, the finer the resolution in S (e.g., the similarity space of the received biological data)—that is, the fewer points in each S(d), but the more similar (with respect to the filters) these points may be. The greater the overlap, the more times that clusters in S(d) may intersect clusters in S(e)—this means that more "relationships" between points may appear, but, in some embodiments, the greater the overlap, the more likely that accidental relationships may appear.

In step 1212, the analysis server receives a metric to cluster the information of the cover in the reference space to partition S(d). In one example, the metric may be a Pearson Correlation. The clusters may form the groupings (e.g., nodes or balls). Various cluster means may be used including, but not limited to, a single linkage, average linkage, complete linkage, or k-means method.

As discussed herein, in some embodiments, the analysis module 320 may not cluster two points unless filter values are sufficiently "related" (recall that while normally related may mean "close," the cover may impose a much more general relationship on the filter values, such as relating two points s and t if ref(s) and ref(t) are sufficiently close to the same circle in the plane where ref( ) represents one or more filter functions). The output may be a simplicial complex, from which one can extract its 1-skeleton. The nodes of the complex may be partial clusters, (i.e., clusters constructed from subsets of S specified as the preimages of sets in the given covering of the reference space R).

In step 1214, the analysis server may generate the visualization map with nodes representing clusters of patient members and edges between nodes representing common patient members. In one example, the analysis server identifies nodes which are associated with a subset of the partition elements of all of the S(d) for generating an interactive visualization.

As discussed herein, for example, suppose that S={1, 2, 3, 4}, and the cover is $C_1$, $C_2$, $C_3$. Suppose cover $C_1$ contains {1, 4}, $C_2$ contains {1,2}, and $C_3$ contains {1,2,3,4}. If 1 and 2 are close enough to be clustered, and 3 and 4 are, but nothing else, then the clustering for S(1) may be {1}, {4}, and for S(2) it may be {1,2}, and for S(3) it may be {1,2}, {3,4}. So the generated graph has, in this example, at most four nodes, given by the sets {1}, {4}, {1, 2}, and {3, 4} (note that {1, 2} appears in two different clusterings). Of the sets of points that are used, two nodes intersect provided that the associated node sets have a non-empty intersection (although this could easily be modified to allow users to require that the intersection is "large enough" either in absolute or relative terms).

As a result of clustering, member patients of a grouping may share biological similarities (e.g., similarities based on the biological data).

The analysis server may join clusters to identify edges (e.g., connecting lines between nodes). Clusters joined by edges (i.e., interconnections) share one or more member patients. In step 1216, a display may display a visualization map with attributes based on the clinical outcomes contained in the data structures (e.g., see FIG. 13 regarding clinical outcomes). Any labels or annotations may be utilized based on information contained in the data structures. For example, treatments, prognoses, therapies, diagnoses, and the like may be used to label the visualization. In some embodiments, the physician or other user of the map visualization accesses the annotations or labels by interacting with the map visualization.

The resulting cancer map visualization may reveal interactions and relationships that were obscured, untested, and/or previously not recognized.

Figure 14:
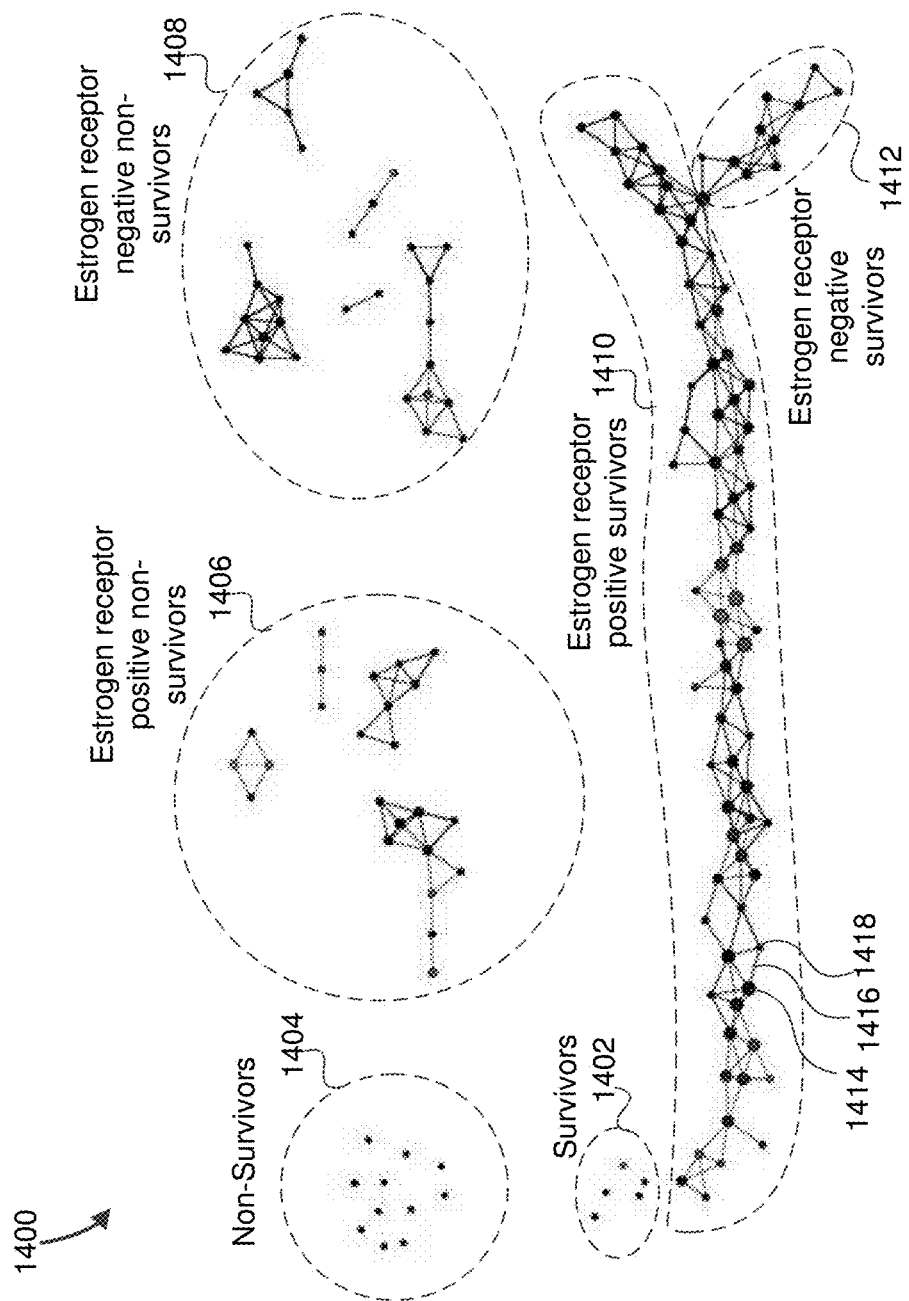
FIG. 14 is an example visualization displaying the cancer map in some embodiments.

FIG. 14 is an example visualization displaying the cancer map visualization 1400 in some embodiments. The cancer map visualization 1400 represents a topological network of cancer patients. The cancer map visualization 1400 may be based on publicly and/or privately available data.

In various embodiments, the cancer map visualization 1400 is created using gene expression profiles of excised tumors. Each node (i.e., ball or grouping displayed in the map visualization 1400) contains a subset of patients with similar genetic profiles.

As discussed herein, one or more patients (i.e., patient members of each node or grouping) may occur in multiple nodes. A patient may share a similar genetic profile with multiple nodes or multiple groupings. In one example, of 50,000 different gene expressions of the biological data, multiple patients may share a different genetic profiles (e.g., based on different gene expression combinations) with different groupings. When a patient shares a similar genetic profile with different groupings or nodes, the patient may be included within the groupings or nodes.

The cancer map visualization 1400 comprises groupings and interconnections that are associated with different clinical outcomes. All or some of the clinical outcomes may be associated with the biological data that generated the cancer map visualization 1400. The cancer map visualization 1400 includes groupings associated with survivors 1402 and groupings associated with non-survivors 1404. The cancer map visualization 1400 also includes different groupings associated with estrogen receptor positive non-survivors 1406, estrogen receptor negative non-survivors 1408, estrogen receptor positive survivors 1410, and estrogen receptor negative survivors 1412.

In various embodiments, when one or more patients are members of two or more different nodes, the nodes are interconnected by an edge (e.g., a line or interconnection). If there is not an edge between the two nodes, then there are no common member patients between the two nodes. For example, grouping 1414 shares at least one common member patient with grouping 1418. The intersection of the two groupings is represented by edge 1416. As discussed herein, the number of shared member patients of the two groupings may be represented in any number of ways including color of the interconnection, color of the groupings, size of the interconnection, size of the groupings, animations of the interconnection, animations of the groupings, brightness, or the like. In some embodiments, the number and/or identifiers of shared member patients of the two groupings may be available if the user interacts with the groupings 1414 and/or 1418 (e.g., draws a box around the two groupings and the interconnection utilizing an input device such as a mouse).

In various embodiments, a physician, on obtaining some data on a breast tumor, direct the data to an analysis server (e.g., analysis server 208 over a network such as the Internet) which may localize the patient relative to one or more groupings on the cancer map visualization 1400. The context of the cancer map visualization 1400 may enable the physician to assess various possible outcomes (e.g., proximity of representation of new patient to the different associations of clinical outcomes).

Figure 15:
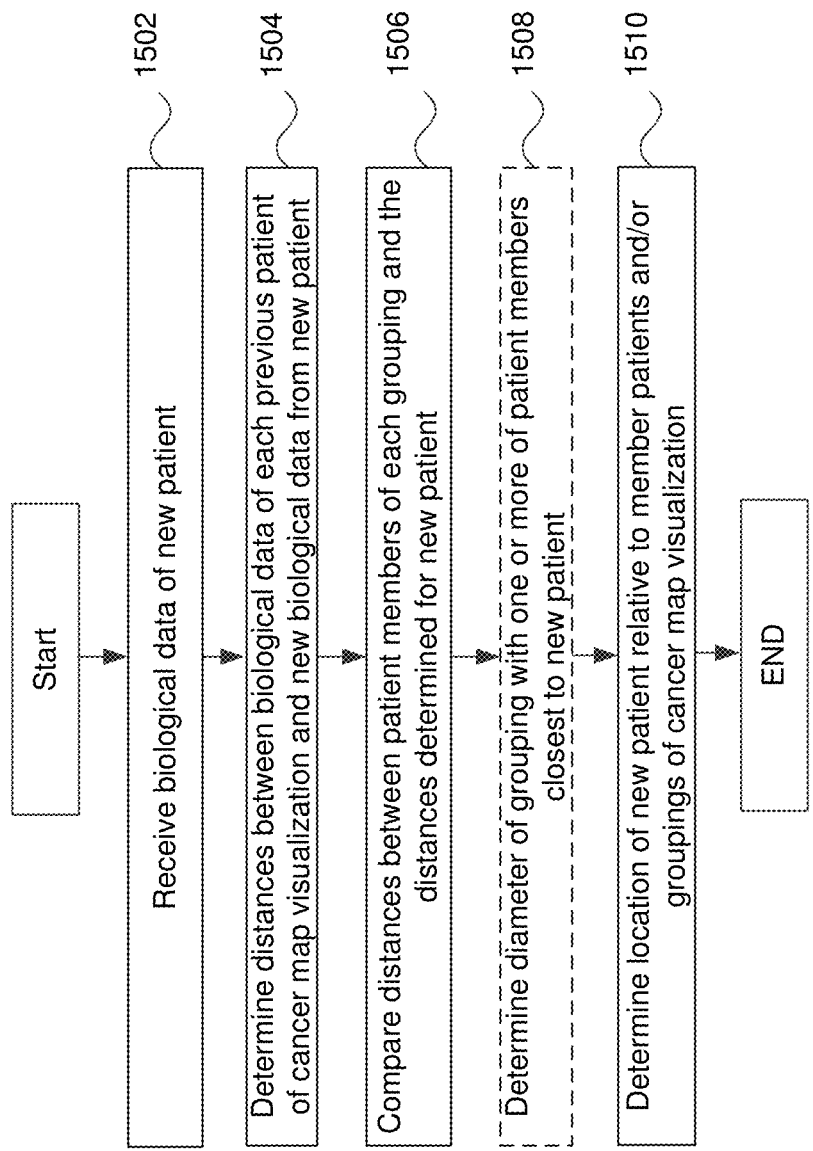
FIG. 15 is a flowchart of for positioning new patient data relative to the cancer map visualization in some embodiments.

FIG. 15 is a flowchart of for positioning new patient data relative to a cancer map visualization in some embodiments. In step 1502, new biological data of a new patient is received. In various embodiments, an input module 314 of an analysis server (e.g., analysis server 208 of FIGS. 1 and 2) may receive biological data of a new patient from a physician or medical facility that performed analysis of one or more samples to generate the biological data. The biological data may be any data that represents a biological data of the new patient including, for example, gene expressions, sequencing information, or the like.

In some embodiments, the analysis server 208 may comprise a new patient distance module and a location engine. In step 1504, the new patient distance module determines distances between the biological data of each patient of the cancer map visualization 1600 and the new biological data from the new patient. For example, the previous biological data that was utilized in the generation of the cancer map visualization 1600 may be stored in mapped data structures. Distances may be determined between the new biological data of the new patient and each of the previous patient's biological data in the mapped data structure.

It will be appreciated that distances may be determined in any number of ways using any number of different metrics or functions. Distances may be determined between the biological data of the previous patients and the new patients. For example, a distance may be determined between a first gene expression measurement of the new patient and each (or a subset) of the first gene expression measurements of the previous patients (e.g., the distance between G1 of the new patient and G1 of each previous patient may be calculated). Distances may be determined between all (or a subset of) other gene expression measurements of the new patient to the gene expression measurements of the previous patients.

In various embodiments, a location of the new patient on the cancer map visualization 1600 may be determined relative to the other member patients utilizing the determined distances.

In step 1506, the new patient distance module may compare distances between the patient members of each grouping to the distances determined for the new patient. The new patient may be located in the grouping of patient members that are closest in distance to the new patient. In some embodiments, the new patient location may be determined to be within a grouping that contains the one or more patient members that are closest to the new patient (even if other members of the grouping have longer distances with the new patient). In some embodiments, this step is optional.

In various embodiments, a representative patient member may be determined for each grouping. For example, some or all of the patient members of a grouping may be averaged or otherwise combined to generate a representative patient member of the grouping (e.g., the distances and/or biological data of the patient members may be averaged or aggregated). Distances may be determined between the new patient biological data and the averaged or combined biological data of one or more representative patient members of one or more groupings. The location engine may determine the location of the new patient based on the distances. In some embodiments, once the closest distance between the new patient and the representative patient member is found, distances may be determined between the new patient and the individual patient members of the grouping associated with the closest representative patient member.

In optional step 1508, a diameter of the grouping with the one or more of the patient members that are closest to the new patient (based on the determined distances) may be determined. In one example, the diameters of the groupings of patient members closest to the new patient are calculated. The diameter of the grouping may be a distance between two patient members who are the farthest from each other when compared to the distances between all patient members of the grouping. If the distance between the new patient and the closest patient member of the grouping is less than the diameter of the grouping, the new patient may be located within the grouping. If the distance between the new patient and the closest patient member of the grouping is greater than the diameter of the grouping, the new patient may be outside the grouping (e.g., a new grouping may be displayed on the cancer map visualization with the new patient as the single patient member of the grouping). If the distance between the new patient and the closest patient member of the grouping is equal to the diameter of the grouping, the new patient may be placed within or outside the grouping.

It will be appreciated that the determination of the diameter of the grouping is not required in determining whether the new patient location is within or outside of a grouping. In various embodiments, a distribution of distances between member patients and between member patients and the new patient is determined. The decision to locate the new patient within or outside of the grouping may be based on the distribution. For example, if there is a gap in the distribution of distances, the new patient may be separated from the grouping (e.g., as a new grouping). In some embodiments, if the gap is greater than a preexisting threshold (e.g., established by the physician, other user, or previously programmed), the new patient may be placed in a new grouping that is placed relative to the grouping of the closest member patients. The process of calculating the distribution of distances of candidate member patients to determine whether there may be two or more groupings may be utilized in generation of the cancer map visualization further described herein (e.g., in the process as described with regard to FIG. 12). It will be appreciated that there may be any number of ways to determine whether a new patient should be included within a grouping of other patient members.

In step 1510, the location engine determines the location of the new patient relative to the member patients and/or groupings of the cancer map visualization. The new location may be relative to the determined distances between the new patient and the previous patients. The location of the new patient may be part of a previously existing grouping or may form a new grouping.

In some embodiments, the location of the new patient with regard to the cancer map visualization may be performed locally to the physician. For example, the cancer map visualization 1400 may be provided to the physician (e.g., via a digital device). The physician may load the new patient's biological data locally and the distances may be determined locally or via a cloud-based server. The location(s) associated with the new patient may be overlaid on the previously existing cancer map visualization either locally or remotely.

It will be appreciated that, in some embodiments, the previous state of the cancer map visualization (e.g., cancer map visualization 1400) may be retained or otherwise stored and a new cancer map visualization generated utilizing the new patient biological data (e.g., in a method similar to that discussed with regard to FIG. 12). The newly generated map may be compared to the previous state and the differences may be highlighted thereby, in some embodiments, highlighting the location(s) associated with the new patient. In this way, distances may be not be calculated as described with regard to FIG. 15, but rather, the process may be similar to that as previously discussed.

Figure 16:
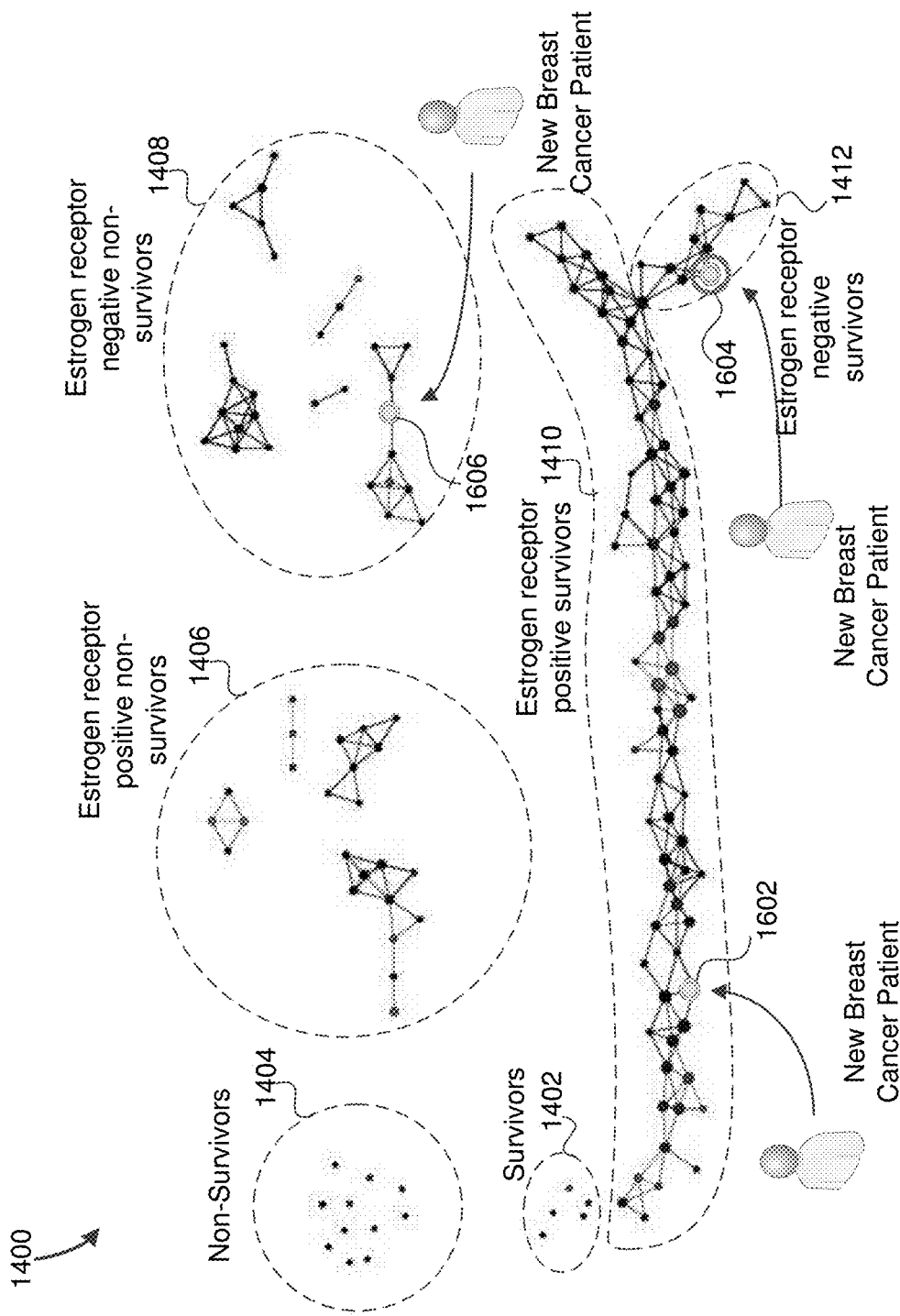
FIG. 16 is an example visualization displaying the cancer map including positions for three new cancer patients in some embodiments.

FIG. 16 is an example visualization displaying the cancer map including positions for three new cancer patients in some embodiments. The cancer map visualization 1400 comprises groupings and interconnections that are associated with different clinical outcomes as discussed with regard to FIG. 14. All or some of the clinical outcomes may be associated with the biological data that generated the cancer map visualization 1400. The cancer map visualization 1400 includes different groupings associated with survivors 1402, groupings associated with non-survivors 1404, estrogen receptor positive non-survivors 1406, estrogen receptor negative non-survivors 1408, estrogen receptor positive survivors 1410, and estrogen receptor negative survivors 1412.

The cancer map visualization 1400 includes three locations for three new breast cancer patients. The breast cancer patient location 1602 is associated with the clinical outcome of estrogen receptor positive survivors. The breast cancer patient location 1604 is associated with the clinical outcome of estrogen receptor negative survivors. Unfortunately, breast cancer patient location 1606 is associated with estrogen receptor negative non-survivors. Based on the locations, a physician may consider different diagnoses, prognoses, treatments, and therapies to maintain or attempt to move the breast cancer patient to a different location utilizing the cancer map visualization 1400.

In some embodiments, the physician may assess the underlying biological data associated with any number of member patients of any number of groupings to better understand the genetic similarities and/or dissimilarities. The physician may utilize the information to make better informed decisions.

The patient location 1604 is highlighted on the cancer map visualization 1400 as active (e.g., selected by the physician). It will be appreciated that the different locations may be of any color, size, brightness, and/or animated to highlight the desired location(s) for the physician. Further, although only one location is identified for three different breast cancer patients, any of the breast cancer patients may have multiple locations indicating different genetic similarities.

It will be appreciated that the cancer map visualization 1400 may be updated with new information at any time. As such, as new patients are added to the cancer map visualization 1400, the new data updates the visualization such that as future patients are placed in the map, the map may already include the updated information. As new information and/or new patient data is added to the cancer map visualization 1400, the cancer map visualization 1400 may improve as a tool to better inform physicians or other medical professionals.

In various embodiments, the cancer map visualization 1400 may track changes in patients over time. For example, updates to a new patient may be visually tracked as changes in are measured in the new patient's biological data. In some embodiments, previous patient data is similarly tracked which may be used to determine similarities of changes based on condition, treatment, and/or therapies, for example. In various embodiments, velocity of change and/or acceleration of change of any number of patients may be tracked over time using or as depicted on the cancer map visualization 1400. Such depictions may assist the treating physician or other personnel related to the treating physician to better understand changes in the patient and provide improved, current, and/or updated diagnoses, prognoses, treatments, and/or therapies.

Figure 17:
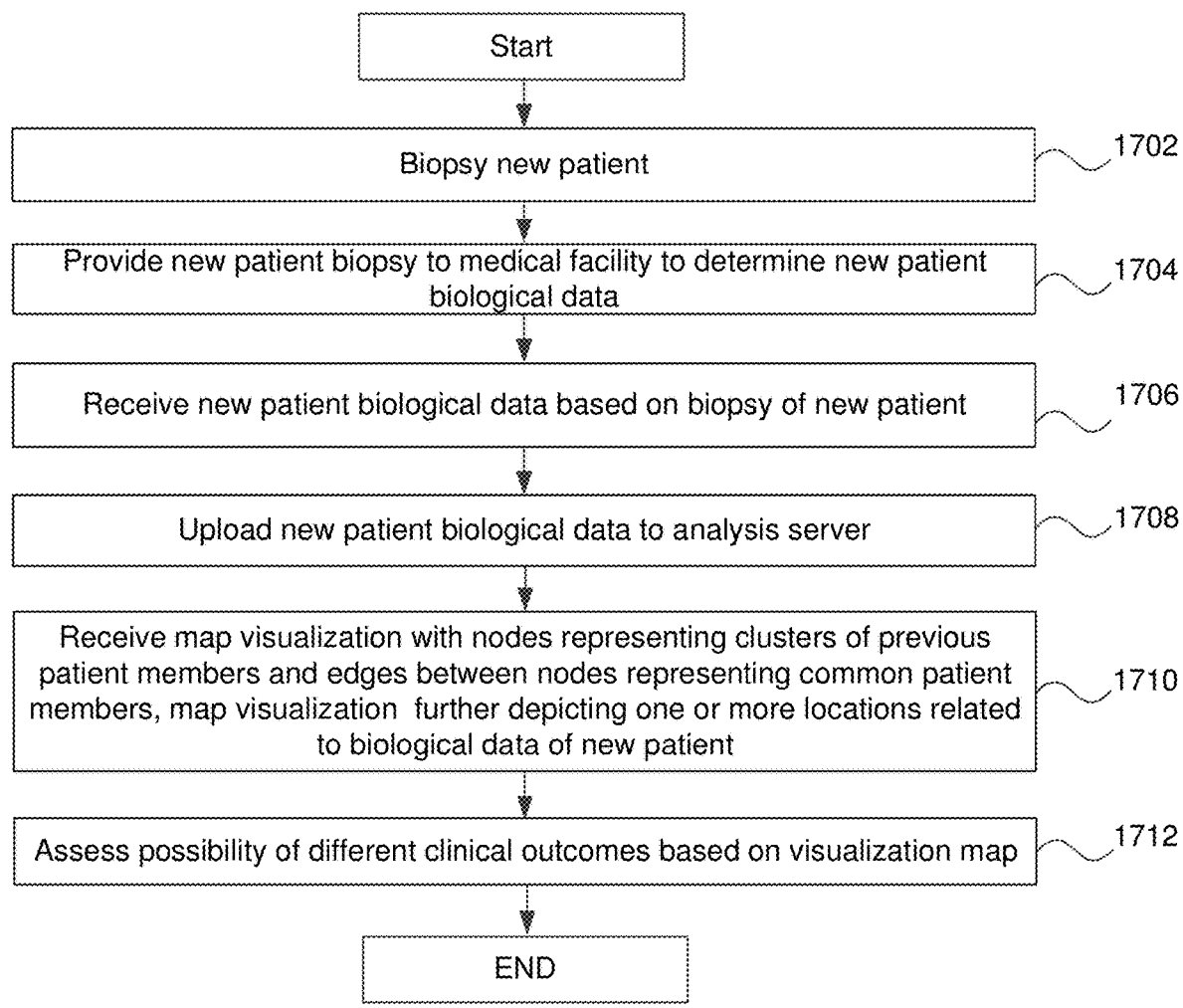
FIG. 17 is a flowchart of utilization the visualization and positioning of new patient data in some embodiments.

FIG. 17 is a flowchart of utilization the visualization and positioning of new patient data in some embodiments. In various embodiments, a physician may collect amounts of genomic information from tumors removed from a new patient, input the data (e.g., upload the data to an analysis server), and receive a map visualization with a location of the new patient. The new patient's location within the map may offer the physician new information about the similarities to other patients. In some embodiments, the map visualization may be annotated so that the physician may check the outcomes of previous patients in a given region of the map visualization are distributed and then use the information to assist in decision-making for diagnosis, treatment, prognosis, and/or therapy.

In step 1702, a medical professional or other personnel may remove a sample from a patient. The sample may be of a tumor, blood, or any other biological material. In one example, a medical professional performs a tumor excision. Any number of samples may be taken from a patient.

In step 1704, the sample(s) may be provided to a medical facility to determine new patient biological data. In one example, the medical facility measures genomic data such as gene expression of a number of genes or protein levels.

In step 1706, the medical professional or other entity associated with the medical professional may receive the new patient biological data based on the sample(s) from the new patient. In one example, a physician may receive the new patient biological data. The physician may provide all or some of the new patient biological data to an analysis server over the Internet (e.g., the analysis server may be a cloud-based server). In some embodiments, the analysis server is the analysis server 208 of FIG. 2. In some embodiments, the medical facility that determines the new patient biological data provides the biological data in an electronic format which may be uploaded to the analysis server. In some embodiments, the medical facility that determines the new patient biological data (e.g., the medical facility that measures the genomic data) provide the biological data to the analysis server at the request of the physician or others associated with the physician. It will be appreciated that the biological data may be provided to the analysis server in any number of ways.

The analysis server may be any digital device and may not be limited to a digital device on a network. In some embodiments, the physician may have access to the digital device. For example, the analysis server may be a table, personal computer, local server, or any other digital device.

Once the analysis server receives the biological data of the new patient (e.g., the new patient biological data may be uploaded to the analysis serer in step 1708), the new patient may be localized in the map visualization and the information may be sent back to the physician in step 1710. The visualization may be a map with nodes representing clusters of previous patient members and edges between nodes representing common patient members. The visualization may further depict one or more locations related to the biological data of the new patient.

The map visualization may be provided to the physician or other associated with the physician in real-time. For example, once the biological data associated with the new patient is provided to the analysis server, the analysis server may provide the map visualization back to the physician or other associated with the physician within a reasonably short time (e.g., within seconds or minutes). In some embodiments, the physician may receive the map visualization over any time.

The map visualization may be provided to the physician in any number of ways. For example, the physician may receive the map visualization over any digital device such as, but not limited to, an office computer, iPad, tablet device, media device, smartphone, e-reader, or laptop.

In step 1712, the physician may assess possible different clinical outcomes based on the map visualization. In one example, the map-aided physician may make decisions on therapy and treatments depending on where the patient lands on the visualization (e.g., survivor or non-survivor). The map visualization may include annotations or labels that identify one or more sets of groupings and interconnections as being associated with one or more clinical outcomes. The physician may assess possible clinical outcomes based on the position(s) on the map associated with the new patient.

Figure 18:
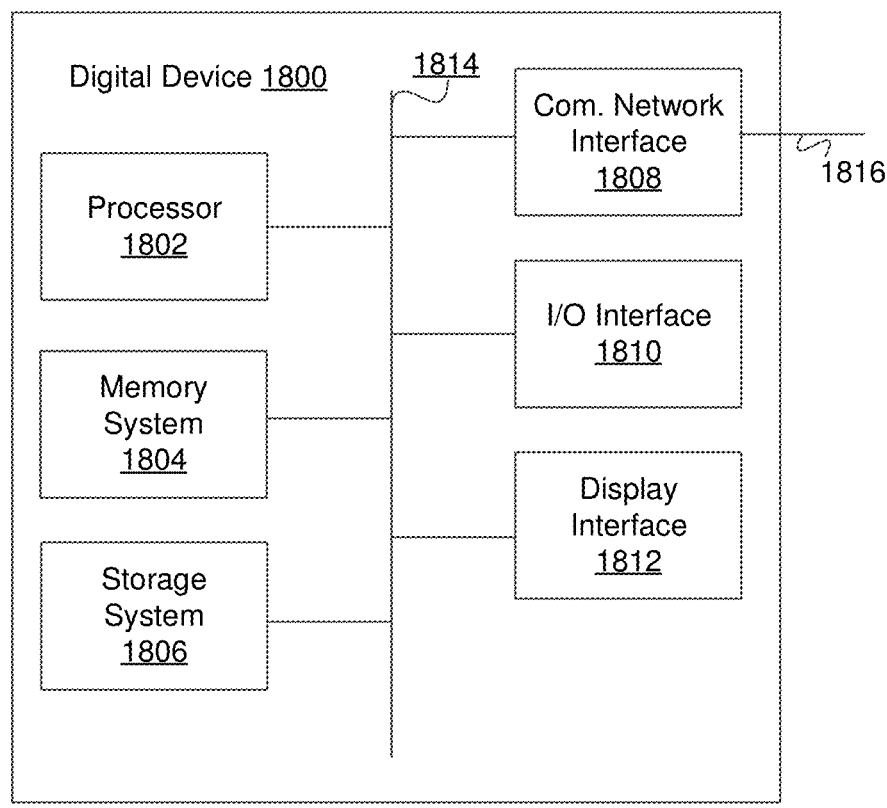
FIG. 18 is an example digital device in some embodiments.

FIG. 18 is a block diagram of an exemplary digital device 1800. The digital device 1800 comprises a processor 1802, a memory system 1804, a storage system 1806, a communication network interface 1808, an I/O interface 1810, and a display interface 1812 communicatively coupled to a bus 1814. The processor 1802 may be configured to execute executable instructions (e.g., programs). In some embodiments, the processor 1802 comprises circuitry or any processor capable of processing the executable instructions.

The memory system 1804 is any memory configured to store data. Some examples of the memory system 1804 are storage devices, such as RAM or ROM. The memory system 1804 can comprise the ram cache. In various embodiments, data is stored within the memory system 1804. The data within the memory system 1804 may be cleared or ultimately transferred to the storage system 1806.

The storage system 1806 is any storage configured to retrieve and store data. Some examples of the storage system 1806 are flash drives, hard drives, optical drives, and/or magnetic tape. In some embodiments, the digital device 1800 includes a memory system 1804 in the form of RAM and a storage system 1806 in the form of flash data. Both the memory system 1804 and the storage system 1806 comprise computer readable media which may store instructions or programs that are executable by a computer processor including the processor 1802.

The communication network interface (com. network interface) 1808 can be coupled to a data network (e.g., communication network 204) via the link 1816. The communication network interface 1808 may support communication over an Ethernet connection, a serial connection, a parallel connection, or an ATA connection, for example. The communication network interface 1808 may also support wireless communication (e.g., 1802.11 a/b/g/n, WiMAX). It will be apparent to those skilled in the art that the communication network interface 1808 can support many wired and wireless standards.

The optional input/output (I/O) interface 1810 is any device that receives input from the user and output data. The optional display interface 1812 is any device that may be configured to output graphics and data to a display. In one example, the display interface 1812 is a graphics adapter.

It will be appreciated that the hardware elements of the digital device 1800 are not limited to those depicted in FIG. 18. A digital device 1800 may comprise more or less hardware elements than those depicted. Further, hardware elements may share functionality and still be within various embodiments described herein. In one example, encoding and/or decoding may be performed by the processor 1802 and/or a co-processor located on a GPU.

Enterprise data warehouses dominate the data analytics space. Many companies maintain an internal data warehouse and OLAP engine for data analytics. Similarly, many companies maintain an external data warehouse and/or a combination of external and internal systems. Utilizing data analytics on data included in one or more data warehouses, however, often requires a deep understanding about the data model and knowledge of a desired query in advance.

In various embodiments, TDA may be applied to data contained in any number of data warehouses to extract insights from data without a predetermined hypothesis. Leveraging TDA to find insights in the enterprise data warehouse provides enormous value to enterprises. In some embodiments, TDA is utilized with any number of enterprise data warehouse(s) to enable advance machine learning and/or artificial intelligence to extract insights from the data.

An enterprise data warehouse may use a star schema as the data model. The star schema is composed of a fact table and multiple related dimension tables. In one example of a fact table, the fact table may store transactional data from an OLTP database and each record in the fact table may include event information (e.g., information regarding an event such as a visit with a health care professional or transaction). Dimension tables that include information regarding a time dimension, region dimension, and/or the like, may connect to the fact table with referential constraints. A user may query the fact table by any dimension or combination of dimensions. The OLAP engine may be used to generate a cube model that generates complex queries.

By combining information, such as insights, from TDA analytics on information contained in the data warehouse(s), understanding and insights may be improved beyond traditional data analytic approaches (e.g., predetermined queries). In various embodiments discussed herein, TDA may be performed on data from the enterprise data warehouse as a data source. Running TDA on at least some data from the fact table and/or information from one or more related dimension tables can effectively group events (e.g., records or information contained in records) based on attributes. These groups (e.g., segments) may be added as one or more dimension(s) and may provide enterprises insights about the transactions (e.g., by identifying common attributes for the best selling products).

Further, TDA can be run on a fact table joining the dimension table. For instance, a user may initially issue queries (e.g., select sales data from fact table where time in range a to b from dimension table), and then run TDA on the data returned from the query to extract insights for just that time frame.

In some embodiments, a user can run statistical explains on the fact table to identify dominating attributes (e.g., distinguishing dimensions of a group or segment) for a certain fact, and those attributes can also be added as another dimension in their data warehouse. For instance, the user can find out the significant attributes leading to the best selling product.

Figure 19:
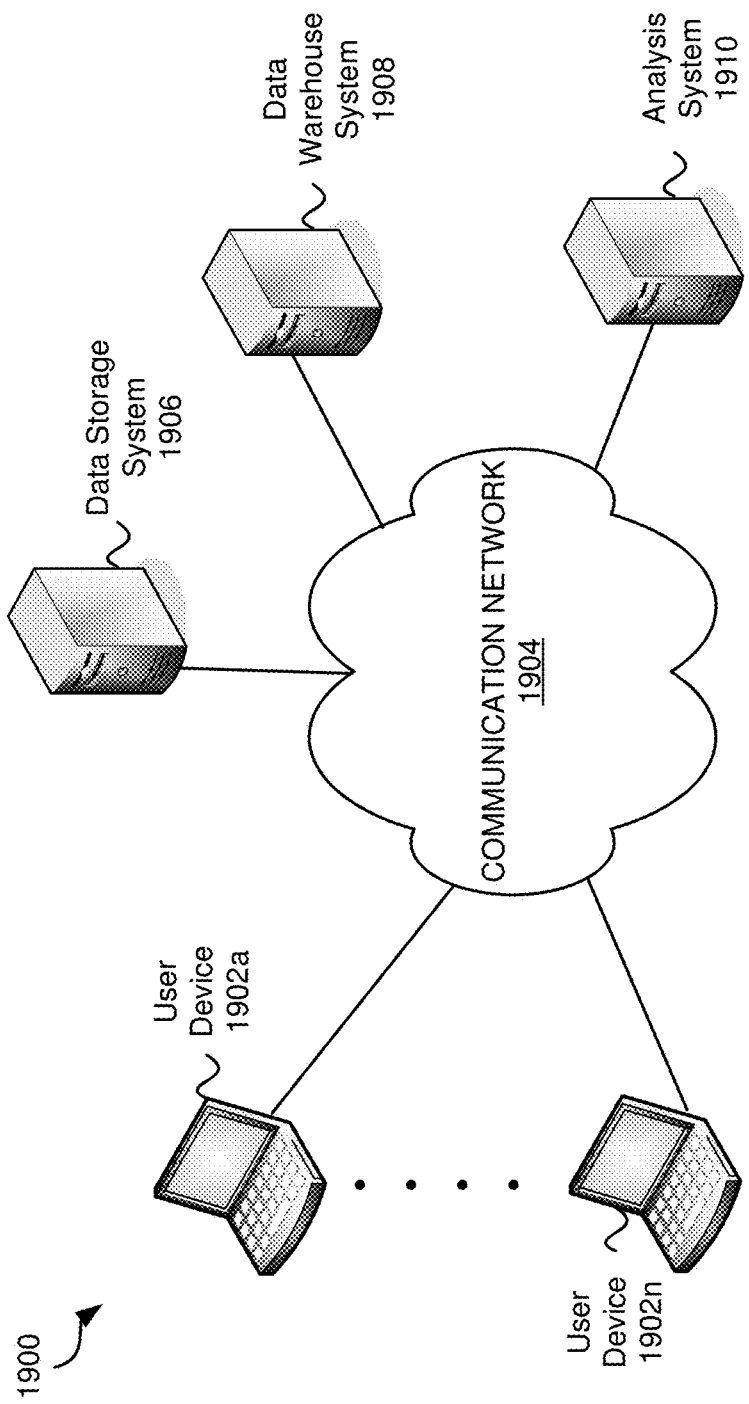
FIG. 19 depicts an example environment in which embodiments may be practiced in conjunction with at least one data warehouse system.

FIG. 19 depicts an example environment 1900 in which embodiments may be practiced in conjunction with at least one data warehouse system 1908. In various embodiments, data analysis and generation of an interactive visualization may be performed locally (e.g., with software and/or hardware on a local digital device), across a network (e.g., via cloud computing), or a combination of both. In many of these embodiments, a data structure controlled by or stored in the data warehouse system 1908 is accessed to obtain data for TDA analysis. In some embodiments, TDA analysis may be performed based on properties and parameters selected by a user (e.g., data analyst). In some embodiments, a subset of data from the data warehouse system 1908 may be analyzed.

It will be appreciated that while many traditional data analytics may be performed using data from or within a data warehouse system 1908, data analytics in data warehouse systems 1908 traditionally require predetermined queries and an understanding of the data (e.g., an understanding of data models that may apply to the data). Application of TDA analysis on all or part of the data controlled by and/or stored in the data warehouse system 1908 may reveal insights inherent in the data from the shape of the data. In some embodiments, these insights are not detectable by previous data analytics. While TDA is a valuable tool to identify insights in all or part of the data, it may be appreciated that using a query-based system with insights generated from TDA may provide additional value.

Environment 1900 comprises user devices 1902*a*-1902*n*, a communication network 1904, data storage system 1906, a data warehouse system 1908, and an analysis system 1910. Environment 1900 depicts an embodiment wherein functions are performed across a network. In this example, the user(s) may take advantage of cloud computing by storing data in a data storage system 1906 and/or the data warehouse system 1908 accessible over the communication network 1904. The analysis system 1910 may perform analysis of data and generate of a TDA graph and/or an interactive visualization.

User devices 1902*a*-1902*n* may be any digital devices. A digital device is any device that includes memory and a processor. Digital devices are further described in FIG. 18. The user devices 1902*a*-1902*n* may be any kind of digital device that may be used to access, analyze and/or view data including, but not limited to a desktop computer, laptop, notebook, or other computing device. In some embodiments, the user device 1902*a*-1902*n* are the user devices 202*a*-202*n* (see FIG. 2).

In various embodiments, a user, such as a data analyst, may generate and/or receive a database or other data structure from the user device 1902*a*-1902*n* and/or the data warehouse system 1908 to be saved to the data storage system 1906. The user device 1902*a* may communicate with the analysis system 1910 via the communication network 1904 to perform analysis, examination, and visualization of data within the database.

The user device 1902*a* may comprise any number of client programs. One or more of the client programs may interact with one or more applications on the analysis system 1910. In other embodiments, the user device 1902*a* may communicate with the analysis system 1910 using a browser or other standard program. In various embodiments, the user device 1902*a* communicates with the analysis system 1910 via a virtual private network. It will be appreciated that communication between the user device 1902a, the data storage system 1906, the data warehouse system 1908, and/or the analysis system 1910 may be encrypted or otherwise secured.

The communication network 1904 may be any network that allows digital devices to communicate. The communication network 1904 may be the Internet and/or include LAN and WANs. The communication network 1904 may support wireless and/or wired communication. In some embodiments, the communication network 1904 is the communication network 204 (see FIG. 2).

The data storage system 1906 is a digital device that is configured to store data. In various embodiments, the data storage system 1906 stores databases and/or other data structures. The data storage system 1906 may be a single server or a combination of servers. In one example the data storage system 1906 may be a secure server wherein a user may store data over a secured connection (e.g., via https). The data may be encrypted and backed-up. In some embodiments, the data storage system 1906 is operated by a third-party such as Amazon's S3 service. In some embodiments, the data storage system 1906 is the data storage server 206 (see FIG. 2).

The data to be analyzed (e.g., a subset of data from the data warehouse system 1908) may comprise large high-dimensional datasets. These datasets are traditionally very difficult to analyze and, as a result, relationships within the data may not be identifiable using previous methods. Further, previous methods may be computationally inefficient.

A data warehouse system 1908 (e.g., enterprise data warehouse or EDW), includes any number of digital devices that may be used for reporting and data analysis. The data warehouse system 1908 may be, include, and/or be coupled to one or more central repositories of data from any number of sources. In one example, the data warehouse system 1908 may store current and historical data and may be used to create analytical reports. Data stored in the data warehouse system 1908 may be uploaded from operational systems (e.g., marketing and sales). All or some of the data stored in the data warehouse may be structured, unstructured, filtered, raw, and/or the like.

In various embodiments, the data warehouse system 1908 may be an ETL warehouse (i.e., an extract, transform, load-based warehouse) that may utilize staging, data integration, and access layers for any number of functions. The staging layer may store raw data received or extracted from any number of data sources. The integration layer may integrate different data sets by transforming data from the staging layer to generate a warehouse database arranged into groups (e.g., dimensions), facts, and aggregate facts in a star (or snowflake) schema. All or part of the data may be cleansed, transformed, catalogued, and/or made available for use by data analysts or any other user. It will be appreciated that data in the data warehouse system 1908 may be analyzed and assessed using business intelligence tools, query functions, and/or the like.

The analysis system 1910 may include any number of digital devices configured to analyze data (e.g., the data in the stored database and/or other dataset received and/or generated by the user device 1902a). Although only one digital device is depicted in FIG. 19 corresponding to the analysis system 1910, it will be appreciated that any number of functions of the analysis system 1910 may be performed by any number of digital devices. In some embodiments, the analysis system 1910 is the analysis server 208 (see FIG. 2)

or is a part of the analysis server 208. Alternately, the analysis server 208 may be a part of the analysis system 1910.

In various embodiments, the analysis system 1910 may perform any number of functions to interpret, examine, analyze, and display data and/or relationships within data. In some embodiments, the analysis system 1910 performs, at least in part, topological analysis (TDA) of datasets applying metrics, filters, and resolution parameters chosen by the user. The analysis system 1910 is further discussed regarding FIGS. 8, 22, and 23 herein.

The analysis system 1910 may generate graphs in memory, generate visualized graphs, and/or generate interactive visualizations of the output of the analysis. The interactive visualization allows the user to observe and explore relationships in the data. In various embodiments, the interactive visualization allows the user to select nodes comprising data that has been clustered. The user may then access the underlying data, perform further analysis (e.g., statistical analysis) on the underlying data, and/or manually reorient the graph(s) (e.g., structures of nodes and edges described herein) within the interactive visualization. The analysis system 1910 may also allow for the user to interact with the data and see an effect of the interaction to gain further insights. The interactive visualization is further discussed in FIGS. 9-11.

The graphs in memory and/or visualized graphs may also include nodes and/or edges as described herein. Graphs that are generated in memory may not be depicted to a user but rather may be in memory of a digital device. Visualized graphs are rendered graphs that may be depicted (e.g., displayed) to the user (e.g., using user device 1902a).

In some embodiments, the analysis system 1910 interacts with the user device(s) 1902a-1902n and/or the data warehouse system 1908 over a private and/or secure communication network. The user device 1902a may include a client program that allows the user to interact with the data storage system 1906, the data warehouse system 1908, the analysis system 1910, another user device (e.g., user device 1902n), a database, and/or an analysis application executed on the analysis system 1910.

It will be appreciated that all or part of the data analysis may occur at the user device 1902a, in the cloud, on the analysis system 1910, and/or in the data warehouse system 1908. Further, all or part of the interaction with the visualization (e.g., graphic) may be performed on the user device 1902a, in the cloud, on the analysis system 1910, and/or in the data warehouse system 1908. All or part of the data analysis may occur on any number of digital devices.

Although two user devices 1902a and 1902n are depicted, those skilled in the art will appreciate that there may be any number of user devices in any location (e.g., remote from each other). Similarly, there may be any number of communication networks, data storage servers, and analysis servers.

Cloud computing may allow for greater access to large datasets (e.g., via a commercial storage service) over a faster connection. Further, it will be appreciated that services and computing resources offered to the user(s) may be scalable.

Figure 20:
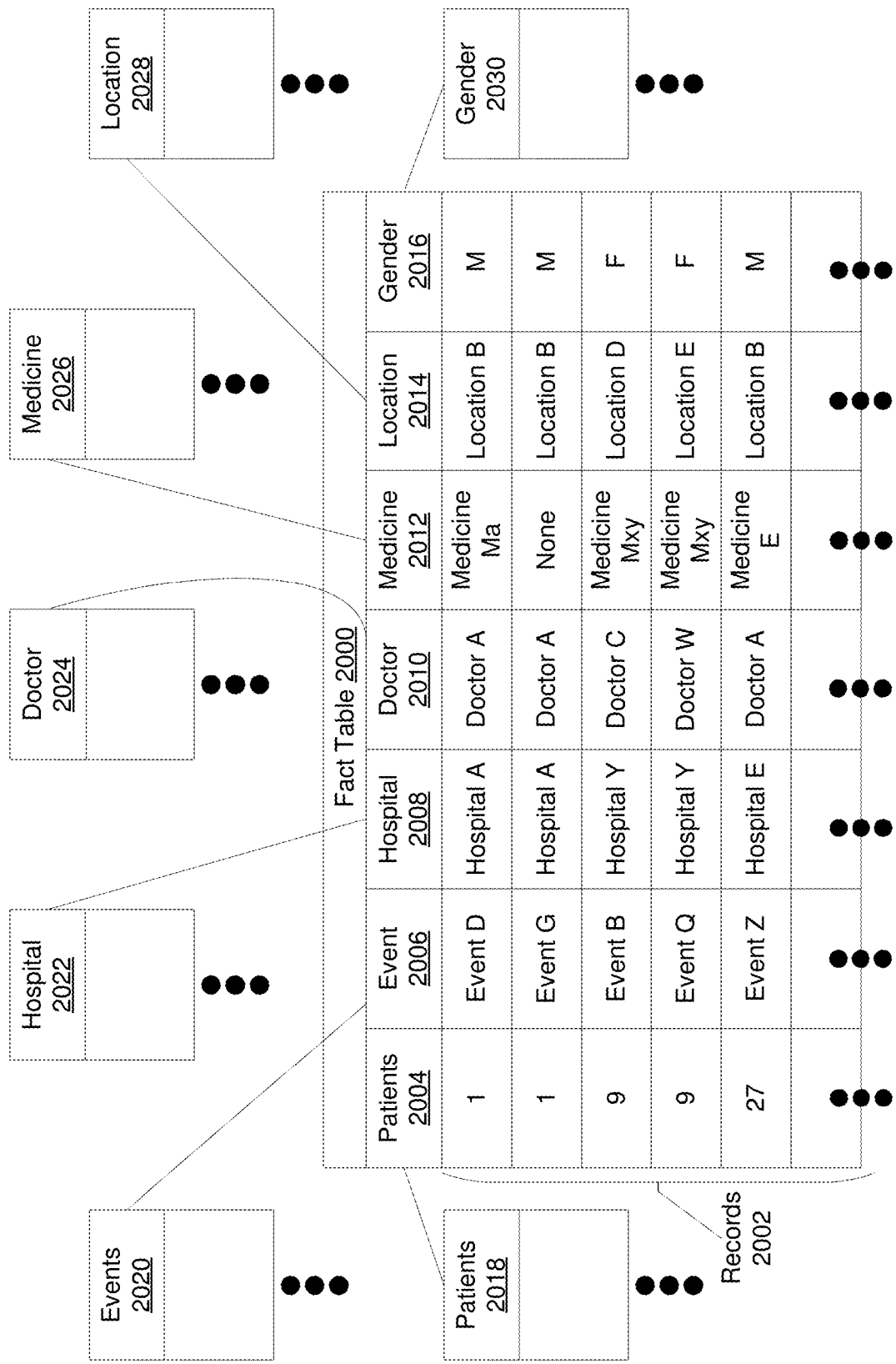
FIG. 20 depicts an example fact table and related example dimension tables that may be controlled by or within a data warehouse system.

FIG. 20 depicts an example fact table 2000 and related example dimension tables 2018-2030 that may be controlled by or within the data warehouse system 1908. In this example, the fact table 2000 depicted in FIG. 20 contains health records and health information. It will be appreciated that the fact table 2000 and related dimension tables 2018-2030 may include any type of information. For example, the fact table 2000 may include transaction records for claims related to health insurance, sales, bank transactions, purchases, or the like. In another example, the fact table 2000 may include logistic information related to occurrences of activities.

In various embodiments, the fact table 2000 and dimension tables 2018-2030 may be in a star schema. The star schema may include a fact table that reference any number of dimension tables. The star schema may separate process data (e.g., business process data) into facts (e.g., events such as health incidents or financial transactions) and dimensions. In one example, events may hold measurable and quantitative data regarding business and/or health care. Examples of event data may include sale price, sold quantity, time, distance, speed, and/or the like. Dimensions may include descriptive attributes related to event data. Examples of dimensions may include product models, product color, product sizes, geographic locations, and/or the like.

Fact tables may, in some embodiments, record measurements or metrics of an event. A fact table may include numeric values and keys to dimension data. The dimension data may be associated with one or more dimension tables where descriptive information (e.g., metadata) may be identified and/or stored. Fact tables may include any number of records that can grow over time. In one example, the fact table may include facts about a specific sale event.

Dimension tables may include a relatively small number of records compared to a fact table, however, each record of the fact table may, in some embodiments, have a large number of attributes to describe event data. Attributes may include, for example, time dimension tables to describe time, geography dimension table (e.g., describing country, state, or city), product dimension tables to describe products, employee dimension tables to describe employees such as sales people, range dimension tables that describe ranges of time, money, or the like.

In various embodiments, the fact table and dimension table may be in a snowflake schema. A snowflake scheme is a logical arrangement of tables such that the entity relationship diagram may resemble a snowflake shape. In one example, the snowflake schema is represented by a centralized fact table connected to multiple dimension tables (e.g., with one dimension table connected to another dimension table). In various embodiments, dimensions may be normalized into multiple related tables. In the star schema, the dimensions may be "de-normalized" with each dimension represented by a single table. A snowflake schema may improve speed of data retrieval over the standard star schema. In some embodiments, the star schema may allow for more efficient data manipulation.

The fact table 2000 in FIG. 20 includes records 2002 and dimensions (e.g., dimensions 2004-2016). Each of the records 2002 may include information associated with an event. An event may be a transaction or occurrence. In some embodiments, an event in the fact table 2000 may include any number of transactions and/or any number of occurrences.

Information may be organized and/or contained in the fact table 2000 in any number of ways depending on the information being stored, needed data analytics, the organization that one or more content providers provide, and/or the like. For example, the fact table 2000 may include information entered by any number of staff for any number of doctors from any number of health institutions (e.g., hospitals, clinics, or sole practitioners).

Each of records 2002 may be a row in the fact table 2000. In this example, a record 2002 is information related to an event. The event can include any number of occurrences. In one example, a first record may indicate that a patient visited a hospital (e.g., hospital A) regarding treatment for diabetes. A second record may indicate that the same patient received a prescription for medicine (e.g., medicine Ma). The first and second records may be related to the same visit or may be records of different visits. The information contained in each record may be standardized (e.g., each record may be limited to a particular event or series of events across all records) or non-standardized (e.g., some records may include an aggregation of occurrences including, for example, a hospital visit, treatment, and tests).

There may be any number of records for any number of patients.

In various embodiments, information within the fact table 2000 may include identifiers for different information (e.g., event "D") or may include descriptive information (e.g., "heart complaint"). In the example of fact table 2000 in FIG. 20, information is encoded in the records 2002 as identifiers or codes. It will be appreciated that information may be contained in a fact table 2000 or dimension tables 2018-2030 as codes (e.g., identifiers), descriptive information (e.g., describing a value, meta data, or the like), or a combination of both.

The fact table 2000 may include any number of dimensions. The dimensions in the fact table 2000 in this example include patients dimension 2004, event dimension 2006, hospital dimension 2008, doctor dimension 2010, medicine dimension 2012, location dimension 2014, gender dimension 2016, and so on. Each dimension may include a value for each different record. A dimension for a particular dimension may be blank (e.g., indicating that the information is unknown, unavailable, not applicable, unrelated, and/or the like), include a null value, include a numeric value, a string of characters or a combination of numeric value(s) and one or more characters. The patients dimension 2004 may include values across the records 2002 identifying the different patients. In this example, patients are identified by a patient ID (e.g., patient "1," "9," and "27"), There may be any number of patients.

The event dimension 2006 may include values across the records 2002 identifying different events. In this example, events are identified by an event ID (e.g., event "B," "D," "G," "Q," and "Z"). There may be any number of events. In this example, an event may include any number of tests (e.g., labs) ordered and/or taken by a patient, complaints, diagnostics, treatments, and/or the like. In some embodiments, the fact table 2000 may have any number of event dimensions (e.g., not only one dimension as depicted in FIG. 20). In various embodiments, each record 2002 may be associated with only a single event (e.g., the fact table 2000 may include only a single event dimension 2006 for every record 2002).

The hospital dimension 2008 may include values across the records 2002 identifying the different hospitals. In this example, hospitals are identified by a hospital ID (e.g., hospitals "A," "E," and "Y"). There may be any number of hospitals. In this example, each record may be associated with a particular hospital which may indicate that the events are taken at a hospital or are associated with a hospital (e.g., treatment by a doctor "A" that is employed by hospital "A" but the Event "D" may not have taken place at the hospital "A"). While a hospital is discussed herein, the hospital dimension 2008 may refer to any number of health institutions, providers, laboratories, and/or the like.

The doctor dimension 2010 may include values across the records 2002 identifying the different doctors or health professionals. In this example, doctors are identified by a doctor ID (e.g., doctors "A," "C," and "W"). There may be any number of doctors. In this example, each record may be associated with a particular doctor which may indicate that the events are involve a doctor (e.g., treatment, test, or the like). While a doctor is discussed herein, the doctor dimension 2010 may refer to any type of health professional, health service person, attendant, or the like. In some embodiments, the doctor dimension 2010 may identify a doctor of the patient even if the patient did not see the doctor.

The medicine dimension 2012 may include values across the records 2002 identifying the different medications (e.g. pharmaceuticals) that may be ordered or taken by the patient. In this example, medications are identified by a medication ID (e.g., medications "E," "Ma," and "Mxy"). There may be any number of medications.

The location dimension 2014 may include values across the records 2002 identifying the different locations that the event may have occurred. For example, while a hospital may provide authority and/or invoicing, the recorded event may have occurred at one of many possible locations for a hospital system. In another example, location may indicate where the patient resides, where an accident occurred, or the like. In this example, locations are identified by a location ID (e.g., locations "B," "D," and "E"). There may be any number of locations.

The gender dimension 2016 may include values across the records 2002 identifying the different genders for different patients, There may be any number of genders (e.g., transgender or the like that may be tracked). In this example, genders are identified by a gender ID (e.g., genders "M" and "F").

Each dimension table 2018-2030 may be associated with (e.g., linked) to one or more dimensions and/or information contained within the fact table 2000. Each dimension table may include additional information (e.g., identifiers of information and/or information) that is not within the fact table 2000. For example, the patient dimension table 2018 may include a patient ID (e.g., the same patient ID in the patient dimension 2004 of the fact table 2000) as well as other information associated with the patient identified by the patient ID. The patient dimension table 2018 is further described with respect to FIG. 21.

The events dimension table 2020 may include additional information (e.g., identifiers of information and/or information) that is not within the fact table 2000. For example, the events dimension table 2020 may include an event identifier (e.g., the same event identifier in the event dimension 2006 of the fact table 2000) as well as other information associated with the event identified by the event identifier. For example, the event dimension table 2020 may include information regarding a number of patients that share the event over a given time, different hospitals that provide services related to the event identifier, costs associated with the event identifier, likelihood of the event identifier being linked to a medical condition, and/or the like.

The hospital dimension table 2022 may include additional information (e.g., identifiers of information and/or information) that is not within the fact table 2000. For example, the hospital dimension table 2022 may include a hospital identifier (e.g., the same hospital identifier in the hospital dimension 2008 of the fact table 2000) as well as other information associated with the hospital identified by the hospital identifier. For example, the hospital dimension table 2022 may include information regarding a size of the hospital (e.g., number of doctors and medical personnel employed by the hospital), number of locations associated with the hospital, hospital quality rating, prestige rating, number of labs ordered for different treatments, and/or the like. The hospital dimension table 2022 is further described with respect to FIG. 21.

The doctor dimension table 2024 may include additional information (e.g., identifiers of information and/or information) that is not within the fact table 2000. For example, the doctor dimension table 2024 may include a doctor identifier (e.g., the same doctor identifier in the doctor dimension 2010 of the fact table 2000) as well as other information associated with the doctor identified by the doctor identifier. For example, the doctor dimension table 2024 may include information regarding a licenses of the doctor, time in practice, specialties, publications, and/or the like.

The medicine dimension table 2026 may include additional information (e.g., identifiers of information and/or information) that is not within the fact table 2000. For example, the medicine dimension table 2026 may include a medication identifier (e.g., the same medication identifier in the medicine dimension 2012 of the fact table 2000) as well as other information associated with the medication identified by the medication identifier. The medicine dimension table 2026 is further described with respect to FIG. 21.

The location dimension table 2028 may include additional information (e.g., identifiers of information and/or information) that is not within the fact table 2000. For example, the location dimension table 2028 may include a location identifier (e.g., the same location identifier in the location dimension 2014 of the fact table 2000) as well as other information associated with the location identified by the location identifier. For example, the location dimension table 2028 may include information regarding state, city, socioeconomic conditions of the location, pollution, allergens in the location, and/or the like.

The gender dimension table 2030 may include additional information (e.g., identifiers of information and/or information) that is not within the fact table 2000. For example, the gender dimension table 2030 may include a gender identifier (e.g., the same gender identifier in the gender dimension 2016 of the fact table 2000) as well as other information associated with the gender identified by the gender identifier. For example, the gender dimension table 2030 may include information regarding outcomes for particular genders, complications, length of hospital stay, and/or the like.

FIG. 21 depicts an example patient dimension table 2018, an example hospital dimension table 2022, and an example medicine dimension table 2026. While FIG. 21 depicts only the patient dimension table 2018, the hospital dimension table 2022, and the medicine dimension table 2026, there may be any number of dimension tables associated with the fact table 2000. In some embodiments, at least one dimension of a dimension table is similar to a dimension in a related (e.g., linked) fact table. For example, the patient dimension table may include a patient ID dimension that includes similar or the same values to values in the patient ID dimension of a related (e.g., linked) fact table. Although the dimensions may be similar between the dimension table of the fact table, different records in the fact table may reference the same patient ID because each record may indicate an event distinctive from other events. Further, the fact table may be in a different order and/or indicate different information regarding the patient ID values.

For example, the patient dimension table 2018 has a patient ID dimension (e.g., patient ID dimension 2110) that is similar to the patient ID dimension (e.g., patient dimension 2004) of the fact table 2000. In this example, each record in the fact table 2000 that references patient "1," concerns the same patient that is in the record in the patient dimension table 2018 that references patient "1." Similarly, the event dimension table 2020 may include an event ID dimension with event identifiers that are similar or the same as those in the event dimension 2006 of the fact table 2000. Further, the hospital dimension table 2022 may include a hospital ID dimension with hospital identifiers that are similar or the same as those in the hospital dimension 2008 of the fact table 2000, the doctor dimension table 2024 may include a doctor ID dimension with doctor identifiers that are similar or the same as those in the doctor dimension 2010 of the fact table 2000, the medicine dimension table 2026 may include a medicine ID dimension with medicine identifiers that are similar or the same as those in the medicine dimension 2012 of the fact table 2000, the location dimension table 2028 may include a location ID dimension with location identifiers that are similar or the same as those in the location dimension 2014 of the fact table 2000, and/or the gender dimension table 2030 may include a gender ID dimension with gender identifiers that are similar or the same as those in the gender dimension 2016 of the fact table 2000.

The patient dimension table 2018 may include any number of dimensions. For example, the patient dimension table 2018 may include the patient ID dimension 2110, the address dimension 2112, the demographic (DEMO) identifier dimension 2114, past diagnosis dimension 2116, and the like. In some embodiments, at least some of the information within the dimensions of the patient dimension table 2018 is not within the fact table 2000.

The patient ID dimension 2110 may include patient identifiers that may be found in the fact table 2000. In some embodiments, the patient ID dimension 2110 may include one or more patient identifiers not found in the fact table 2000. Unlike the fact table 2000 which may order records 2002 based on occurrence of event, another dimension, or combination of dimensions, the records of the patient dimension table 2018 are in order of patient identifier. It will be appreciated that the patient dimension table 2018 may be ordered based on occurrence of event, another dimension, or combination of dimensions.

The address dimension 2112 may include address information (e.g., identifiers referencing mailing or residence information or address information directly) for any number of patients. For example, the patient associated with patient ID "1" may have a mailing address at "XXX." The demographic identifier dimension 2114 may include demographic information for any number of patients (e.g., socioeconomic, age, race, gender, and/or the like). For example, the patient associated with patient ID "1" may be included in demographic associated with "A, C, and D." The past diagnosis dimension 2116 may include information or identifiers associated with past and/or current diagnoses of the patients (if any). For example, the patient associated with patient ID "1" may have a past diagnoses of "A" and "Z." It will be appreciated that there may be any number of dimensions in the patient dimension table 2018.

The hospital dimension table 2022 may include any number of dimensions. For example, the hospital dimension table 2022 may include a hospital ID dimension 2118, a hospital rating dimension 2120, a size dimension 2122, and the like. In some embodiments, at least some of the information within the dimensions of the hospital dimension table 2022 is not within the fact table 2000.

The hospital ID dimension 2118 may include hospital identifiers that may be found in the fact table 2000. In some embodiments, the hospital ID dimension 2118 may include one or more hospital identifiers not found in the fact table 2000. Unlike the fact table 2000 which may order records 2002 based on occurrence of event, another dimension, or combination of dimensions, the records of the hospital ID dimension 2118 are in order of hospital identifier. It will be appreciated that the hospital ID dimension 2118 may be ordered based on occurrence of event, another dimension, or combination of dimensions.

The rating dimension 2120 may include a rating or quality score (e.g., identifiers referencing a particular rating body) for any number of hospitals. For example, the hospital associated with hospital ID "83" may have a rating of "AAAA." It will be appreciated that there may be different dimensions for different ratings related to different services and/or treatment. The size dimension 2122 may include size information for any number of employees or employee types that work at each hospital. For example, the hospital associated with hospital ID "83" may have a size of ">300." It will be appreciated that there may be any number of dimensions in the hospital dimension table 2022.

The medicine dimension table 2026 may include any number of dimensions. For example, the medicine dimension table 2026 may include the medicine ID dimension 2102, an interaction A dimension 2104, an interaction B dimension 2106, a cost/dose dimension 2108, and the like. In some embodiments, at least some of the information within the dimensions of the medicine dimension table 2026 is not within the fact table 2000.

The medicine ID dimension 2102 may include medicine identifiers that may be found in the fact table 2000. In some embodiments, the medicine ID dimension 2102 may include one or more medicine identifiers not found in the fact table 2000. Unlike the fact table 2000 which may order records 2002 based on occurrence of event, another dimension, or combination of dimensions, the records of the medicine ID dimension 2102 are in order of medicine identifier. It will be appreciated that the medicine ID dimension 2102 may be ordered based on occurrence of event, another dimension, or combination of dimensions.

The interaction A dimension 2104 may include identifiers or information indicating one or more interactions associated with different medicines. For example, medicine ID 1121 may include an interaction when in the presence of medication B. Similarly, the interaction B dimension 2106 may include identifiers or information indicating one or more interactions associated with different medicines. For example, medicine ID 1121 may include an interaction when in the presence of medication DD. There may be any number of values and interactions may be tracked in any number of ways. In some embodiments, the medicine dimension table 2026 does not track interactions.

The cost/dose dimension 2108 may track cost for one or more different doses for each or any medications identified in the medicine ID 2102 dimension.

While example dimensions have been identified for patient dimension table 2018, hospital dimension table 2022, and medicine dimension table 2026, it will be appreciated that there may be any number of dimensions and any type of dimensions. For example, any or all dimensions identified in FIG. 21 are for example and one or more may not be included in the patient dimension table 2018, hospital dimension table 2022, and medicine dimension table 2026.

As discussed herein, while the fact table 2000 and related dimension tables 2018-2030 in FIGS. 20 and 21 are described with patient information, it will be appreciated that the fact table 2000 and dimension tables 2018-2030 may include any information. For example, records 2002 of fact table 2000 may record bank or financial transactions for any number of entities and/or individuals. Different dimension tables 2018-2030 may contain additional information regarding the entity performing the financial transaction, location of transaction, amount, applicable regulation, past transactions, aggregate amounts over time, type of financial transaction, financial institutions associated with the transactions, and/or the like.

In various embodiments, the analysis system utilizes methodologies and/or a suite of algorithms to perform topological data analysis (TDA) utilizing data from one or more fact table(s) and/or dimension table(s) (e.g., fact table 2000 and dimension tables 2018-2030). In some embodiments, the analysis system 1910 performs TDA on information from a fact table and/or one or more dimension tables of a data warehouse. As discussed herein, data from any source or combination of sources may be analyzed using TDA. In some embodiments, TDA functions may function with or be integrated into a data warehouse for performing analysis. For example, TDA functions may leverage, supplement, and/or replace analytic functionality of a data warehouse. Further, it will be appreciated that results of the TDA analysis (e.g., nodes, membership of data points in nodes, color of nodes, and/or the like) may be included in any number of new dimension tables of the data warehouse (e.g., for querying and other functions of the data warehouse).

Figure 22:
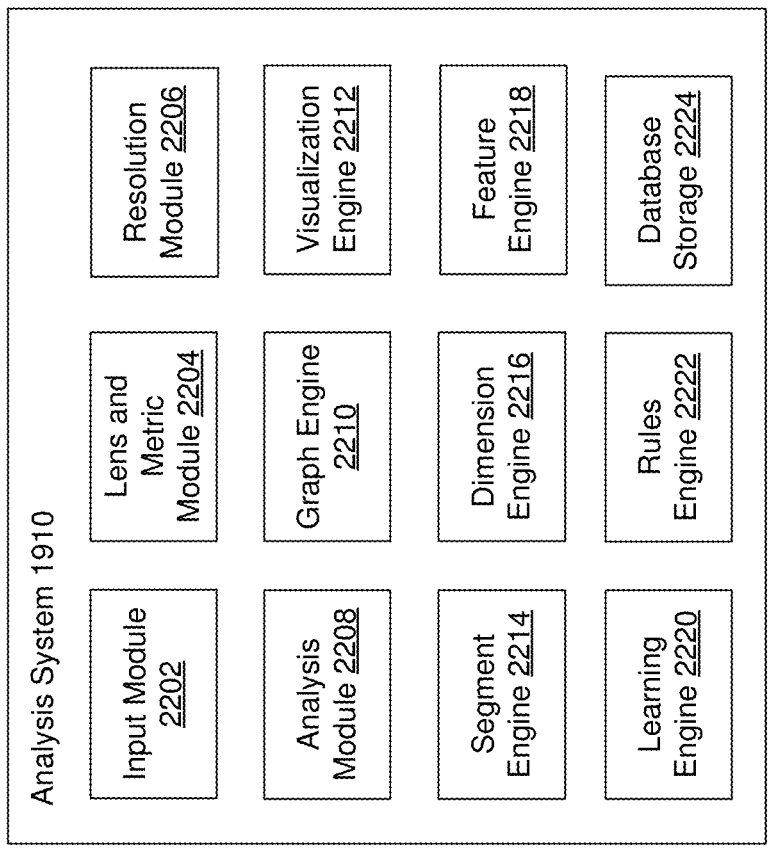
FIG. 22 is a block diagram of an example analysis system.

FIG. 22 is a block diagram of an example analysis system 1910. In some embodiments, the analysis system 1910 may be the analysis server 208 (FIG. 2) or a part of the analysis server 208. In various embodiments, the analysis server 208 may be a part of the analysis system 1910. The analysis system may be any digital device including a processor and memory (e.g., the digital device depicted in FIG. 18).

The analysis system 1910 may include an input module 2202, a lens and metric module 2204, a resolution module 2206, an analysis module 2208, a graph engine 2210, a visualization engine 2212, a segment engine 2214, a dimension engine 2216, a feature engine 2218, a learning engine 2220, a rules engine 2222, and a database storage 2224. A module may be hardware, software (e.g., including instructions executable by a processor), or a combination of both. Alternative embodiments of the analysis system 1910 may comprise more, less, or functionally equivalent components and modules.

The input module 2202 may be configured to receive commands and preferences from the user device, data analyst, administrator, data storage device, or the like. In various examples, the input module 2202 receives lens function(s), metric function(s), and resolution selections to be used to perform TDA analysis. The output of the analysis may be a visualization of a graph and/or a report indicating relationships of data based on the TDA analysis.

The input module 2202 may receive a set of data or receive links (e.g., identifiers) to data in any number of databases or data structures. The links may be utilized by the analysis system 1910 to access or retrieve any data to be analyzed.

In various embodiments, the input module 2202 may receive or selection information contained in a fact table (e.g., a subset of data in the fact table 2000) and/or any number of dimension tables (e.g., a subset of data in the dimension tables 2018-2030). The input module 2202 may receive information from any source, data warehouse, or the like.

Figure 24:
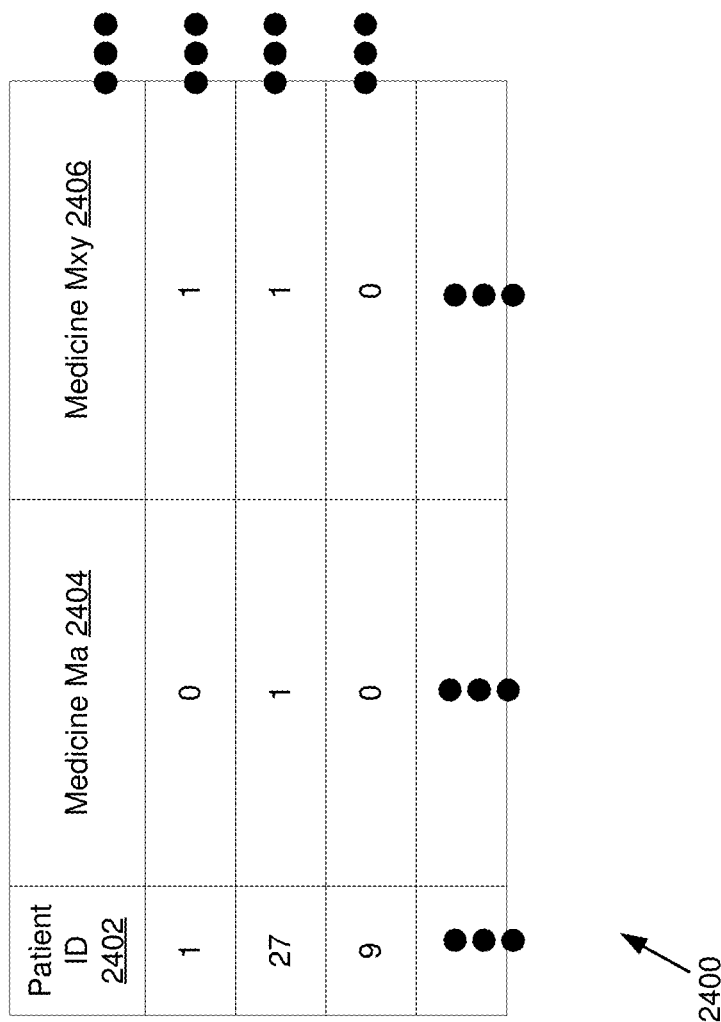
FIG. 24 is an example of an input table.

In some embodiments, the input module 2202 may receive selections of dimensions for any number of records of a fact table and/or any number of dimension table(s). The input module 2202 may generate the data S (the data to be analyzed by the analysis module 2208 and further discussed herein) based on the selections. In some embodiments, the input module 2202 may generate a TDA input table with rows corresponding to data points to be assessed and columns indicating dimensions of the data points. The TDA input table is further discussed in FIG. 24 herein. Although the TDA input table is discussed, it will be appreciated that the input module 2202 may generate the data S including data points and dimensions from the fact table and/or the dimension table(s) without generating an input table or generating any specific TDA input structure as depicted in FIG. 24.

The lens and metric module 2204 may receive one or more lens functions, and one or more metric functions to be utilized in TDA analysis. The lens and metric module 2204 may receive the lens function(s) and metric function(s) from an interface provided by the input module 2202. In some embodiments, the lens and metric module 2204 may allow a user or a digital device to provide or define the one or more lens functions and/or one or more metric functions.

The resolution module 2206 may receive a resolution, lens parameter(s), and/or metric parameter(s). In one example, the user enters a number of intervals and a percentage overlap for a cover of a reference space.

The analysis module 2208 may perform TDA analysis based on the data identified and/or provided from the fact table and/or dimension tables. The data to be analyzed may include data received by the analysis system 1910 and/or data that has been identified (or linked) in one or more data sources (e.g., data warehouse, cloud storage, hard drive, server storage, data warehouse, digital device, and/or the like). In various embodiments, the data to be analyzed may be in one or more spreadsheets, tables, and/or in any number of sources.

The analysis module 2208 may perform TDA (as discussed herein) on the data points. For example, the analysis module 2208 may retrieve data points from a fact table and/or dimension tables. Each row in the retrieved data (e.g., in a TDA input table) may be a data point and each column may include a dimension or characteristic (e.g., attribute) of the data points. In various embodiments, the retrieved or received data includes data points from a dimension table of a data warehouse (e.g., patients involved a health occurrence or entities involved financial transactions) as well as information (e.g., values of dimensions) from any number of other related dimension tables and/or a related fact table.

The analysis module 2208 map the data points into a reference space using the selected lens function(s) (optionally in conjunction with one or more of the selected metric function(s)). The analysis module 2208 may generate a cover using the resolution and cluster the data points using the metric function(s) to identify nodes in a graph (e.g., unvisualized). Each of the nodes in the graph may include data points of the data from the data warehouse system(s). In some embodiments, the graph engine 2210 generates the graph that includes nodes containing data points (e.g., data points may be members of nodes).

The visualization engine 2212 may optionally generate a visualization of the graph based on the output from the analysis module 2208 and/or the graph engine 2210. The visualization allows the user to see all or part of the analysis graphically.

In some embodiments, the visualization of the graph may optionally allow the user to interact with the visualization. In one example, the user may select portions of a graph from within the visualization to see and/or interact with the underlying data and/or underlying analysis. The user may then change the parameters of the analysis (e.g., change the metric, filter(s), or resolution(s)) which allows the user to visually identify relationships in the data that may be otherwise undetectable using prior means. The interactive visualization is further described herein. In other embodiments, the visualization is not interactive.

The segment engine 2214 may identify segments (e.g., groups) of nodes in within the graph. The segment engine 2214 may identify segments of nodes in any number of ways. In some embodiments, the segment engine 2214 receives segment information to be used to identify segments in the graph. Segment information may include any criteria including, for example, dimensions not included by input module 2202 for TDA analysis (e.g., other dimensions and related values from the fact table and/or other dimension tables of the data warehouse), outcomes, or any combination thereof.

A segment may be any group of nodes. The segment engine 2214 may identify any number of segments of nodes in the graph or visualization. In some embodiments, each segment does not contain a node that is already a member of another segment (e.g., each segment includes an exclusive set of nodes). In other embodiments, a segment may share one or more nodes with another segment.

In various embodiments, the segment engine 2214 receives a user selection (e.g., from a data analyst) of nodes for segments and the segment engine 2214 may select the segments based on instruction (e.g., criteria) or guidance provided by the user. The segment engine 2214 may utilize any number of rules. For example, the segment engine 2214 may select segments that do not contain nodes that share data points with another node of another segment. In some embodiments, the segment engine 2214 performs autogrouping to determine segments. Autogrouping is described with respect to FIGS. 31-37.

The dimension engine 2216 may optionally generate dimension tables with at least some information representative of information in the TDA graph. In one example, the dimension engine 2216 may generate a dimension table including which nodes are members of each segments. The dimension table may further include information regarding the nodes (e.g., including information regarding data points that are members of the nodes). In some embodiments, the dimension table may include information from any number of dimensions from the data warehouse related to the data points in the nodes of the table (e.g., including dimensions of the data points not considered in the TDA analysis by the analysis module 2208).

The dimension engine 2216 may generate any number of dimension tables including any information related to the graph generated by the graph engine 2210. For example, the dimension engine 2216 may generate a dimension table including which data points are members of each segments, which data points are members of each node, a dimension table including which nodes are colored by a color, a dimension table including which nodes are connected by edges, a dimension table of data points from the received data as well as information from dimensions of the fact table and/or any number of dimension tables of the data warehouse not considered by the analysis module 2208, and/or the like.

While fact tables and dimension tables of a data warehouse system is discussed as being a possible source of data to be analyzed by the analysis system 1910, it will be appreciated that this is optional. For example, the analysis system 1910 may conduct TDA analysis on information from any number of sources (e.g., not including a data warehouse, fact tables or dimension tables referencing fact tables). The dimension engine 2216 may generate any number of dimension tables including any information related to the graph generated by the graph engine 2210 regardless whether information was received from a data warehouse, fact tables or dimension tables referencing fact tables or other data source.

The feature engine 2218 may determine those dimensions or values of dimensions that are most significant (e.g., distinguishing dimensions or distinguishing values of dimensions) for one or more segments and generate a feature table to identify those dimensions or values. In one example, the feature engine 2218 may determine specific outcomes, medications, or the like that are most significant to one or more segments. The feature table may be a dimension table related to (e.g., linked) to one or more other dimension table(s) and/or the fact table in the data warehouse. A feature is any dimension that is significant for one or more segments.

In one example, the feature engine 2218 may generate a probability value (i.e., a p-value), a Kolmogorov-Smirnov value, and/or other statistical measure to determine significance of any dimension or value. The feature engine 2218 may receive or select one or more dimensions or values to determine significance or distinction to one or more segments. One or more dimensions received or selected by the feature engine 2218 may include any number of dimensions included in the TDA analysis and/or any number of dimensions not included in the TDA analysis. For example, the feature engine 2218 may receive a selection of one or more dimensions from any number of dimension tables in the data warehouse that were not considered by the analysis module 2208 in performing the TDA analysis.

Similarly, one or more values of dimensions (e.g., different outcomes) received or selected by the feature engine 2218 may include any number of values included in the TDA analysis and/or any number of values not included in the TDA analysis. For example, the feature engine 2218 may receive a selection of one or more values of one or more dimensions from any number of dimension tables in the data warehouse that were not considered by the analysis module 2208 in performing the TDA analysis.

The p-value is a probability for a given statistical model that, when the null hypothesis is true, the difference between two compared groups would be the same as or more extreme than the observed results. The Kolmogorov-Smirnov value may be a result of a Kolmogorov-Smirnov test (K-S test or KS test). The Kolmogorov-Smirnov test is a nonparametric test of the equality of continuous, one-dimensional probability distributions that can be used to compare a sample with a reference probability distribution (one-sample K-S test), or to compare two samples (e.g., of data S). In various embodiments, a two-sample K-S test may be used to compare a segment to another segment, compare data within the segment to all other data (e.g., received by the input module), and/or to determine if distribution of data in a dimension for a segment is significantly different from distribution of all data (e.g., of data S) in that dimension.

In various embodiments, the feature engine 2218 may determine significance of the received or selected one or more dimensions to one or more segments based on the p-value(s) and/or the K-S values. In one example, the feature engine 2218 may rank the p-value(s) and/or the K-S values and select the top dimensions based on the lowest p-value(s) and/or the highest K-S values relative to other dimensions. In another example, the feature engine may compare each p-value and/or the K-S value to one or more thresholds (e.g., a p-value threshold and/or a K-S value threshold) to determine significance. It will be appreciated that a data analyst may provide the threshold(s) or select dimensions based on p-value(s) and/or the K-S values to determine features (e.g., significant dimensions for one or more segments).

The learning engine 2220 may learn additional information regarding a generated TDA graph and generate one or more criterion regarding the TDA analysis, segments identified by the segment engine 2214, and/or features identified by the feature engine 2218. For example, the analysis module 2208 may perform TDA analysis on data from a data warehouse including claims for payment related to health services. The graph engine 2210 may generate nodes containing data points related to the claims and the segment engine 2214 may identify a plurality of segments, each segment including one or more nodes. The feature engine 2218 may identify dimensions of significance (e.g., features) of the segments. The learning engine 2220 may, in some embodiments, receive information regarding one or more of the data points. For example, the learning engine 2220 may receive a list of known data points confirmed to be related claim fraud (e.g., from conviction records or the like). The learning engine 2220 may identify segments and/or nodes that contain one or more data points related to any number of the known claim fraud information.

In some embodiments, the learning engine 2220 may determine features for the segments containing a concentration of data points associated with claim fraud and may generate a criteria related to the similarity of the data points in the segment and/or significant dimensions/values related to the segment. The criteria may indicate conditions and/or occurrences that are linked to claim fraud based on the analysis performed by the analysis system 1910 and/or the features identified by the feature engine 2218.

The rules engine 2222 may generate one or more rules based on the criteria created by the learning engine 2220. For example, the rules engine 2222 may provide a rule that generates a message or otherwise identifies an entity based on new transactions (e.g., new records received by the fact table), new information (e.g., new information received by one or more dimension tables), or one or more new data points received by the analysis system 1910.

In one example, the data warehouse (e.g., an administrator using a query language on data in fact tables, related dimension tables, and other information) may query records or track behaviors based on the criteria generated by the learning engine 2220 and/or the rule(s) generated by the rules engine 2222. In this example, the rule may indicate behaviors associated with claim fraud (e.g., multiple claims at a certain rate, during a particular time period, in a certain geographic region). The data warehouse may then generate a message or otherwise indicate that entities and/or transactions may need investigation for potential claim fraud (e.g., in order to stop criminal activity, save money, and/or satisfy relevant regulation).

In another example, the analysis system 1910 may receive one or more new data points and may determine a location in the predetermined TDA graph. If one of the nearest neighbors to the new data point(s) is a node with data points of known claim fraud information (e.g., the data points related to the claim fraud information that are members of one or more nodes proximate to a location of the new data point are over a predetermined threshold or a proportion of the data points in the node is associated with claim fraud), then a rule may be triggered to provide a message that the new data point(s) or a subset of the new data points may require investigation. Similarly, if any number of the new data point(s) is located in a segment of the TDA graph that has a number of nodes with data points known to be associated with claim fraud (e.g., above a quantity threshold or a proportion threshold), a rule may be triggered to provide a message that the new data point(s) or a subset of the new data points may require investigation.

There may be any number of different criteria and different rules generated for different information. For example, a criteria and rule may be generated to indicate when individuals being treated for head trauma are likely to suffer from a severe post treatment condition. In this example, the fact table may include information regarding patients that suffer from head trauma (and/or other conditions). Related dimension tables may provide further information. The analysis system 1910 may perform TDA analysis on any information from the fact table and/or dimension table, identify segments including any number of nodes, and identify features of the segments. The learning engine 2220 may receive a list of patients that suffered from severe post treatment condition and may identify segments and nodes as well as features of the segments that contain data points related to one or more of the list of patients (e.g., data points of a particular segment correspond to a large number of patients in the list). The learning engine 2220 may generate criteria based on the features as well as any other information and the rules engine 222 may generate a rule to flag when new patients are treated with conditions that are similar to that of the model.

The database storage 2224 is configured to store all or part of the data, subsets of data, graph information, explaining information (e.g., information indicating relationships, similarity, and/or dissimilarity of data in the modified graph) or any other information. Further, the database storage 2224 may be used to store user preferences, lens functions, metric functions, resolutions, parameters, and analysis output thereby allowing the user to perform many different functions without losing previous work.

It will be appreciated that the analysis system 1910 may include a processing module (e.g., processing module 312) that may include any number of processors.

In various embodiments, systems and methods discussed herein may be implemented with one or more digital devices. In some examples, some embodiments discussed herein may be implemented by a computer program (instructions) executed by a processor. The computer program may provide a graphical user interface. Although such a computer program is discussed, those skilled in the art will appreciate that embodiments may be performed using any of the following, either alone or in combination, including, but not limited to, a computer program, multiple computer programs, firmware, and/or hardware. The instructions may be maintained or stored in a non-transitory memory.

A module and/or engine may include any processor or combination of processors. In some examples, a module and/or engine may include or be a part of a processor, digital signal processor (DSP), application specific integrated circuit (ASIC), an integrated circuit, and/or the like. In various embodiments, the module and/or engine may be software or firmware.

Figure 23:
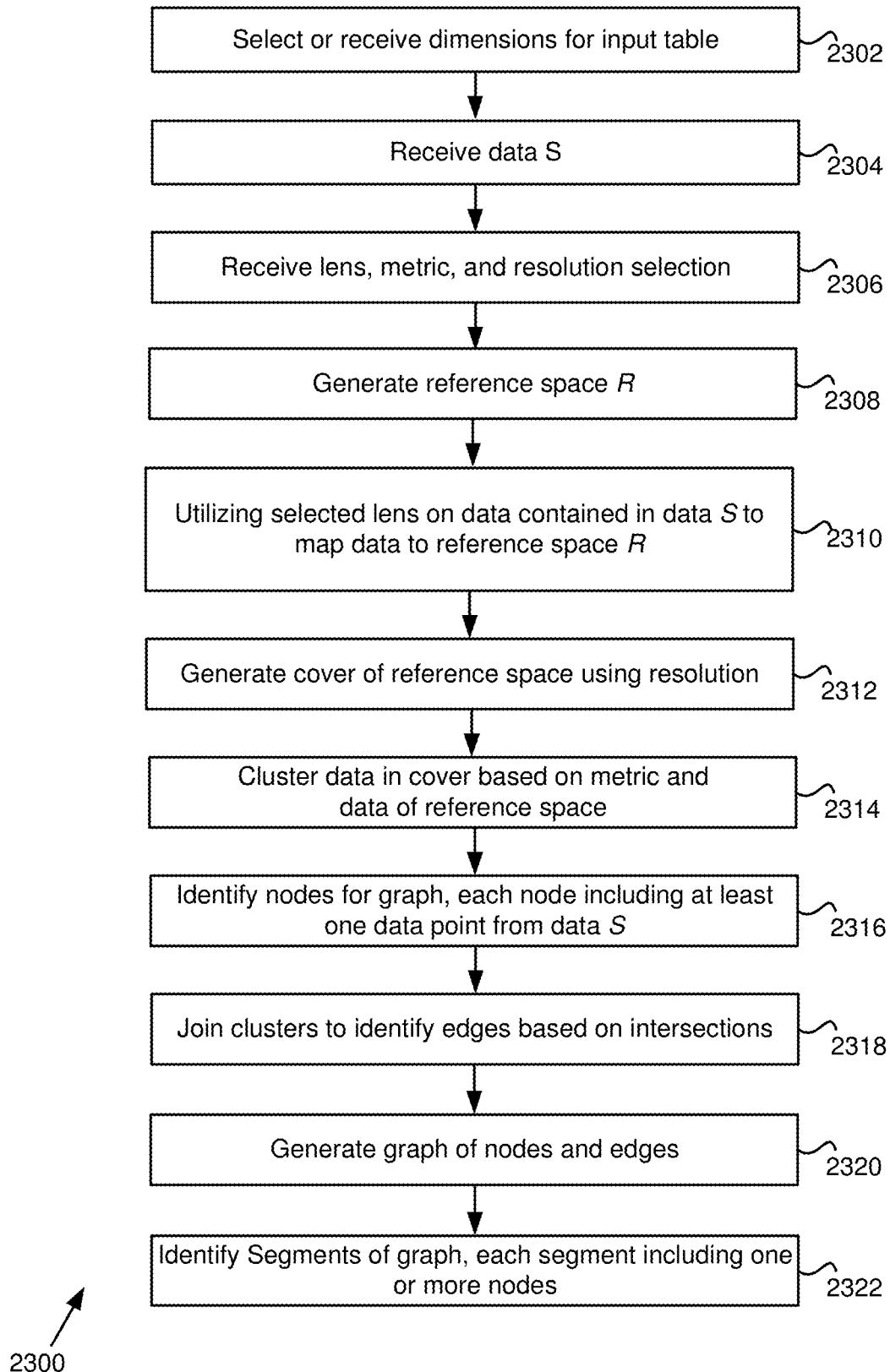
FIG. 23 is a flow chart for performing TDA on a data using lens function(s), metric function(s), and a resolution in some embodiments.

FIG. 23 is a flow chart 2300 for performing TDA on a data using lens function(s), metric function(s), and a resolution in some embodiments. As similarly discussed regarding the flowchart of FIG. 8, in various embodiments, the processing on data and user-specified options is motivated by techniques from topology and, in some embodiments, topological data analysis. These techniques may be robust and general. In one example, these techniques apply to almost any kind of data for which some qualitative idea of "closeness" or "similarity" exists. The techniques discussed herein may be robust because the results may be relatively insensitive to noise in the data and even to errors in the specific details of the qualitative measure of similarity, which, in some embodiments, may be generally refer to as "the distance function" or "metric." It will be appreciated that while the description of the algorithms below may seem general, the implementation of techniques described herein may apply to any level of generality.

In this flowchart, performing TDA on any data set (e.g., data in received from or accessed from any number of sources including data warehouse system and/or one or more spreadsheets) is discussed. In step 2302, the input module 2202 (see FIG. 22) receives a selection of dimensions (e.g., a subset) from a fact table and/or one or more dimension tables of one or more data warehouses for an input table. As discussed herein, the input module 2202 may receive an indication of data points (e.g., based on a dimension from the fact table and/or one or more dimension tables) as well as dimensions (e.g., from the fact table and/or one or more dimension tables). The input module 2202 may provide the data points and dimensions as data S to be analyzed.

FIG. 24 is an example of an input table 2400. As discussed herein, the input module 2202 may or may not generate the input table 2400. In one example, the input module 2202 generates the input table 2400 based on at least some information from the fact table 2000 and one or more of the dimension tables 2018-2030. In this example, the input table 2400 received data points based on patients (e.g., based on the patient ID 2402 that may have been received from the patients dimension table 2018). Each row of the input table 2400 may be a data point. The dimensions in this example include the different medications including a medicine Ma dimension 2404 (related to patients that may have taken or been prescribed medication Ma), a medicine Mxy dimension 2406 (related to patients that may have taken or been prescribed medication Mxy), and/or other dimensions. The dimensions may include other medication dimensions, hospital dimensions, doctor dimensions, patient dimensions, and/or the like. Although the input table 2400 depicts three patients and two dimensions other than patients, it will be appreciated that the input table 2400 may include any number of data points (e.g., any number of patients) and any number of dimensions.

In step 2304, the input module 2202 (see FIG. 22) receives data S (e.g., the data being from the data warehouse and optionally from the input table 2400). In various embodiments, data S is treated as being processed as a finite "similarity space," where data S has a real-valued function d defined on pairs of points s and t in S, such that:

$d(s,s)=0$ $d(s,t)=d(t,s)$ $d(s,t)>=0$

These conditions may be similar to requirements for a finite metric space, but the conditions may be weaker.

Data S may include any number of the data points from the data warehouse and/or from the input table 2400. Similarly, data S may include any number of columns from the data warehouse and/or from the input table 2400. In some embodiments, any or all of the data or subsets of data from any column may be changed, altered (e.g., using a function to generate a new value), or disregarded. Similarly, additional columns (e.g., dimensions) may be created using information from different sources and/or using one or more functions based on existing data from the data warehouse and/or from the input table 2400.

It will be appreciated that data S may be a finite metric space, or a generalization thereof, such as a graph or weighted graph. In some embodiments, data S be specified by a formula, an algorithm, or by a distance matrix which specifies explicitly every pairwise distance. It will be appreciated that in this example, data S may include a subset of data or the entire set of data.

In step 2306, the input module 2202 may receive a lens function and metric function selection. The lens function may be any function or combination of functions that project data (e.g., maps data) based on data S in a reference space. There may be any number of selected lens functions. The metric function may be any function or combination of functions for clustering data in a covered reference space.

The lens and/or metric function selections may be provided by a data analyst, administrator, inferred from all or part of data S, in the data S, or any other source. The lens function may be any function, including, but not limited to L1 centrality, L2 centrality, Gaussian density, PCA, metric PCA, MDS, or the like.

In steps 2308 and 2310, the input module 2202, the lens and metric module 2204, and/or the analysis module 2208 may generate reference space R and may map data S to the reference space utilizing the selected lens function and data S. In some embodiments, the selected lens function may utilize the selected metric function to map data S to the reference Space R. It will be appreciated that, in some embodiments, steps 2308 and 2310 may be the same step.

In one example of step 2310, the analysis module 2208 utilizes the selected lens function(s) using one or more of the selected metric function(s) on all or some of the data contained in data S to map the data S to the reference space R (e.g., where data S has m rows and n columns). Reference space R may be a metric space (e.g., such as the real line). In some embodiments, the analysis module 2208 generates a map ref( ) from S into R. The map ref( ) from S into R may be called the "reference map." In one example, R may be Euclidean space of some dimension, but it may also be the circle, torus, a tree, or other metric space. The map can be described by one or more lens functions (i.e., real valued functions on S).

In step 2312, the resolution module 2206 generates a cover of R based on the resolution (e.g., intervals, and overlap—see discussion regarding FIG. 7 for example). The resolution may be received from data analyst, administrator, inferred from all or part of data S, in the data S, determined by outcome analysis (discussed in US Publication 2016/0350389, titled "Outcome Analysis for Graph Generation," filed May 26, 2016, and incorporated herein by reference), or any other source. Similarly, in some embodiments, one or more of the lens function(s) and/or the metric function(s) may be determined by outcome analysis described in the reference above.

The cover of R may be a finite collection of open sets (in the metric of R) such that every point in R lies in at least one of these sets. In various examples, R is k-dimensional Euclidean space, where k is the number of lens functions. More precisely in this example, R is a box in k-dimensional Euclidean space given by the product of the intervals [min_k, max_k], where min_k is the minimum value of the k-th lens function on S, and max_k is the maximum value.

As discussed herein, suppose there are 2 lens functions, F1 and F2, and that F1's values range from −1 to +1, and F2's values range from 0 to 5. Then the reference space is the rectangle in the x/y plane with corners (−1,0), (1,0), (−1, 5), (1, 5), as every point s of S will give rise to a pair (F1(s), F2(s)) that lies within that rectangle.

In various embodiments, the cover of R is given by taking products of intervals of the covers of [min_k,max_k] for each of the k filters. In one example, if the user requests 2 intervals and a 50% overlap for F1, the cover of the interval [−1,+1] will be the two intervals (−1.5, 0.5), (−0.5, 1.5). If the user requests 5 intervals and a 30% overlap for F2, then that cover of [0, 5] will be (−0.3, 1.3), (0.7, 2.3), (1.7, 3.3), (2.7, 4.3), (3.7, 5.3). These intervals may give rise to a cover of the 2-dimensional box by taking all possible pairs of intervals where the first of the pair is chosen from the cover for F1 and the second from the cover for F2. This may give rise to 2*5, or 10, open boxes that covered the 2-dimensional reference space. However, those skilled in the art will appreciate that the intervals may not be uniform, or that the covers of a k-dimensional box may not be constructed by products of intervals. In some embodiments, there are many other choices of intervals. Further, in various embodiments, a wide range of covers and/or more general reference spaces may be used.

In one example, given a cover, $C_1, \ldots, C_m$, of R, the reference map is used to assign a set of indices to each point in S, which are the indices of the $C_j$ such that ref(s) belongs to $C_j$. This function may be called ref_tags(s). In a language such as Java, ref_tags would be a method that returned an int[ ]. Since the C's cover R in this example, ref(s) must lie in at least one of them, but the elements of the cover usually overlap one another, which means that points that "land near the edges" may well reside in multiple cover sets. In considering the two filter example, if F1(s) is −0.99, and F2(s) is 0.001, then ref(s) is (−0.99, 0.001), and this lies in the cover element (−1.5, 0.5)×(−0.3,1.3). Supposing that was labeled $C_1$, the reference map may assign s to the set {1}. On the other hand, if t is mapped by F1, F2 to (0.1, 2.1), then ref(t) will be in (−1.5,0.5)×(0.7, 2.3), (−0.5, 1.5)×(0.7, 2.3), (−1.5,0.5)×(1.7,3.3), and (−0.5, 1.5)×(1.7,3.3), so the set of indices would have four elements for t.

Having computed, for each point, which "cover tags" it is assigned to, for each cover element, $C_d$, the points may be constructed, whose tags included, as set S(d). This may mean that every point s is in S(d) for some d, but some points may belong to more than one such set. In some embodiments, there is, however, no requirement that each S(d) is non-empty, and it is frequently the case that some of these sets are empty. In the non-parallelized version of some embodiments, each point x is processed in turn, and x is inserted into a hash-bucket for each j in ref_tags(t) (that is, this may be how S(d) sets are computed).

It will be appreciated that the cover of the reference space R may be controlled by the number of intervals and the overlap identified in the resolution (e.g., see further discussion regarding FIG. 7). For example, the more intervals, the finer the resolution in S—that is, the fewer points in each S(d), but the more similar (with respect to the lens) these points may be. The greater the overlap, the more times that clusters in S(d) may intersect clusters in S(e)—this means that more "relationships" between points may appear, but, in some embodiments, the greater the overlap, the more likely that accidental relationships may appear.

In step 2314, the analysis module 2208 clusters data in the cover based on the selected metric function (e.g., cosine distance) and data S (e.g., each S(d) based on the metric function).

In some embodiments, the selected metric function may amount to a "forced stretching" in a certain direction. In some embodiments, the analysis module 2208 may not cluster two points unless all of the metric values (e.g., metric values being based on data in the reference space after application of the selected metric) are sufficiently "related" (recall that while normally related may mean "close," the cover may impose a much more general relationship on the metric values, such as relating two points s and t if ref(s) and ref(t) are sufficiently close to the same circle in the plane).

The output may be a simplicial complex, from which one can extract its 1-skeleton. The nodes of the complex may be partial clusters, (i.e., clusters constructed from subsets of S specified as the preimages of sets in the given covering of the reference space R).

In step 2316, the graph engine 2210 identifies nodes which are associated with a subset of the partition elements of all of the S(d) for generating a graph. For example, suppose that S={1, 2, 3, 4}, and the cover is $C_1, C_2, C_3$. Then if ref_tags(1)={1, 2, 3} and ref_tags(2)={2, 3}, and ref_tags(3)={3}, and finally ref_tags(4)={1, 3}, then S(1) in this example is {1, 4}, S(2)={1,2}, and S(3)={1,2,3,4}. If 1 and 2 are close enough to be clustered, and 3 and 4 are, but nothing else, then the clustering for S(1) may be {1} {3}, and for S(2) it may be {1,2}, and for S(3) it may be {1,1}, {3,4}. So the generated graph has, in this example, at most four nodes, given by the sets {1}, {4}, {1,2}, and {3,4} (note that {1,2} appears in two different clusterings). Of the sets of points that are used, two nodes intersect provided that the associated node sets have a non-empty intersection (although this could easily be modified to allow users to require that the intersection is "large enough" either in absolute or relative terms).

Nodes may be eliminated for any number of reasons. For example, a node may be eliminated as having too few points and/or not being connected to anything else. In some embodiments, the criteria for the elimination of nodes (if any) may be under user control or have application-specific requirements imposed on it.

In step 2318, the graph engine 2210 optionally joins clusters to identify edges (e.g., connecting lines between nodes). Once the nodes are constructed, the graph engine 2210 may compute intersections (e.g., edges) by computing, for each point, the set of node sets. For example, for each s in S, node_id_set(s) may be computed, which is an int[ ]. In some embodiments, if the cover is well behaved, then this operation is linear in the size of the set S, and may then iterate over each pair in node_id_set(s). There may be an edge between two node_id's if they both belong to the same node_id_set( ) value, and the number of points in the intersection is the number of different node_id sets in which that pair is seen. This means that, except for the clustering step (which is often quadratic in the size of the sets S(d), but whose size may be controlled by the choice of cover), all of the other steps in the graph construction algorithm may be linear in the size of S, and may be computed quite efficiently. In various embodiments, the graph engine 2210 may generate a graph without generating edges between nodes.

In step 2320, the graph engine 2210 generates the graph (e.g., modified graph) of interconnected nodes. In various embodiments, the visualization engine 2212 generates a visualization of the graph (e.g., nodes and edges displayed in FIGS. 9 and 10). The visualization may be interactive as described herein.

In step 2322, the segment engine 2214 identifies any number of segments of nodes of the graph. A segment may be a group of nodes. In some embodiments, each segment does not share any nodes with any other segments. As discussed herein, the segment engine 2214 may select segments based on any number of ways. For example, the segment engine 2214 may receive selections by a data analyst (e.g., who identifies groups of nodes in the visualization), based on a criteria (e.g., received from a data source, data analytics tool, or data analyst), autogrouping (described herein), or any number of ways.

Figure 25:
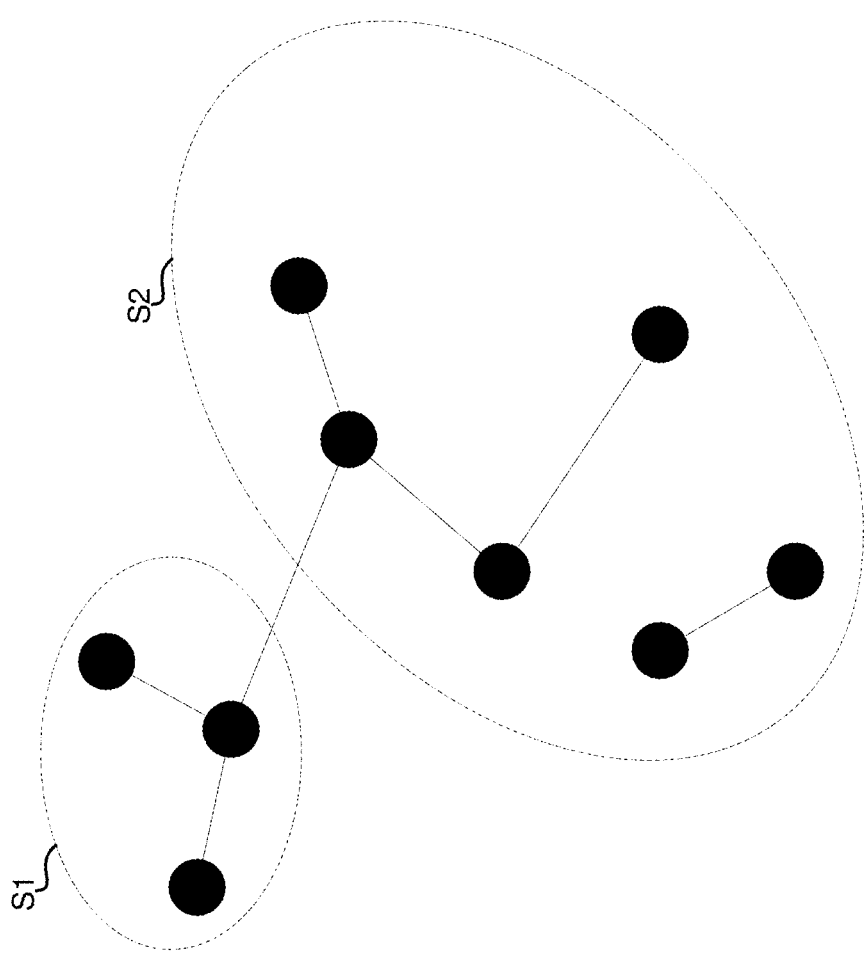
FIG. 25 depicts an example network visualization with two segments of nodes including S1 and S2.

FIG. 25 depicts an example network visualization with two segments of nodes including S1 and S2. It will be appreciated that a network visualization may include any number of nodes and any number of edges between nodes that share data points as members. Each segment may be a group of nodes. The segments selected in FIG. 25 may be identified by the segment engine 2214 based on autogrouping, a criteria provided by a data analyst, and/or any number of other methods.

Optionally, the dimension engine 2216 may generate a segment dimension table. The segment dimension table may identify segments from the segment engine 2214 as well as nodes and/or data points of nodes that are members of the segments.

Figure 26:
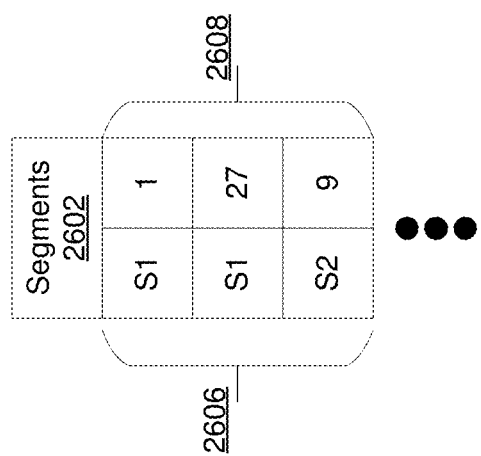
FIG. 26 is an example segment dimension table.

FIG. 26 is an example segment dimension table 2602. The segment dimension table 2602 may be ordered in any number of ways. In this example, segment S1 contains data points 1 and 27 (that correspond to patient identifiers 1 and 27 in the fact table 2000 and the patient dimension table 2018). While the segment dimension table 2602 in FIG. 26 depicts segments and data points that are members of the segments, the segment dimension table 2602 may further include nodes that are members of the segments, information related to the data points (e.g., from one or more dimensions of the fact table 2000 and/or the dimension tables 2018-2030), information related to the graph (e.g., edges, node colorization, data point density information), average dimension values of data points (e.g., average dimension values for values of any dimension related to the data points in a node or segment), and/or the like. In some embodiments, the segment dimension table 2602 does not include entity information (e.g., the segment dimension table 2602 may include nodes or other information but not patients).

In various embodiments, the dimension engine 2216 may provide the segment dimension table and/or any related tables to the data warehouse system 1908. The segment dimension table and/or any dimension tables including at least some information from the graph may be provided to the data warehouse system 1908. The data warehouse system 1908 may link and/or store the segment dimension table and/or other dimension tables to the fact table and/or one or more dimension tables (e.g., thereby extending or creating a snowflake schema).

It will be appreciated that information within the data warehouse system 1908, including the fact tables and dimension tables (as well as the segment dimension table and/or any dimension tables including at least some information from the graph) may be further analyzed or queried.

FIG. 27 depicts a variety of example graph dimension tables 2702-2710 that may be generated by the dimension engine 2216. The graph dimension tables generated by the dimension engine 2216 may be provided to the data warehouse system 1908 and/or analysis system 1910 for further analysis (e.g., query based analysis). In some embodiments, the graph dimension tables may be provided for inclusion within a data warehouse system 1908. While data warehouses are discussed herein, it will be appreciated that generating the graph dimension tables based on information generated by the analysis system 1910 may provide a data analyst with additional information that may be analyzed.

For example, the visualization or graph itself may not be in the correct form for analysis. However, tables that include information related to the visualization and/or the graph may be in the correct form for query based analysis and/or other analytical tools.

FIG. 27 depicts a data point dimension table 2702, a points_nodes dimension table 2704, an edge dimension table 2706, a nodes_segments dimension table 2708, and a node_color dimension table 2710. Although only five dimension tables are depicted in FIG. 27, it will be appreciated that any number of dimension tables may be generated. In some embodiments, the dimension tables related to the graph may be linked to one or more dimension tables and/or the fact table of the data warehouse to assist in further query-based analytics.

The data point dimension table 2702 may include a dimension of data points, each data points being associated with identifiers or other information from data S and/or transformations that occurred during the TDA process. In one example, the data point dimension table 2702 may identify data points with a data point identifier as well as an identifier from a dimension table of the data warehouse (e.g., with a patient identifier).

The points_nodes dimension table 2704 may identify each data point as well as each node of the graph of which that data point is a member. In this example, data point 1 is a member of node N1, data point 1 is also a member of node 8, data point 3 is a member of node 389, and so on.

The edge dimension table 2706 may identify each node that is connected to another node (e.g., the nodes sharing at least one data point as members). In this example, the edges dimension table 2706 indicates that there is an edge between node 1 and node 2, between node 1 and node 8, between node 10 and node 15, and so on.

The nodes_segments dimension table 2708 may identify each node that is a member of a segment and identify the segment that contains that node. In this example, the nodes_segments dimension table 2708 indicates that node 1 belongs to segment 1, node 2 belongs to segment 1, node 3 belongs to segment 3, and so on.

Nodes may be colored in a visualization based on a dimension or attribute. For example, the nodes in the visualization may be colored based on outcome, or another dimension (e.g., medication interaction, insulin level, insulin response, or any other dimension or combination of dimensions).

As discussed herein, nodes can be colored based on any number of factors. In one example, if the nodes are colored based on the blood glucose dimension, the analysis system 1910 may scan the range of values of the blood glucose dimension. Alternately, the range of possible values may be received from another source (e.g., the data warehouse system 1908). The analysis system 1910 may associate the range of values for blood glucose with a range of colors (e.g., greyscale values, heatmap colors, or the like).

The visualization engine 2212 may determine a color for each node based on the data points that are members of that particular node. If there is only one data point that is a member of the node, the visualization engine 2212 may color that node based on the color associated with that data point's value in that particular dimension.

If there are more than one data point that is a member of the node, in some embodiments, the visualization engine 2212 may average the value of that dimension for all data points (e.g., mean, median, or mode) to determine a node representation dimension value and then may color the node based on the color associated with the node representation value. It will be appreciated that that the visualization engine 2212 may determine a node representation dimension value using any function or combination of functions (and is not limited to averaging of values).

In various embodiments, the visualization engine 2212 may display the range of colors, range of values, dimensions that are being colored, statistical values, and/or the like in a legend of the visualization.

The node_color dimension table 2710 may identify each node and a color of the node in a visualization. In this example, node 1 has color C1, node 2 is colored by the same color C1, node 3 is colored by color C2, and so forth.

It will be appreciated that one or more of the dimension tables depicted in FIG. 27 are optional. In some embodiments, the dimension engine 2216 may generate any dimension table containing information regarding the graph of the TDA analysis (e.g., including identification of nodes, edges between nodes, data point membership of nodes, segments, and/or the like). Any or all of the dimension tables generated by the dimension engine 2216 may be further analyzed using analytical tools without being linked to a data warehouse (e.g., without being linked to a fact table or pre-existing dimension table).

In some embodiments, the dimension tables may optionally be provided to the data warehouse system 1908. The data warehouse system 1908 may link or reference any or all of the dimension tables from the dimension engine 2216 to the fact table and/or any number of dimension tables. In this example, the dimension tables generated by the dimension engine 2216 dimension table of the data warehouse system 1908, and/or fact table of the data warehouse system 1908 may enable further query based analytics. Whether linked to information contained in a data warehouse system 1908 or not provided or linked to such information, the dimension tables may enable further query based analytics on information from the TDA graph.

As discussed herein, the TDA platform is capable of generating an insightful topological graph with data. The generated topological graph has many properties (e.g., nodes, edges, indications of dimension, and/or the like) that can be interesting to the end user, however, the graph itself may not enable query-based analysis (e.g., using a query language such as SQL). In other words, query-based analysis is a very common form of analysis and the topological graph (e.g., network graph) may not receive traditional queries. In order to provide insights of the topological graph and further enable query-based analytical approaches (e.g., leveraging information used by and discovered by the graph, the analysis system 1910 may generate one or more data structures (e.g., tables) containing information regarding the graph. For example, one or more data structures containing information regarding the graph may include, but is not limited to, information regarding nodes, node membership, edges between nodes, density of data points within nodes or groups of nodes, distribution of data points, distribution and/or statistical measures of one or more dimensions of data points of any number of nodes, and/or the like.

The one or more data structures may be the subject of query-based analytical approaches. As a result, insights in the shape and relationships contained within data may be obtained and query-based analytical tools using query languages may further extend and leverage those insights.

In one example, the graph generated by the graph engine 2210 may contain interesting properties such as colors, affinities, points within nodes, topological groups (e.g., segments), neighborhoods, statistical information about nodes, and/or the like. Further mining the graph to find out those interesting properties using queries and other analytical tools (e.g., associated with the data warehouse or not associated with the data warehouse) may be valuable to end users because of the insights contained in the graph. However, there may be only limited tools for mining the topography of the structure itself and some information may not be discovered. In some embodiments, finding insights from the graph is performed via writing code to extract meanings By generating dimension data structures such as dimension tables (e.g., by the dimension engine 2216) that include information based on the graph and/or the TDA process on the data S, the dimension engine 2216 enables query capabilities for the graph. Query capability refers to either SQL-like language or natural language.

In one example, an SQL-like language (or SQL itself) is used for illustration. In this example, a graph includes nodes, the nodes have colors, and each node contains at least one data points. Nodes that share data points as members are connected by edges.

The following are queries that may be created using the SQL-like language and the dimension tables from the dimension engine 2216:

1. Find nodes that have the same red color:
Select Nodes where node.color from topoGraph1;
2. Find nodes that contains points with fraud data:
Select Nodes where node.points.fraud=true from topoGraph1;
3. Find topological groups:
Select Groups from TopoGraph1;

The above examples are for simple illustration purposes. By generating dimension tables based on the graph of the analysis system 1910 (with or without links or references to other fact tables or dimension tables of a data warehouse), a query capability is enabled to serve complex and powerful queries. With this capability, an end user can mine the topological graph much more easily without coding or without the end user having a deep topological background. This may also enable the creation of domain specific applications that interact, leverage, and/or create a topological graph.

In some embodiments, the data structures may be provided to a data warehouse system 1908 to be linked to a fact table and/or related dimension table(s) (e.g., the fact table dimension tables containing data that was analyzed by the analysis system 1910 to generate the graph). Providing query capabilities for the topological graph can enable the end user to further discover and analyze properties in the graph, data produced in creating the graph, and/or information in the data warehouse. For example, a query and/or other analytical tools may address the fact table, any number of related dimension tables, as well as the data structures containing information regarding the graph.

In various embodiments, the dimension data structure (e.g., dimension tables) based on the graph may be queried using query-based languages and/or the subject of other analytical tools. The dimension data structure may or may not be combined with other information from other data structures (such as tables from a data warehouse). It will also be appreciated that the dimension data structure based on the graph may be combined with other tables and/or information (e.g., the other information not necessarily being included in the data that was analyzed in creating the graph). The combination may be the subject of query-based analysis and/or other analytical (e.g., statistical) approaches.

While query-based approaches are discussed herein regarding the creation of one or more data structures from information contained within the graph, it will be appreciated that many statistical and analytical approaches (whether query-based or not) may utilize any number of the data structures for further analysis. Query-based approaches and TDA are further discussed within U.S. Patent Application Ser. No. 62/365,362, filed Jul. 21, 2016, entitled "Systems and Methods to Generate Queries for Topological Data Analysis (TDA) Visualizations," which is incorporated by reference.

Figure 28:
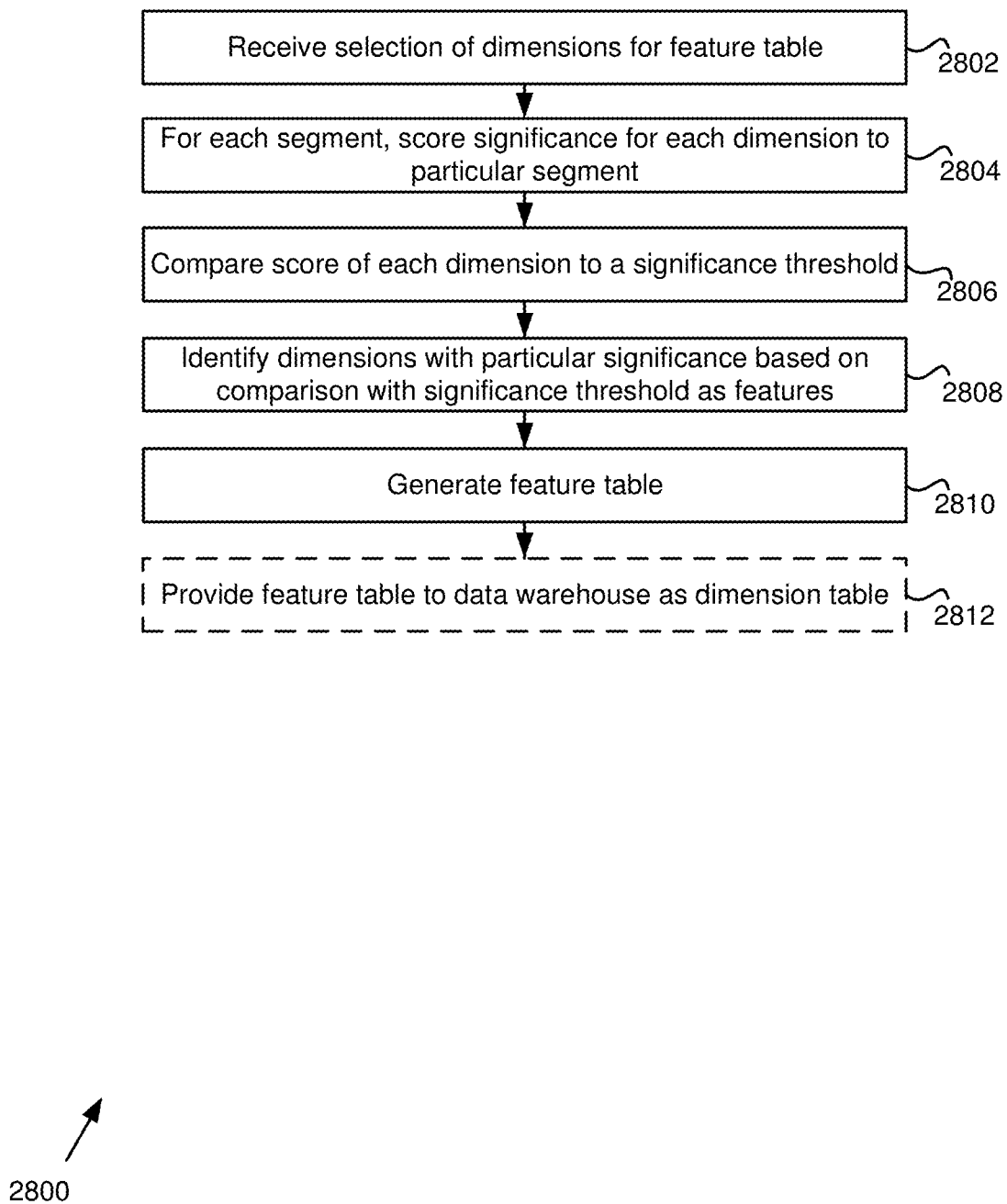
FIG. 28 is a flowchart for generating a feature table in some embodiments.

FIG. 28 is a flowchart 2800 for generating a feature table in some embodiments. In step 2802, the feature engine 2218 receives a selection of dimensions for a feature table. The dimensions may be received from a data analyst, from a data source, from within the data, from a data warehouse system 1908, or any other source. For example, dimensions may include outcome, cost, detection of fraud, health conditions, diagnosis, and/or any other dimension.

In step 2804, for each segment identified by the segment engine 2214, the feature engine 2218 may score significance for each dimension or value of dimension to that particular segment. For example, one or more dimensions may be received or selected by the feature engine 2218. The one or more dimensions may include any number of dimensions included in the TDA analysis and/or any number of dimensions not included in the TDA analysis. For example, the feature engine 2218 may receive a selection of one or more dimensions from any number dimension tables in the data warehouse system 1908 that were not considered by the analysis module 2208 in performing the TDA analysis.

In another example, one or more values of any number of dimensions may be received or selected by the feature engine 2218. The one or more values may include any number of values included in the TDA analysis and/or any number of dimensions not included in the TDA analysis. For example, the feature engine 2218 may receive a selection of one or more values of dimensions from any number dimension tables in the data warehouse system 1908 that were not considered by the analysis module 2208 in performing the TDA analysis.

As discussed herein, the feature engine 2218 may generate a probability value (i.e., a p-value) and/or a Kolmogorov-Smirnov value to determine significance of any dimension or value (e.g., to determine if the dimension or value is distinguished relative to the segment). The p-value is a probability for a given statistical model that, when the null hypothesis is true, the difference between two compared groups would be the same as or more extreme than the observed results. The Kolmogorov-Smirnov value may be a result of a Kolmogorov-Smirnov test (K-S test or KS test). The Kolmogorov-Smirnov test is a nonparametric test of the equality of continuous, one-dimensional probability distributions that can be used to compare a sample with a reference probability distribution (one-sample K-S test), or to compare two samples two-sample K-S test).

In step 2806, the feature engine 2218 may compare scores for each dimension or value to a significance threshold. In one example, the feature engine may compare each p-value and/or the K-S value to one or more thresholds (e.g., a p-value threshold and/or a K-S value threshold) to determine significance. It will be appreciated that a data analyst may provide the threshold(s) or select dimensions/values based on p-value(s) and/or the K-S values to determine features (e.g., significant dimensions for one or more segments).

In step 2808, the feature engine 2218 identifies dimensions or values with significance to the relevant segment based on the comparison with one or more scores to one or more thresholds. Although this step discussed comparing scores to predetermined thresholds, it will be appreciated that the feature engine 2218 may determine significance based on any number of factors and/or scores.

In step 2810, the feature engine 2218 may generate a feature table identifying those dimensions or values determined to be significant.

FIG. 29 depicts an example feature table 2900 generated by a feature engine 2218. The feature table 2900 includes a segment ID dimension 2902, a tested feature dimension 2904, a KS value 2906, and a p-value 2908. In various embodiments, the feature table 2900 may include only those dimensions determined to be significant to the related segment. In other embodiments, the feature table 2900 may include any number of (e.g., all) tested dimensions (e.g., tested features) as well as their related KS values and p-values. For example, the feature engine 2218 may only include those features with KS values and p-values that exceed one or more thresholds and/or those features that satisfy other statistical comparisons.

In feature table 2900, the segment ID dimension 2902 includes a segment for each row. The tested feature dimension 2904 includes a particular tested value of a dimension for each row. The KS value dimension 2906 includes a KS value for each row (e.g., the KS value being for the particular tested feature of that row for the identified segment). The p-value dimension 2908 includes a p-value for each row (e.g., the p-value being for the particular tested feature of that row for the identified segment).

For example, for segment S1 in the feature table 2900, the medication Ma has a KS value of 0.8201 and a p-value of 0.05. Also for segment S1, the medication Mxy has a KS value of 0.2 and a p-value of 0.03. The ellipses in the other cells for the KS values and the p-values represent other score values.

It will be appreciated that the feature table 2900 may include any number of rows for any number of segments and any number of tested features.

In optional step 2812, the feature engine 2218 may provide the feature table to a data warehouse as a dimension table. The feature table may be related to a fact table and/or one or more dimension tables (e.g., fact table 2000 and/or dimension tables 2018-2030).

Figure 30:
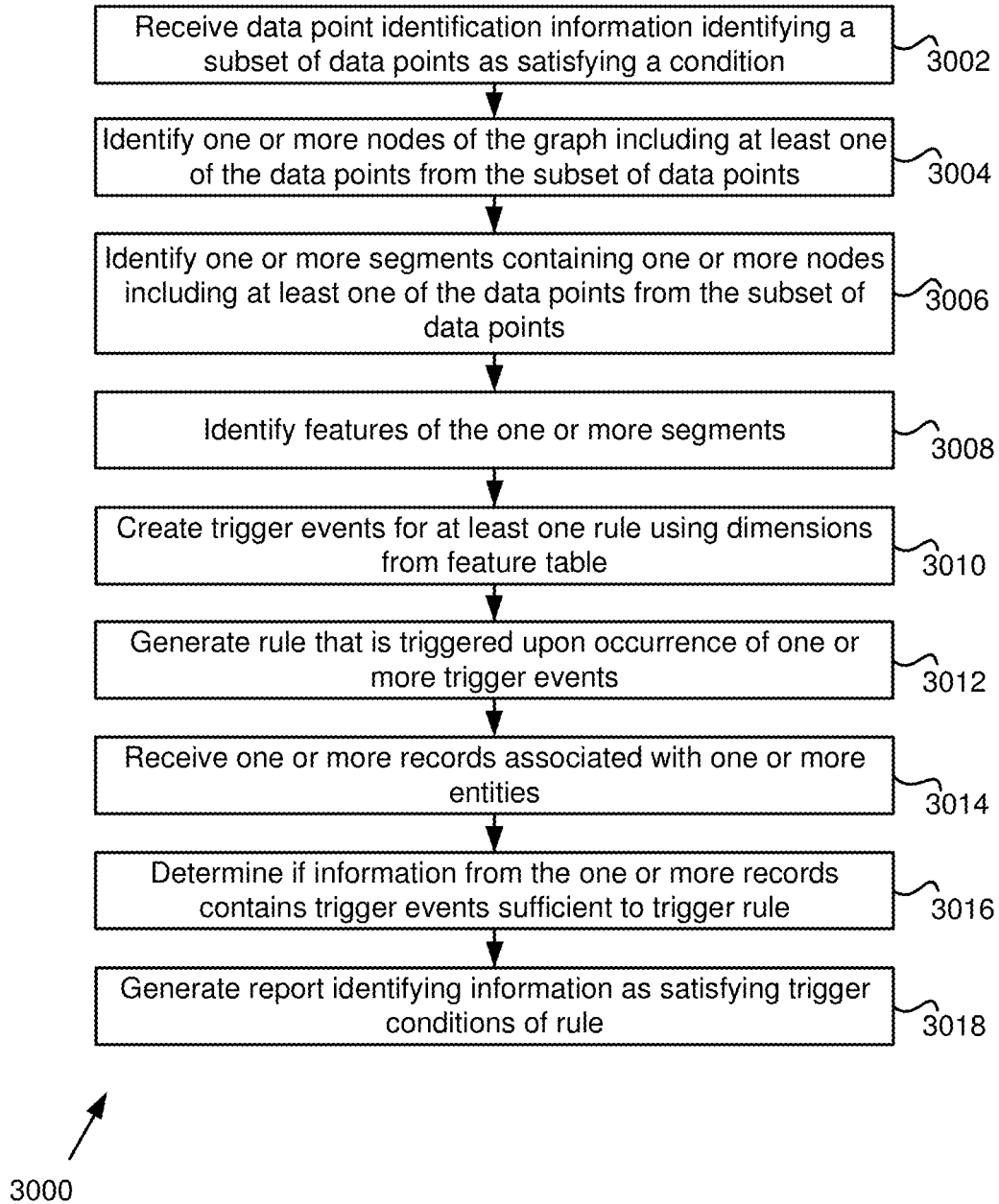
FIG. 30 is a flowchart for identifying new events and/or information as triggering rules based on learned information in some embodiments.

FIG. 30 is a flowchart 3000 for identifying new events and/or information as triggering rules based on learned information in some embodiments. In step 3002, the learning engine 2220 receives data point identification information identifying a subset of data points as satisfying a condition.

In some embodiments, a TDA graph is generated based on information from a fact table and/or one or more dimension tables of a data warehouse system 1908. Alternately, the TDA graph is generated based on any information from any number of sources but not a data warehouse system 1908.

The TDA graph in this example is generated based on financial transaction information involving a plurality of entities as data points. The data point identification information may identify a set of entities that are confirmed, known, or suspected money launderers. In another example, the data point identification information may identify situations or events known to be evidence of money laundering. While money laundering is used in this example, it will be appreciated that the data point identification information may identify any type of data points as satisfying any condition or combination of conditions.

In step 3004, the learning engine 2220 identifies one or more nodes of the graph including at least one of the data points from the subset of data points identified in the data point identification information. In some embodiments, the learning engine 2220 may utilize one or more dimension tables generated by the dimension engine 2216 to identify nodes that contain one or more data points identified in the data point identification information.

In step 3006, the learning engine 2220 identifies one or more segments of the graph (e.g., the segments being identified by the segment engine 2214) containing the identified one or more nodes of the graph (e.g., the one or more nodes containing the one or more points identified in the data point identification information). In some embodiments, the learning engine 2220 may utilize one or more dimension tables generated by the dimension engine 2216 to identify segments that contain one or more nodes in the data point identification information.

In step 3008, the feature engine 2218 may identify features of the one or more segments based on any number of dimensions (e.g., any dimensions of the fact table and/or dimension tables of the data warehouse system 1908). The features may include dimensions with scored significance for the related segments as described herein.

In step 3010, the learning engine 2220 generates criteria including trigger events for at least one rule using one or more dimensions that are identified as features (e.g., features that are sufficiently significant) by the feature engine 2218.

In step 3012, the rules engine 2222 generates a rule that is triggered upon an occurrence or multiple occurrences of one or more of the trigger events. For example, the rule may indicate that when certain conditions are met (e.g., certain financial transactions with particular financial institutions and/or countries and the amount involved is over a certain amount involving particular financial vehicles), a message identifying the entit(ies), transaction(s), or any other information involved is sent to a regulator or investigator.

In step 3014, one or more records associated with one or more entities is received. In one example, the data warehouse system 1908 receives the rule from the rules engine 2222 and monitors new records of the fact table and/or related dimension tables.

In step 3016, the data warehouse system 1908 may determine if information from all or part of the one or more records satisfies the trigger events of the rule. In this example, based on the TDA analysis and information regarding known money laundering, the learning engine 2220 recognizes conditions associated with known money laundering and/or a likelihood of money laundering. The rules engine 2222 may generate a rule with criteria (e.g., trigger conditions) that may indicate when money laundering is occurring or is likely to occur (e.g., potentially based on some degree of confidence scoring). The data warehouse or any entity can then recognize when new events satisfy the criteria of the rule and perform additional investigation.

In step 3018, the data warehouse system 1908, other monitoring entity, or entity that received a message caused by triggering of the rule may generate a report identifying the information (e.g., records, entity, transaction information, and/or other information) that caused satisfaction of the triggers to engage the rule.

In other embodiments, the learning engine 2220 may not identify criteria. For example, the learning engine 2220 identify nodes and/or segments containing information associated with the received data point identification information. The learning engine 2220 may evaluate the association between the identified nodes and/or segments with the data point identification information. For example, if the nodes and/or segments includes a number of data points from the data point identification information that exceeds a particular threshold, then the learning engine 2220 may identify the nodes and/or segments as being of interest. In another example, if the nodes and/or segments includes a number of data points from the data point identification information that exceeds a particular proportion of the number of data points in total of the nodes and/or segments (e.g., exceeding a proportional threshold, then the learning engine 2220 may identify the nodes and/or segments as being of interest.

As new data points are received by the analysis system 1910, the analysis system 1910 may determine a location for the new data points in the previously generated graph and determine if a subset of the new data points are within a node and/or segment of interest (or are proximate to a node and/or segment of interest). If the subset of the new data points are within a node and/or segment of interest (or are proximate to a node and/or segment of interest), then the analysis system 1910 may execute the rule to generate a message to further investigate the all or some of the subset (and/or take other action).

In various embodiments, data points of a data set or nodes in a graph are automatically grouped (i.e., "autogrouped") to determine segments. The segments may be approximations of a possible maxima (e.g., a best maxima) of a given scoring function that scores possible partitions of the original object (i.e., a collection of data points or a collection of nodes of a graph).

Autogrouping may be utilized to automatically find a collection of subsets of some set Y that share one or more given properties. In one example, autogrouping may be utilized to find a collection of subsets that is a partition of Y where Y is a subset of a finite metric space X or nodes in a graph. However, it will be appreciated, in some embodiments, that the methodology described herein has no such requirement.

In various embodiments, a selection of possible partitions of a data set (e.g., original data set or nodes in a visualization) may be identified and scored. A partition is a collection of disjoint subsets of a given set. The union of the subsets of each partition equal the entire original set. A hierarchical clustering method may be utilized on the original object Y to create a family of partitions of Y.

A first scoring function may score the subsets (i.e., to generate a Q_Subset score), a second scoring function may score the partitions (i.e., to generate a Q_Partition score), and a third scoring function may score the roots of trees coming from the hierarchical clustering method (i.e., to generate a Q_Max score). The highest scoring partition based on any one or a combination of these scoring functions may be found for the family. The first and/or second scoring functions may be any function or combination of functions that may be able to be scored. Example scoring functions are further discussed herein.

In some embodiments, autogrouping is the process in which a highest scoring partition is identified. The highest scoring partition may be the maximum of the given scoring function(s) of any number of subsets from any number of partitions.

In some embodiments, a limited number of partitions of all possible partitions may be generated. In fact, in some cases, the result may be better if the scorer is imperfect, as at least some hierarchical clustering algorithms generally avoid partitions with large numbers of miscellaneous singletons or other ugly sets which might actually be the global extreme for such a scoring function. It will be appreciated that the hierarchical clustering process may serve to condition data to only present 'good alternatives,' and so can improve the effectiveness of some scorers.

Since the number of partitions for a data set is high (e.g., (N/log(N))^N), it may be impractical to generate every possible partition. Unfortunately, most local improvement methods can easily get stuck. Some techniques to generate a subset of partitions involve attempting to maximize a modularity score over graph partitions by making an initial partition and then making local changes (e.g., moving nodes from one partition to another). Modularity is the fraction of edges that fall within given groups minus the expected such fraction if edges were distributed at random. Unfortunately, the modularity measure Q score may exhibit extreme degeneracies because it admits an exponential number of distinct high-scoring solutions and typically lacks a clear global maximum. Another approach to maximizing functions on partitions by local methods is to use probabilistic techniques such as simulated annealing. At least some embodiments described herein offer a deterministic alternative that is applicable to a wide range of scoring functions.

Subsets in one or more different partitions of those generated may be selected based, at least in part, on Q scores, further described herein. A new partition including the selected subsets may be generated or, if all of the selected subsets are already part of a generated partition, then the preexisting partition may be selected. The partition may include one or more segments.

FIGS. 31A-31D depict an example of determining a partition based on scoring for autogrouping in some embodiments. In an example, there is a fixed space, S, of finite size. The nature of the space may be relevant only in so far as there is a way of clustering the space and scoring subsets. Referring to a graph G on S indicates a graph whose nodes are a collection of subsets where a node is connected to another node if and only if the two nodes have points in common. A partition includes one or more subsets. Each of the one or more subsets include all of the element(s) of S. For example, partition 3102 is a partition that includes subsets of all elements of S. Subsets 3104a-e include all elements of S. A union of all of the subsets 3104a-e is the partition 3102.

Figure 31A:
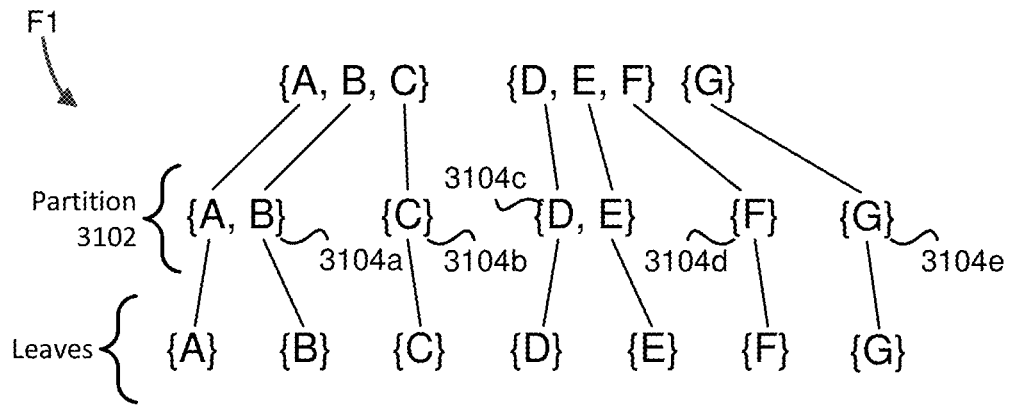
FIGS. 31A-31D depict an example of determining a partition based on scoring for autogrouping in some embodiments.
Figure 31B:
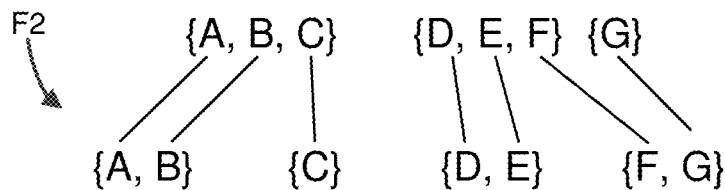
Figure 31C:
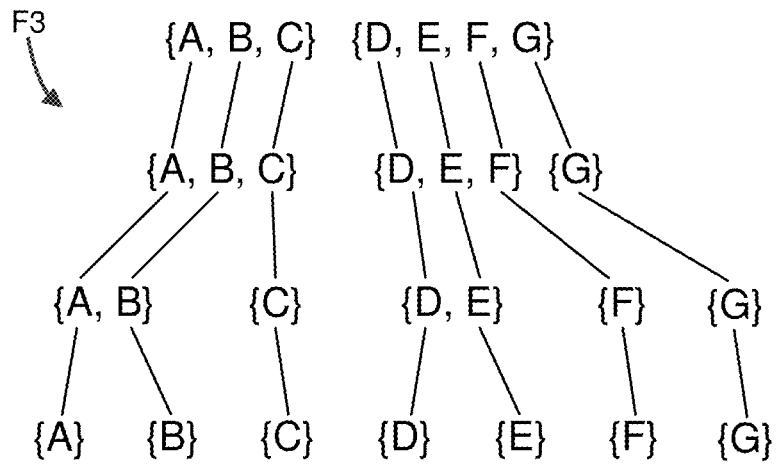

A forest F on S is a graph on S. A forest F is 'atomic' if every leaf in F is a singleton (e.g., a set with one member). FIG. 31A (i.e., F1) is an atomic forest because every leaf in F1 as depicted in FIG. 31A is a singleton. It will be appreciated that FIG. 31B (i.e., F2) is not an atomic forest since every leaf in F2 as depicted in FIG. 31B is not a singleton. For example, F2 includes leaves {A,B}, {D,E}, and {F,G}.

There is a partition R of S (in F1, {a,b,c}, {d,e,f}, {g}), called the roots, such that every set in F is reachable by a unique path from a root. N in F is either a leaf (e.g., a singleton in an atomic forest) or it is connected to nodes which form a partition (e.g., {a,b,c}->{a,b} and {c} in F1) of N. For a non-leaf node N we denote by C(N) the children of N. Notice the children of a leaf, namely C(leaf) is empty. We say that F' extends F if F and F' have the same leaves and every node in F is a node in F'. If the two forests are not equal, then F' contains a node which is the union of one or more roots in F. Example F3 (FIG. 31C) extends F1 (FIG. 31A).

Figure 31D:
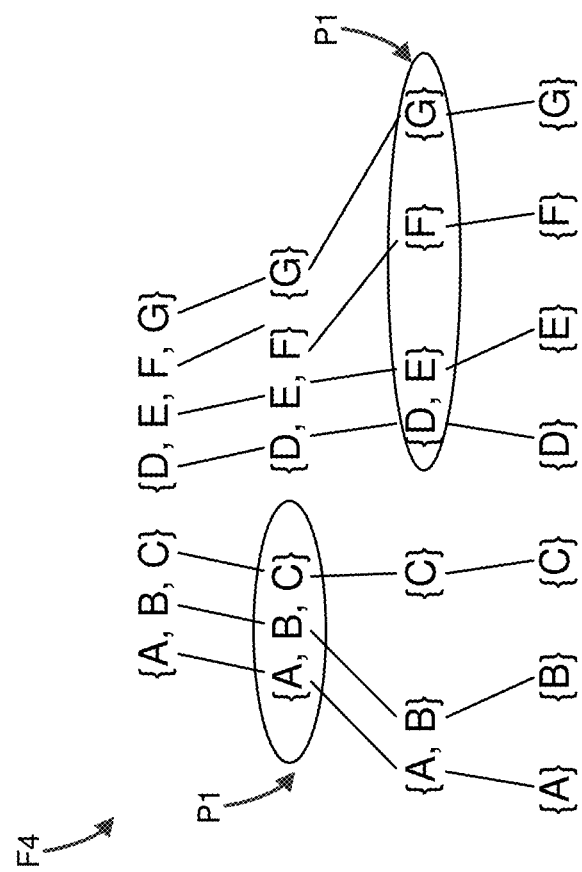

Partition P on S is subordinate to F1 if and only if every element of P is in F1. The circled partition P1 of F4 depicted in FIG. 31D, is an example of a subordinate partition {e.g., {a,b,c},{d,e},{f}, and {g}} to F1.

Singletons(S) are denoted as the partition formed by taking {{x}|x in S}. That is, in the example in FIG. 31D, Singletons({a, b, c, d, e, f, g})={{a},{b},{c},{d},{e}, {f}, {g}}. This is the same as the set of leaves of an atomic forest. Let U(P), where P is any collection of subsets of S, denote the union of all the elements of P. U(Singletons (S))==S.

Partition P' on S is coarser than another partition P on S if and only if every element x' in P' is the union of elements x in P. In various embodiments, every partition on S is coarser than Singletons(S), and {S} is coarser than every partition on S. For instance, {{a,b,c},{d,e,f},{g}} is a coarser partition than {{a,b},{c},{d,e},{f},{g}}.

The segment engine 2214 may be configured to autogroup data points of a data set or nodes in a graph. As discussed herein, the groupings may be approximations of possible maxima of a given scoring function that scores possible partitions of the original data object (e.g., a collection of data points or a collection of nodes of a graph). The segment engine 2214 may, in some embodiments, perform autogrouping of nodes of a graph (whether a visualization is generated or not) to generate segments of nodes. In various embodiments, the segment engine 2214 may perform autogrouping for reference space open cover generation. The segment engine 2214 may autogroup any number of data points, sets of data points, representations, and/or the like. The segment engine 2214 is further discussed in FIG. 32.

Figure 32:
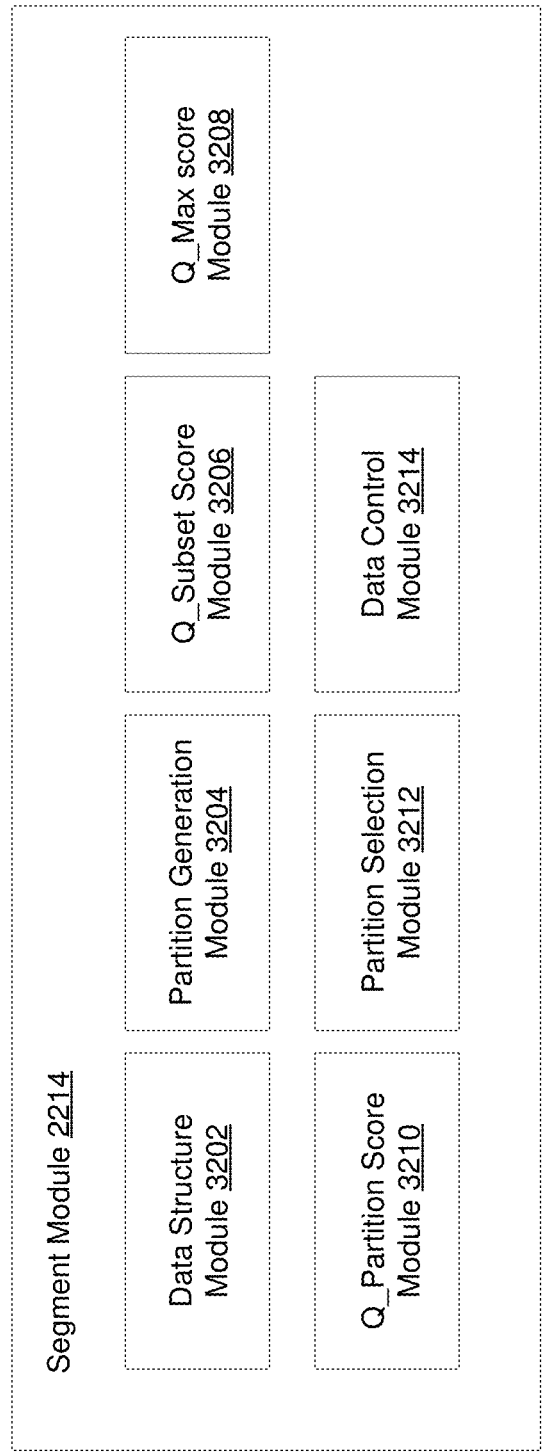
FIG. 32 depicts an example segment engine in some embodiments.

FIG. 32 depicts an example segment engine 2214 in some embodiments. An segment engine 2214 may comprise a data structure module 3202, a partition generation module 3204, scoring function modules (e.g., a Q_subset score module 3206, a Q_max score module 3208, a Q_partition score module 3210), a partition selection module 3212, and a data control module 3214. Although the scoring function modules are discussed as including three modules, each performing a different scoring function, it will be appreciated that there may be any number of scoring function modules performing any number of scoring functions (e.g., one module performing a single scoring function capable of generating any number or type of scores). For example, the scoring functions may generate and/or maximize metric values of any number of metric functions.

In various embodiments, the data structure module 3202 receives data including a plurality of sets of data. The data may be received from any number of digital devices.

The partition generation module 3204 (e.g., a "clumper") forms a forest F utilizing the plurality of sets of data received by the data structure module 3202. For example, the partition generation module 3204 may generate a first partition of a forest F using the data received by the data structure module 3202. In some embodiments, the first partition may include leaves that are singletons of all elements from the data. In various embodiments, the first partition may include any number of sets of data. The first partition may include leaves for the forest, singletons, roots, sets of plurality of elements, and/or the like.

The partition generation module 3204 may generate the second partition of the forest F using the first partition. For example, the second partition may include at least one union of at least two sets of the first partition. Subsequent partitions may be generated in a similar fashion (e.g., based, at least in part, on including at least one union of at least two sets from the previous partition).

The partition generation module 3204 may generate an entire forest F before scoring partitions (or sets of partitions). For example, the partition generation module 3204 may generate the entire forest F before any or all of the scoring function modules score all or parts of partitions of the forest F.

In some embodiments, the partition generation module 3204 may generate the entire forest F while scoring is performed or in series with partition scoring (e.g., scoring of sets of partitions). For example, the partition generation module 3204 may generate the entire forest F while any or all of the scoring function modules score all or parts of partitions of the forest F. In another example, the partition generation module 3204 may generate one or more partitions of the forest F and then any number of the scoring function modules may score the generated partitions before the partition generation module 3204 generates one or more additional partitions of the forest F.

In various embodiments, the partition generation module 3204 may generate a partition of a forest F based on, at least in part, scores by any number of scoring function modules of previously generated partition(s) (or sets of partition(s)) of the forest F.

It will be appreciated that the partition generation module 3204 may not generate the entire forest F but may rather terminate generating partitions of the forest F before the forest F is completed. The partition generation module 3204 may determine whether to build a new partition of the forest F based on any number of the previously generated partition(s) of the forest F and/or scoring associated with all or parts of previously generated partition(s).

As discussed herein, the partition generation module 3204 may not generate all possible sets of data and/or all possible partitions of the forest F.

It will be appreciated that the partition generation module 3204 may utilize any number of hierarchical clustering techniques with techniques described herein. In one example, data and/or nodes are joined by epsilon (if two data subsets or nodes are within distance epsilon of each other then they are joined together). While this example standard technique has traditional limitations ("fixed epsilon") whereby a single epsilon may be unable to break up a space in a preferable manner, by scoring each subset of a partition, we can select subsets across a forest to identify and/or generate a selected partition (e.g., by autogrouping subsets of a plurality of partitions).

One example of a hierarchical clustering technique, KNN on a finite metric space X is to compute the K nearest neighbors for each point of a network graph (e.g., a visualized or non-visualized graph that includes nodes that may be coupled to one or more other nodes of the graph) with, for example, K=50. The partition generation module 3204 may start with INITIAL( ) being Singletons(X). Then at each step for 1<=k<=50, the partition generation module 3204 may connect x to y provided x and y are in the symmetric k nearest neighbors of one another. Note that if KNN(P,k) returns P for k<50, the partition generation module 3204 may bump k and try again instead of concluding that P is stable.

Another hierarchical clustering technique embodiment is defined on a weighted graph G (with positive weights) on a point set S. This hierarchical clustering technique is parameterized by a pre-determined real number delta where 1>delta>0. The partition generation module 3204 starts with delta=0 so INITIAL( ) being Singletons(S). For each partition P, we define wt(p,q), for p!=q in P, to be the sum of edge weights between the nodes in the graph which are a part of the subset p and those in the subset q in G, divided by |p|*|q|. The partition generation module 3204 is configured to take a partition P and make a new partition P' by joining all pairs of subsets (a,b) (where a, b are subsets in the partition P) when wt(a,b)>=delta*max(wt(p,q)) where the max is over all pairs of subsets p and q in the partition P.

There are any number of techniques for hierarchical clustering and any of them can be combined with a scoring function that satisfies example constraints on the scoring functions discussed herein.

The segment engine 2214 includes the Q_Subset score module 3206, the Q_Max score module 3208, and the Q_Partition score module 3210 which may utilize three scoring functions, respectively. The Q_Subset score module 3206 calculates a Q_Subset score for subsets of one or more partitions. The Q_Max score module 3208 calculates a Q_Max score based on the Q_Subset score (e.g., calculates a maximum score for a partition based on the Q_Subset score) for the subsets. The Q_Partition score module 3210 calculates a Q_Partition score for two or more partitions of the forest utilizing at least the Q_Subset Score for the subsets.

In various embodiments, the Q_Subset score module 3206 calculates Q_Subset scores (e.g., one for each subset of a partition). A function Q is defined on subsets of the space S and scores the properties which are to be grouped together in the autogrouping process. For instance, in some embodiments, the Q_Subset score is a modularity score on a graph (so S are the nodes in the graph). The partition selection module 3212 may examine the data structure for a partition of the graph S with maximum modularity score(s).

Modularity is one measure of the structure of networks or graphs that is appreciated by those skilled in the art. The modularity score may be used to measure strength of division of a network of nodes (e.g., modules, groups, clusters, or communities). Modularity may be used in optimization methods for detecting community structure in networks. In one example, modularity is the fraction of edges of nodes in a graph that fall within a given group minus the expected such fraction if edges were distributed at random. It will be appreciated that there are many different methods for calculating modularity.

In one example, randomization of edges preserves a degree of each vertex. Assume a graph with n nodes and m links (edges) such that the graph can be partitioned into two communities using a membership variable s. If a node belongs to community 1, Sv=1, or if v belongs to community 2, Sv=−1. An adjacency matrix for an undirected network may be represented by A, where Avw=0 indicates there are no edges (no interaction) between nodes v and w. Avw=1 indicates there are Avw=1 indicates there is an edge between the two.

Modularity Q may be defined as the fraction of edges that fall within group 1 or 2, minus the expected number of edges within groups 1 and 2 for a random graph with the same node degree distribution as the network.

In this example, an expected number of edges is determined using configuration models. The configuration model is a randomized realization of a particular network. Given a network with n nodes, where each node v has a node degree kv, the configuration model cuts each edge into two halves, and then each half edge is rewired randomly with any other half edge in the network.

For this example, assume that the total number of half edges is ln $$l_n = \sum_v k_v = 2m$$

Two randomly nodes v and w with node degrees kv and kw respectively are selected and half edges rewired then the expectation of full edges between v and w is equal to (Full edges between v and w)/(total number of rewiring possibilities). The expected [Number of full edges between v and w]=(kv*kw)/ln=(kv kw)/2m.

As a result, the actual number of edges between v and w minus expected number of edges between them is Avw−(kv kw)/2m.

$$Q = \frac{1}{2m}\sum_{vw}\left[A_{vw} - \frac{k_v * k_w}{2m}\right]\frac{s_v s_w + 1}{2}$$

The equation above holds for partitioning into two communities only. Hierarchical partitioning (i.e. partitioning into two communities, then the two sub-communities further partitioned into two smaller sub communities only to maximize Q) is a possible approach to identify multiple communities in a network. The above equation can be generalized for partitioning a network into c communities.

$$Q = \sum_{vw}\left[\frac{A_{vw}}{2m} - \frac{k_v * k_w}{(2m)(2m)}\right]\delta(c_v, c_w) = \sum_{i=1}^{c}(e_{ii} - a_i^2)$$

eij is the fraction of edges with one end vertices in community i and the other in community j:

$$e_{ij} = \sum_{vw}\frac{A vw}{2m}1_{v\in c_i}1_{v\in c_j}$$

ai is the fraction of ends of edges that are attached to vertices in community i:

$$a_i = \frac{k_i}{2m} = \sum_j e_{ij}$$

The second scoring function, the Q_Partition score, may be an extension of the first scoring function Q to be defined on partitions of the space S. If the scoring function Q is defined on subsets of S, it can be extended to a partition function Q_Partition in various ways. One of the simplest ways to extend function Q to partitions is by defining Q_Partition (P) as the sum over p in P of Q(p) (e.g., for a partition P, Q_Partition (P)=sum_{subsets p in P} Q(p)).

In some embodiments, Q_Partition must have the following property: Let P be an arbitrary partition of a subset of S, let p belong to P, and let q be a partition of p. P(q) is defined to be the partition of obtained by replacing p in P with the elements of q. Then, in this example, Q_Partition must have the following property for all P, p, q as described above:

$$QP(P(q)) >= QP(P) \text{ if and only if } QP(q) >= Q(\{p\}) \quad (1)$$

In some embodiments, function Q does not need to come from a set function in this case. Functions Q_Partition which satisfy property (1) are, by definition, stable partition functions. A class of such functions is described as follows.

Let Q be any real-valued function defined on the set of non-empty subsets of S. Let A(p,q) be any function defined on pairs of non-empty subsets such that p is a subset of q. If:

$$A(p,p)==1 \text{ and } A(p,q)*A(q,r)=A(p,r), \text{ for all legal } p,q,r \quad (2)$$

then we may extend the set function Q( ) to all partitions P by:

$$QP(P) = \text{sum } A(p,U(P))Q(p) \quad (3)$$

p in P

Note that all real numbers k, $A(p,q)==(|p|/|q|)^k$ satisfies this property. Moreover, k==0 implies A(p,q)==1.

(1) holds for Q defined in (3). If QP and QP' are stable partition functions, then so is x*QP+y*QP' for x, y>=0. We also refer to stable partition functions on S as "partition scoring functions" for F.

For any scoring function of the form (3), a monotonically increasing function f may be chosen from the real numbers to itself and replace Q by Q'( )=f(Q( )). In particular, if f( ) is 'sufficiently invertible' (e.g., A( ) and Q( ) are >=0 and f( ) is invertible on the non-negative reals). QP(P) may be defined by:

$$QP'(P) = f\text{-inverse}(\text{sum } A(p,U(P))f(Q(p))) \quad (3')$$

p in P

Since f(QP(P)) satisfies (1) and f( ) is monotonically increasing, the QP' in (3') also satisfies (1) and extends Q( ) on subsets of S. Concretely, if A==1 and Q( )=0 on sets, QP(P) may be defined to be the Euclidean norm of Q( ) on the individual elements of P, and still get a scoring function. Also can use the exponential function for f( ) without requiring Q to be non-negative.

In various embodiments, there may be extreme values under comparisons, using either <= or >=, for a function Q defined on partitions of subsets of S. Since Q may be replaced by −Q if the comparison is <=, it may be assumed without loss of generality that maximal values for Q (i.e., >=) are of interest. Specifically, a method for finding the F-subordinate partition on which Q is maximal, provided Q satisfies a simple property, is disclosed herein.

Given a scoring function Q_Partition on F, we can define a scoring function Q_max ( ) to be Q(p) if p is a leaf, and max(Q(p),Qmax(C(p))) if not. One consequence of this definition and requirement (1) on Q_Partition is that the maximal partition of a subset p (that is, the partition V of p for which Qmax(V) is maximal) is either p or the union of the maximal partitions of each element of C(p) (ties may be broken by taking the subset p instead the children).

In various embodiments, the autogrouping method uses a hierarchical clustering process on S to compute F (i.e., to construct the forest F) and if Q_Partition is a scoring function on the roots R of F, we can find the Q_Max maximal partition of S subordinate to F. Joining a scoring function Q( ) with hierarchical clustering may provide a principled method for choosing among the partitions for the "Q-maximal partition."

The partition generation module 3204 may begin with the original space S and may form a forest F described above. In some embodiments, the generation module 3204 takes a partition P and returns a new partition P' which is coarser than P. Note that Clumper({S})={S}. Any partition P such that generation module 3204 Clumper(P)=P is called clumper-terminal, and repeated applications must eventually reach a clumper-terminal partition. The sequence Singletons (S), Clumper(Singletons(S)), Clumper(Clumper(Singletons (S))), etc., may terminate in a finite number of steps, and the union of all these partitions forms an atomic forest F whose roots are the elements in a C-terminal partition R, which are the roots of F.

One example process utilizing the scoring functions and generating partitions is as follows in the following pseudo-code:

```
P = INITIAL(S) // some initial partition - often Singletons( ), but it can
     be any partition
F = Tree(P) // node for every subset, remember connections, and have
           // max slot to hold partition of the node's set which has
              maximal score
for (x in S) { {x}.max = {x} }
BEGIN
  P' = clumper(P)
  if P==P'
    then
      quit
    else
      UPDATE_Qmax(P',P)
END
UPDATE_Qmax(P',P)
  for (p in P') {
    if (!(p in P)) {
      Subset pSubset = AddSubset(p,F);
      if (Q_Subset(p) >= QP(C(p)))
        pSubset.maxPartition = p
        pSubset.Qmax = Q(p)
      else
        pSubset.Qmax = QP(C(p))
        pSubset.maxPartition = MAX_UNION(C(p))
    }
  }
MAX_UNION({Ni})
return the union of Ni.max
```

When this process terminates, the elements of the roots R of F may contain their maximal partitions, the union of which is the best partition in F of S.

The partition selection module 3212 may find a partition subordinate to the forest F that maximizes at least one scoring function. For example, the partition selection module 3212 may select a partition subordinate to the forest F that maximizes the scoring function QP.

In various embodiments, each subset of a partition (as discussed herein) may be associated with its own scores. For example, each subset of a partition may be associated with a different Q_Max score. The partition selection module 3212 may select subsets of unique elements from any number of different partitions of the forest F using the Q_Max score to generate and select a partition.

For example, looking to FIG. 19D, the partition selection module 3212 may select subset {A,B,C} from one partition and subsets {D,E}, {F}, AND {G} from another partition based on a scoring function. The selected subsets may then form (e.g., generate) a new selected partition P1 (e.g., a partition including subsets {A,B,C}, {D,E}, {F}, AND {G}). The selected partition P1 may be termed an output partition. In this example, the partition selection module 3212 may select the subset {A,B,C} from the first partition utilizing the Q_Max score. In a further example, each subset of all partitions that include any of elements A, B, or C, may be associated with a separate Q_Max score. The maximum Q_Max score of all the sets that include any of the elements of A, B, or C is the subset {A,B,C}. As a result, the partition selection module 3212 selects that subset {A,B,C} in this example.

Similarly, each subset of all partitions that include any of elements D, E, F, or G, may be associated with a separate Q_Max score. The maximum Q_Max scores of all the sets that include any of the elements of D, E, F, or G are the subsets {D,E}, {F}, and {G} (i.e., the Q_Max scores associated with subsets {D, E, F, G}, {D, E, F}, and {G} are not the maximum when compared to the Q_Max scores of subsets {D,E}, {F}, and {G}). As a result, the partition selection module 3212 selects subsets {D,E}, {F}, and {G} in this example.

One example of a scoring function mentioned herein includes a modularity score for weighted graphs on a node set S. In some embodiments, the modularity score of a subset of a graph proportion of edges within a subset, the e's, and the a's which are the proportion of edges which cross the boundaries of the subset. The final score may be: $e-a^2$. In various embodiments, the partition selection module 3212 selects and/or generates a partition by maximizing this score. The modularity partition scorer, QP, may be the sum of the modularity scores on the subsets within that partition.

Another example of a scoring function is a variant of entropy for a set S which has an associated classification: that is, a function $cls: S \rightarrow \{1,2,\ldots,k\}$ (i.e. you have a set and everything has some finite label.) For s subset of S, we define $p\_i(s)=|\{x \text{ in } s:cls(x)==i\}|/|s|$, provided $|s|!=0$. Then $Q(s)=sum\_\{classes\ i\} (p\_i(s)*log(p\_i(s)))$. The extension of the entropy scorer Q to a partition scorer, QP is given by the extension property (3) where $A(p,q)=|p|/|q|$. In other words, for a partition P, $QP(P)=sum\_\{p \text{ in } P\} (Q(p)*|p|/|U(P)|)$. Normally one wants to minimize the entropy and the subset scorer here is the negative of the traditional entropy score by maximizing the scoring function.

The data control module 3214 is configured to provide the selected and/or generated partition from the partition selection module 3212. In various embodiments, the data control module 3214 generates a report indicating the selected and/or generated partition from the partition selection module 3212. The report may include, for example, data sets, partitions, subsets, elements, data set identifiers, partition identifiers, subset identifiers, element identifiers, and/or the like. In some embodiments, the report may include a graph (e.g., see FIG. 31) with an indication of selected nodes whose member(s) include data of the selected and/or generated partition from the partition selection module 3212.

Figure 33:
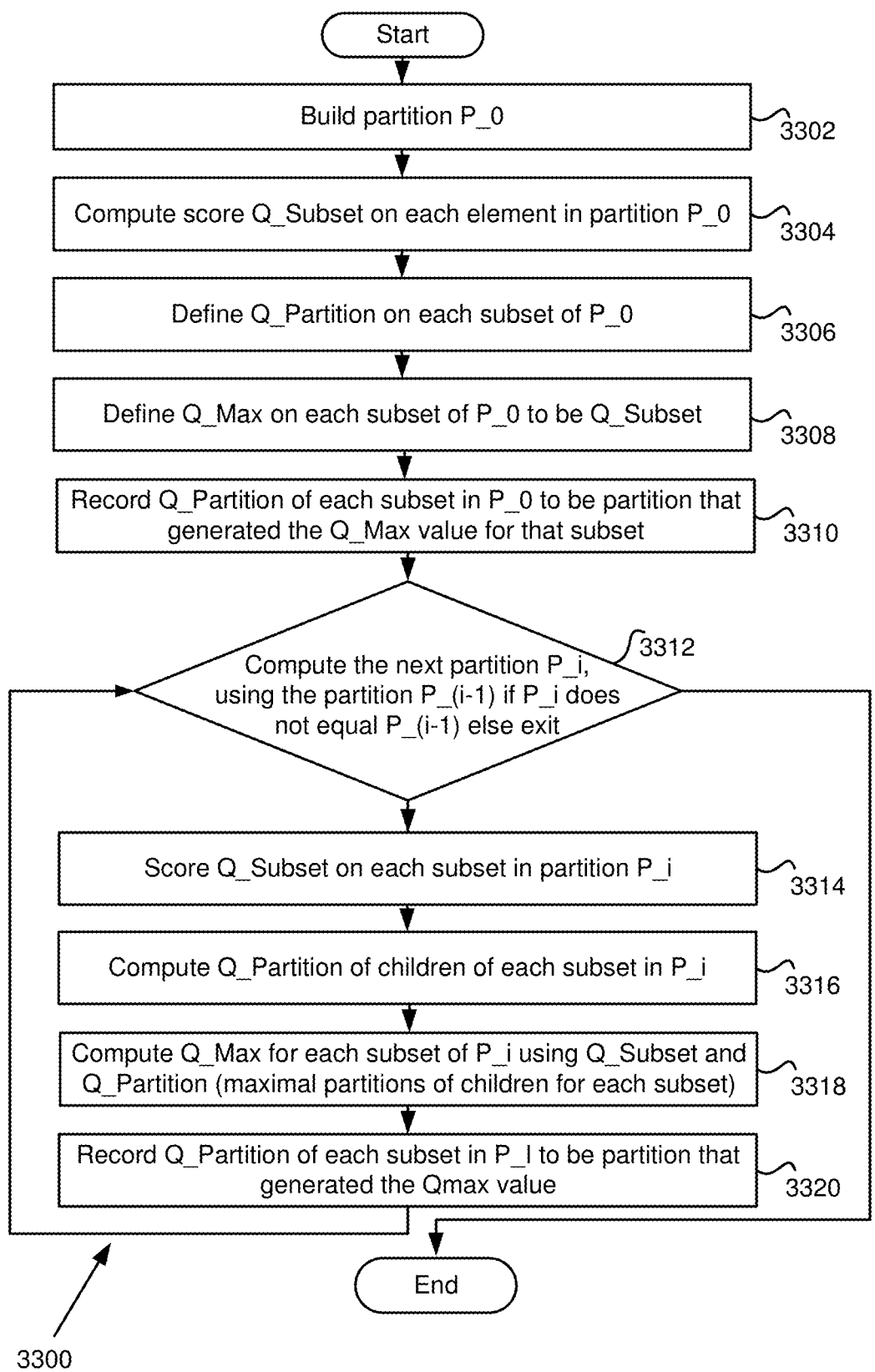
FIG. 33 is an example flowchart for autogrouping in some embodiments.

FIG. 33 is an example flowchart for autogrouping in some embodiments. In this example, the segment engine 2214 receives a set S={A, B, C, D, E, F, G} and performs autogrouping to identify a selected partition of a forest based on S. Elements of set S may be, for example, nodes of a graph wherein the graph may be visualized (e.g., a visualization as discussed herein) or not visualized. The graph may be a topological data analysis graph of nodes and edges as described herein. In some embodiments, the graph may be any network graph that includes nodes, neighborhoods, groupings, communities, and/or data points.

Non-limiting examples describing at least some of the steps in FIG. 33 will be described using the graph depicted in FIG. 34. The embodiment of the Q_Partition in this example is simply the sum over the subsets of the partition P of the Q_Subset scores on each subset. For example, if P={{A, B, C}, {D}, {E, F{, {G}}, then Q_Partition (P)=Q_Subset({A, B, C})+Q_Subset({D})+Q_Subset({E, F})+Q_Subset({G}).

In step 3302, the data structure module 3202 receives the set S and the partition generation module 3204 generates an initial partition which are the singletons of the set S={A, B, C, D, E, F, G}, namely, P_0={{A}, {B}, {C}, {D}, {E}, {F}, {G}}. This is illustrated in FIG. 34 as the bottom row (3402) of the depicted forest.

In step 3304, the Q_subset score module 3206 computes the Q_Subset score on each subset of the partition P_0. In this example, the Q_subset score module 3206 scores each singleton subset with a value of 0.5. This score is shown in FIG. 34 for each subset of partition 3402 as Q_Sub=0.5. The scoring function in this example, may be a modularity scoring function discussed herein.

In step 3306, the Q_partition score module 3210 computes the maximal partition of each subset a of P_0 from the children of the subset a in the constructed forest. Since the subsets a in P_0 have no children in the forest, the maximal partition of the children of the subset a is itself. Namely, for each subset a in P_0, MaximalPartitionChildren(a)=a.

In this example, the Q_partition score module 3210 computes the maximal partition of each subset as itself. This is shown in FIG. 34 for each subset of partition 3402 as MaxP={A} for subset {A}, MaxP={C} for subset {C}, MaxP={D} for subset {D}, MaxP={E} for subset {E}, MaxP={F} for subset {F}, and MaxP={G} for subset {G}.

In step 3308, the Q_max score module 3208 computes Q_Max on each subset of P_0. Recall that since the subsets in P_0 do not have any children, for each subset a in P_0, $$Q\_Max(a)=\max(Q\_Subset(a), Q\_Partition(MaximalPartitionChildren(a)))=\max(Q\_Subset(a), Q\_Partition(a))=\max(Q\_Subset(a), Q\_Subset(a))=Q\_Subset(a)=0.5$$

In this example, the Q_max score module 3208 scores each subset with a value of 0.5. This Q_Max score is shown in FIG. 34 for each subset of partition 3402 as Q_Max=0.5.

In step 3310, we optionally record the maximal partition of each subset a in P_0 to be partition of the subset a that generated the Q_Max for that subset. Thus we record the MaximalPartition(a)=a in this initial partition.

Figure 34:
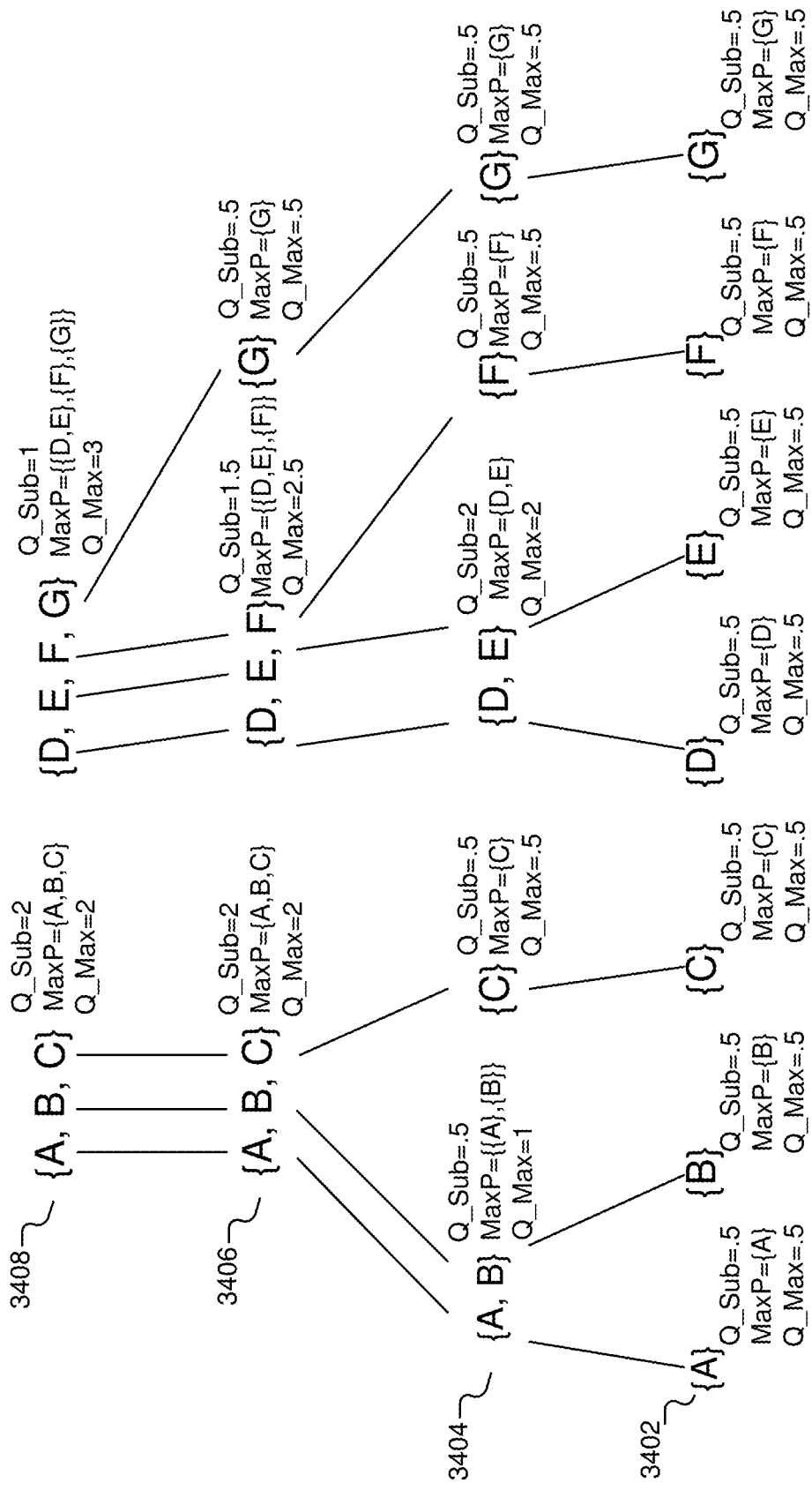
FIG. 34 is an example forest for autogrouping in some embodiments.
Figure 36:
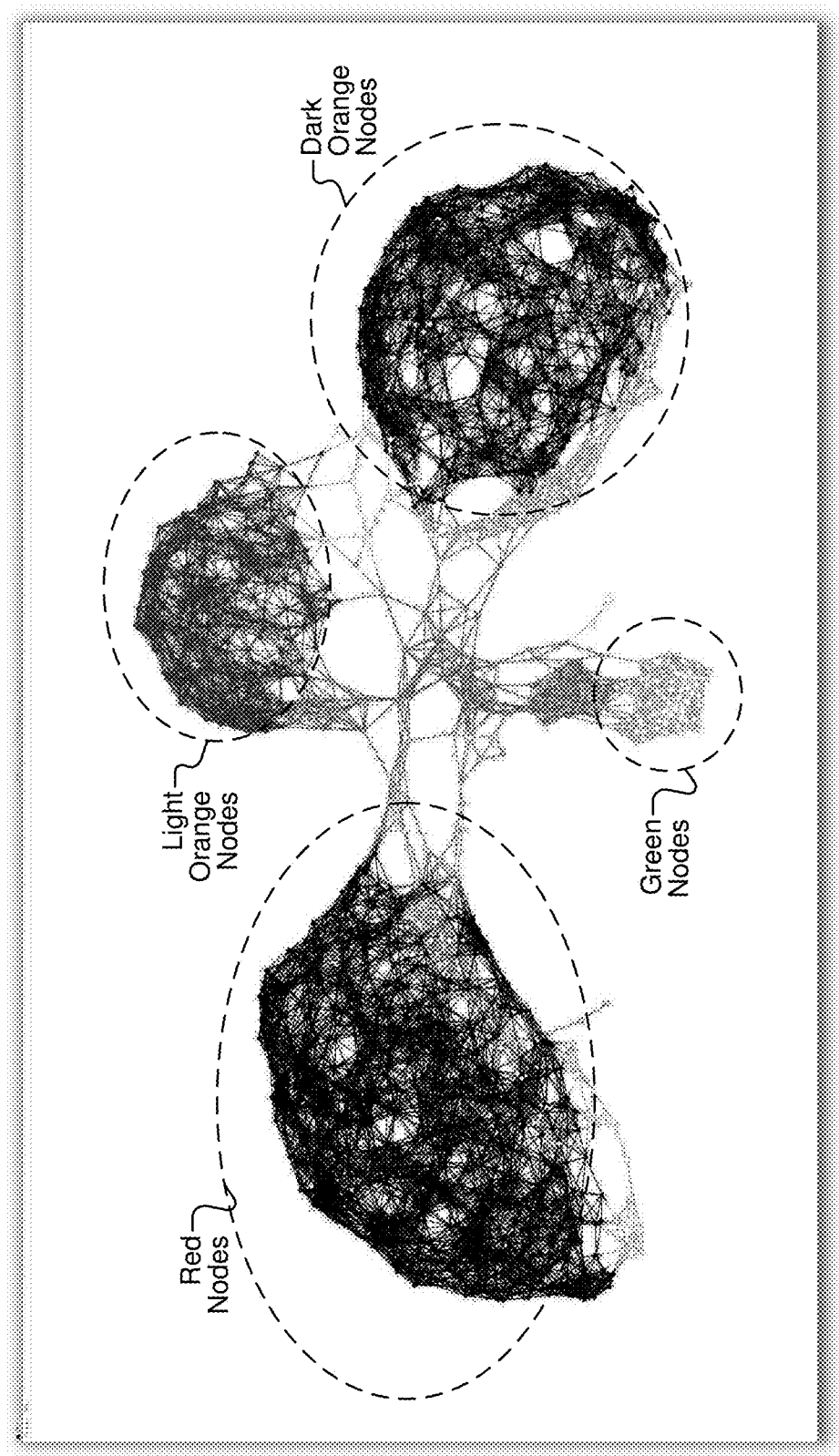
FIG. 36 depicts an example maximal partition that is "color coded" (utilizing greyscale).

In step 3312, the data structure module 3202 computes the next partition P_1 (the row labeled 3404 in FIG. 34). Namely, in this example, the data structure module 3202 groups subsets {A} and {B} into the subset {A, B} and subsets {D} and {E} into subset {D, E}. The data structure module 3202 preserved the subsets {C}, {F}, and {G} from the partition P_0 in the partition P_1.

It will be appreciated that the next partition P_1 may group subsets of previous partition(s) (e.g., partition 3404) in any number of ways. For example, the data structure module 3202 may group a predetermined number of subsets together at random and/or may group two or more subsets together based on the elements (e.g., based on the underlying data that the elements represent). In one example, the data structure module 3202 may group elements together using a distance metric and/or any other functions to define relationships in the underlying data and/or within a similarity space (e.g., reference space).

In various embodiments, the data structure module 3202 may determine whether the system ends and/or whether a new partition is to be computed. It will be appreciated that the data structure module 3202 may perform the determination based on any number of ways. In some embodiments, the data structure module 3202 determines if the next generated partition is equal to the previous partition. If the two partitions are equal (e.g., have the same subsets), the method may terminate, otherwise the method may continue to step 3314.

In some embodiments, the data structure module 3202 terminates the method after a predetermined number of partitions are generated, if a predetermined number of roots are found, and/or the like. In various embodiments, the data structure module 3202 may terminate the method if a predetermined number of subsets are present in a computed partition. In another example, the data structure module 3202 may terminate the method after a predetermined period of time, a predetermined period of memory usage, or based on any threshold (e.g., the threshold being calculated based on the amount of data received).

In step 3314, the Q_subset score module 3206 computes the Q_Subset score on each subset of the partition P1. In this example, the Q_subset score module 3206 computes Q_Subset({A, B})=0.5 and Q_Subset({D,E})=2. In one example, the Q_subset score module 3206 calculates a modularity score for elements A and B for Subset {A,B} and a modularity score for elements D and E for Subset {D,E}. As discussed herein, the modularity score may be based on the edges of nodes A and B for Q_Subset({A, B}) modularity score and based on the edges of nodes D and E for Q_Subset({D, E}) modularity score.

As was discussed in the paragraph above describing step 3304, Q_Subset of each singleton subset is 0.5 (e.g., the previous Q_Subset score for singleton subsets in step 3404 remains unchanged from step 3402). These scores are associated with each subset and are visualized in the FIG. 34 as Q_Sub in 3404.

In step 3316, the Q_partition score module 3210 then computes the maximal partition at the children of each subset of P_1. The maximal partition of the children of the subsets {C}, {F}, and {G} are again the original singleton subset. The maximal partition of the children {A, B} is the set including the maximal partitions of the children of {A, B}, namely {{A}, {B}} as depicted in partition 3404 in FIG. 34. Similarly the maximal partition of the children of {D, E} is the set {{D}, {E}} as also depicted in partition 3404 in FIG. 34.

In step 3318, the Q_max score module 3208 computes the Q_Max on each subset of P_1. Recall Q_Max(a)=max(Q_Subset(a), Q_Partition(MaximalPartitionChildren(a)). For the subset {A, B}:

$$Q\_Max(\{A,B\})=\max(Q\_Subset(\{A,B\}), Q\_Partition(\{\{A\},\{B\}\}))=\max(0.5, Q\_Subset(\{A\})+Q\_Subset(\{B\}))=\max(0.5,1)=1$$

For the subset {D, E}:

$$Q\_Max(\{D,E\})=\max(Q\_Subset(\{D,E\}), Q\_Partition(\{\{D\},\{E\}\}))=\max(2, Q\_Subset(\{D\})+Q\_Subset(\{E\}))=\max(2,1)=2.$$

As displayed in partition 3404 of FIG. 34, Q_Max of {A,B} is 1 and Q_Max of {D,E} is 2. The Q_Max of singletons {C}, {F}, and {G} in partition 3404 remain consistent with the respective subsets in partition 3402. Namely, the Q_Max of each of {C}, {F}, and {G} is 0.5.

In step 3320, we optionally record the maximal partition of each subset a in P_1 that resulted in the Q_Max score. As seen above and in FIG. 34, MaxPartition({A, B})={{A}, {B}} and MaxPartition({D, E})={D, E}.

Step 3312 is repeated. The data structure module 3202 computes the next partition P_2, depicted in FIG. 34 as row (partition) 3406. In various embodiments, the data structure module 3202 may determine whether the system ends and/or whether a new partition is to be computed. It will be appreciated that the data structure module 3202 may perform the determination based on any number of ways.

In step 3314, the Q_subset score module 3206 computes the Q_Subset score on each subset of the partition P_2. In this example, the Q_subset score module 3206 computes Q_Subset({A, B, C})=2 and Q_Subset({D, E, F})=1.5. Again, Q_Subset({G})=0.5. These scores are recorded with each subset and are visualized in the FIG. 34 in partition 3406.

In step 3316, the Q_partition score module 3210 computes the maximal partition at the children of each subset of P_2. The maximal partition of the children {G} is the subset {G}. The maximal partition of the children {A, B, C} is the set consisting of the maximal partitions of the children of {A, B, C}, namely {MaxPartition({A,B}), MaxPartition({C})={{A}, {B}, {C}}. Similarly the maximal partition of the children of {D, E, F} is the set {MaxPartition({D, E}), MaxPartition({F})}={{D, E}, {F}}.

This is shown in FIG. 34 for each subset of partition 3406 as MaxP={A,B,C} for subset {A,B,C}, MaxP={{D,E},{F}} for subset {D,E,F,}, and MaxP{G} for subset {G}.

In step 3318, the Q_max score module 3208 computes the Q_Max on each subset of P_2. Recall Q_Max(a)=max(Q_Subset(a), Q_Partition(MaximalPartitionChildren(a)). For the subset {A, B, C}:

$Q\_Max(\{A,B,C\})=max(Q\_Subset(\{A,B,C\}),Q\_Partition(\{\{A\},\{B\},\{C\}\}))=max(2,Q\_Subset(\{A\})+Q\_Subset(\{B\})+Q\_Subset(\{C\}))=max(2,1.5)=2$ For the subset {D, E, F}:

$Q\_Max(\{D,E,F\})=max(Q\_Subset(\{D,E,F\}),Q\_Partition(\{\{D,E\},\{F\}\}))=max(1.5,Q\_Subset(\{D,E\})+Q\_Subset(\{F\})=max(1.5,2.5)=2.5$ As displayed in partition 3406 of FIG. 34, Q_Max of {A,B,C} is 2 and Q_Max of {D,E,F} is 2.5 The Q_Max of singleton {G} in partition 3406 remains consistent with the respective subset in partition 3404. Namely, the Q_Max {G} is 0.5.

In step 3320, we optionally record the maximal partition of each subset a in P_2 that resulted in the Q_Max score. As seen above, MaxPartition({A, B, C})={{A, B, C}} and MaxPartition({D, E, F})={{D, E}, {F}}.

Step 3312 is repeated. The data structure module 3202 computes the next partition P_3, depicted in FIG. 34 as row (partition) 3408. The data structure module 3202 may determine whether the system ends and/or whether a new partition is to be computed.

In step 3314, the Q_subset score module 3206 computes the Q_Subset score on each subset of the partition P_3. In this example, the Q_subset score module 3206 computes Q_Subset({A, B, C})=2 and Q_Subset({D, E, F, G})=1. These scores are recorded with each subset and are visualized in FIG. 34 in partition 3408.

In step 3316, the Q_partition score module 3210 computes the maximal partition at the children of each subset of P_3. The maximal partition of the children {A, B, C} is the set consisting of the maximal partitions of the children of {A, B, C}, namely {MaxPartition({A,B, C})}={{A, B, C}. Similarly the maximal partition of the children of {D, E, F, G} is the set {MaxPartition({D, E, F}), MaxPartition({G})}={{D, E}, {F}, {G}}.

This is shown in FIG. 34 for each subset of partition 3408 as MaxP={A,B,C} for subset {A,B,C} and MaxP={{D,E}, {F},{G}} for subset {D,E,F,G}.

In step 3318, the Q_max score module 3208 computes the Q_Max on each subset of P_3. Recall Q_Max(a)=max(Q_Subset(a), Q_Partition(MaximalPartitionChildren(a)). For the subset {A, B, C}:

$Q\_Max(\{A,B,C\})=max(Q\_Subset(\{A,B,C\}),Q\_Partition(\{A,B,C\}))=max(2,Q\_Subset(\{A,B,C\}))=2$ For the subset {D, E, F, G}:

$Q\_Max(\{D,E,F,G\})=max(Q\_Subset(\{D,E,F,G\}),Q\_Partition(\{\{D,E\},\{F\},\{G\}\}))=max(1,Q\_Subset(\{D,E\})+Q\_Subset(\{F\}+Q\_Subset(\{G\})=max(1,3)=3$ As displayed in partition 3408 of FIG. 34, Q_Max of {A,B,C} is 2 and Q_Max of {D,E,F,G} is 3.

In step 3320, we optionally record the maximal partition of each subset a in P_3 that resulted in the Q_Max score. As seen above, MaxPartition({A, B, C})={{A, B, C}} and MaxPartition({D, E, F, G})={{D, E}, {F}, {G}}.

Although not depicted in method 3300, the method may continue. For example, the partition selection module 3212 may identify and/or generate a preferred partition from that maximizes one or more scoring functions. In this example, the preferred partition is the MaxPartition. As discussed immediately above, the maximal partition of each subset in P_3 is MaxPartition({A, B, C})={{A, B, C}} and MaxPartition({D, E, F, G})={{D, E}, {F}, {G}}. The partition selection module 3212 may identify and/or generate the autogrouped partition {{A, B, C}, {{D, E}, {F}, {G}}.

Figure 35:
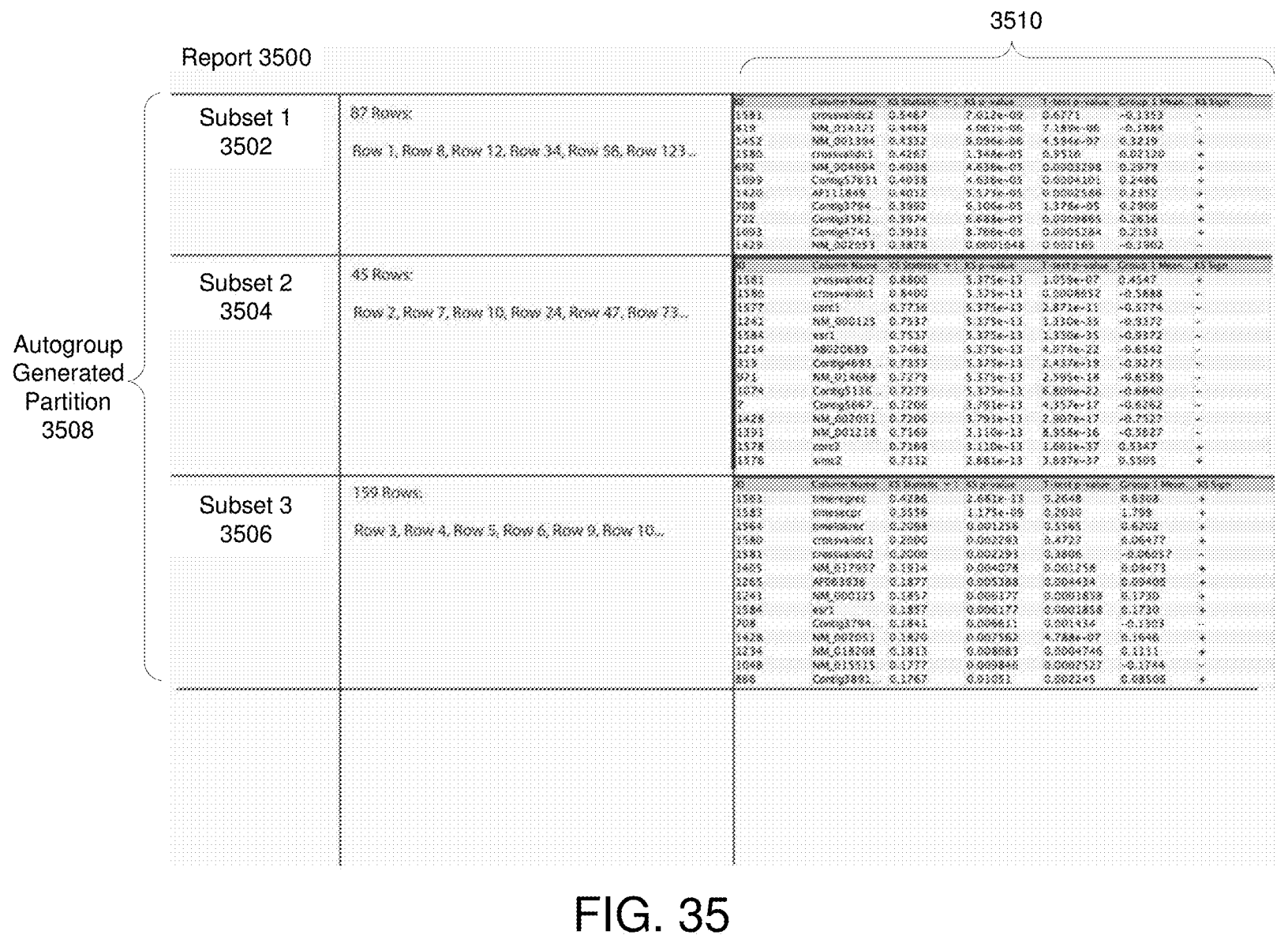

The data control module 3214 may provide the identified and/or generated autogrouped partition in a report and/or identify the autogrouped partition in data or a graph. FIG. 35 is an example report 3500 of an autogrouped graph of data points that depicts the grouped data in some embodiments. Subsets 3502, 3504, and 3506 are subsets of data points that, together, make a partition (i.e., the autogrouped generated partition 3508). In various embodiments, data may be received and nodes generated utilizing embodiments described herein (e.g., see description regarding FIG. 23). The nodes that represent at least some of the received data may be autogrouped into a number of subsets 3502, 3504, and 3506 of an autogroup generated partition 3508. The report 3500 may depict the subsets including the rows of the underlying data associated and/or within each subset as well as all or some of the underlying data 3510 for that subset.

For example, the segment engine 2214 may generate a report that shows each subset of datapoints for an autogroup generated partition. The rows, columns, or other data identifiers may be associated with each subset. Further, all or some of the data associated with each subset may be displayed (e.g., including any independent variables such as data identifiers, for example, patient identifiers). In some embodiments, the report 3500 is the segment dimension table.

The report may allow groups of nodes (e.g., nodes that are part of a subset of the output partition) to be identified. The identified groups of nodes may be identified in a visualization by coloring the nodes in a group a similar color, shape of nodes, a graphical element associated with nodes in a group (e.g., a box around nodes in a group), and/or in any number of ways. In some embodiments, the identified groups of nodes allow a user to create queries, analyze, and/or view data associated with nodes in a group for insights.

In some embodiments, autogrouping may be utilized on a weighted graph. In this example, the set that will be autogrouping is the set of nodes of a weighted graph G. The idea is to automatically partition the graph into groups of nodes that are strongly-connected in the graph. An unweighted graph may be transformed into a weighted graph if there is a function f on the nodes of the graph. The weight for an edge (a,b) between two nodes a and b in the graph G may be defined to be the difference between the function values: wt(a,b)=|f(a)−f(b)|. In another embodiment, this graph may be a visualization generated from a data set and the function on the nodes may be given by a color scheme on the nodes.

In one example, the input graph G may be generated from connecting points to their nearest neighbors, where the metric space is a set of 2200 points from 5 Gaussian samples in the Euclidean plane. The graph may be colored by the Gaussian density. The graph is made into a weighted graph by weighting each edge in G by the difference in the Gaussian density function at the edge's endpoints.

The method is applied uses the scoring mechanisms described herein regarding weighted graphs and the modularity scorer applied to the weighted graph G. The resulting maximal partition may be "color coded" (utilizing greyscale) in FIG. 36.

Figure 37:
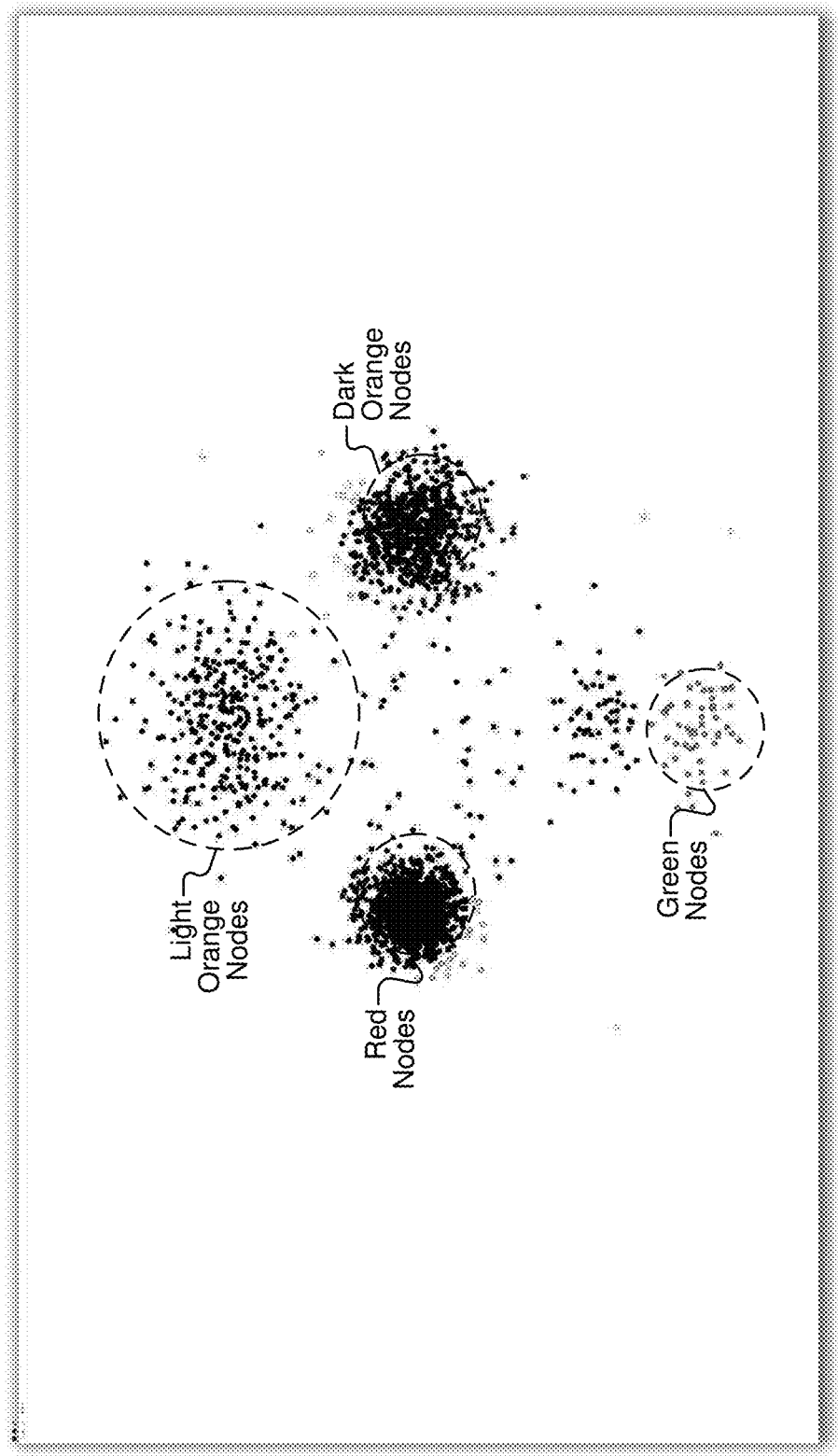
FIG. 37 depict corresponding points and assignments in a scatter plot in a Euclidean plane.

To elucidate the groups, we look at the corresponding points and assignments in a scatter plot of the points in the Euclidean plane in FIG. 37. As the graph G comes from the geometry in this data set, subtle geometric features are preserved in this decomposition. In other words, in this example, autogrouping partitioned the graph into regions of the graph that are strongly connected and have similar function (specifically density) values. This is helpful as the data points within each group (e.g., segment) are now very similar to each other drawing statistical conclusions from each subset is much more likely to be statistically significant.

In one application of this embodiment, the original data may be a data set that is input into the graph construction (e.g., as discussed regarding FIG. 8), which produces a graph (the graph may be in memory or a visualization). The visualization may be colored by the average value of a function of interest on the data points as discussed herein. One such coloring might be the outcome of interest for the data set such as survival of patients, power output in an electric generator, etc. The coloring is used to convert the graph (e.g., in memory or visualization) into a weighted graph that may be then autogrouped using one or more of the autogrouping embodiments described herein. Various autogrouping algorithm partitions the graph into subsets (e.g., segments) that are highly connected and have similar color values.

The groups may be used to create a new color scheme for the graph for use in a visualization. They may also be used for automatic statistical analysis and report generation. Moreover, this process may be used to start with the dataset, generate a graph (but not necessarily generate a visualization) (e.g., generate all or part of the graph in memory), and then report to the user the subsets of the final autogrouped maximal partition together with statistical calculations on those subsets.

As discussed herein, recall that once a filter is computed, data points may be mapped to a reference space and an open cover is generated in that reference space (see discussion regarding FIG. 23). The elements in the open cover may be iterated over, together with clustering, to generate the nodes in the resulting visualization. In one example described herein, the open cover may take intervals in the reference space (or cross-products of intervals in the case of more than one filter). The following embodiment is a data-driven alternative to generating the open cover in the reference space.

The set S in this embodiment are the projections of the original data points into the reference space (e.g., a function such as a Gaussian density function is applied on the received data points to project to the reference space). The segment engine 2214 may operate on a weighted graph built from this projection of the data into the reference space. For example, for a fixed positive integer k, construct a graph G on the set S by connecting each point a in S to every point b in S if b is one of a's k-nearest neighbors and a is one of b's k-nearest neighbors (i.e. they are symmetric k-nearest neighbors of each other). In some testing, k=20 produces good results. The edges of the graph may be weighted by the distance between the edge's endpoints in the embedded reference space distance. This autogrouping embodiment may utilize a hierarchical single-linkage clusterer that uses distance between points in the reference space. The scorer modules (e.g., modules 3206, 3208, and/or 3210 in FIG. 32) may utilize a modularity score built off of the weighted neighborhood graph G.

The result of this embodiment may be a partition P of the projection of the data points in the reference space. Now for a fixed positive integer j, we can expand each subset a of P by adding all the j-nearest neighbors in the reference space of the elements in the subset a. The new, expanded subsets may no longer be a partition as some points may now exist in multiple subsets but this new collection of subsets forms the open cover of the reference space (see discussion regarding FIG. 8) in the graph construction.

In various embodiments, autogrouping may be used for clustering. For example, in the embodiments described with regard to FIG. 8, after a cover is generated either in the reference space or in the original space, data is clustered on each of the subsets in the open cover to identify nodes (e.g., see steps 808-812). Autogrouping clustering may be an adaptive alternative to single linkage clustering with a fixed distance cut-off.

For example, the set S is a set data together with a metric which defines a distance between any two points in the set S. In the discussion regarding FIG. 8, these points may have come from the open cover in the reference space. In the current example, the partition generation module 3204 (see FIG. 32) and one or more of the score modules (e.g., the Q_Subset score module 3206, the Q_Max score module 3208, and/or the Q_Partition score module 3210) operate on a weighted neighborhood graph built from the data. For a fixed positive integer k, a graph G may be constructed on the set S by connecting each point "a" in S to every point "b" in S if "b" is one of "a's" k-nearest neighbors and "a" is one of "b's" k-nearest neighbors under the given metric (i.e. they are symmetric k-nearest neighbors of each other). In some instances, k=20 produces good results. The edges of this graph may be weighted by the distance between the edge's endpoints. The partition generation module 3204 for this autogrouping example is a hierarchical single-linkage clusterer that uses the distance between points determined by the given metric. The one or more of the score modules (e.g., the Q_Subset score module 3206, the Q_Max score module 3208, and/or the Q_Partition score module 3210) uses the modularity score built off of the weighted neighborhood graph G. The resulting clustering would likely have clusters formed at a variety of distance cut-offs instead of a single fixed distance cut-off for the set S.

In another example, the elements of the set S might have additional information such as an associated classification, that is, for example, a function cls: S->{1,2, . . . , k} (i.e. there is a set and everything has some finite label.) The one or more of the score modules (e.g., the Q_Subset score module 3206, the Q_Max score module 3208, and/or the Q_Partition score module 3210) may score entropy (e.g., one or more of the score modules may be an entropy scorer).

One example of an entropy scorer $Q(a)=\text{sum } \{\text{classes i}\} (p_i(a)*\log(p_i(a)))$ where $p_i(a)=\{|x \text{ in } a:\text{cls}(x)==i\}|/|a|$, provided $|a|!=0$. The extension of the entropy scorer Q to a partition scorer, QP is given by the extension property (3) where $A(p,q)=|P|/|q|$. In other words, for a partition P, $QP(P)=\text{sum}\_\{p \text{ in } P\} (Q(p)*|p|/|U(P)|)$. The combination of the partition generation module 3204 and one or more of the score modules (e.g., the Q_Subset score module 3206, the Q_Max score module 3208, and/or the Q_Partition score module 3210) may produce the maximal partition (i.e. clustering) of the elements of the set S that emphasizes clusters that are very close in distance and have the lowest entropy in class type in the subsets of the partition. In other words, this example embodiment may locate clusters that have the largest proportion of each single class type possible under the constraint of the distance metric.

In some embodiments, autogrouping may be used for open cover generation without a reference space. For example, in the embodiments described with regard to FIG. 8, a filter may be generated, points may be mapped to the reference space, and an open cover may be generated in that reference space (e.g., see steps 802-808). The elements in the open cover may be iterated over, together with clustering, to identify nodes. In some embodiments, the open cover may be constructed in the reference space. Various embodiments include a data-driven alternative to generating the open cover of the original data without the need to have a filter or a reference space.

In one example, the set S is the original data together with a metric which defines a distance between any two points in the set S. Both the partition generation module 3204 and the one or more of the score modules (e.g., the Q_Subset score module 3206, the Q_Max score module 3208, and/or the Q_Partition score module 3210) may operate on a weighted neighborhood graph built from the data. Specifically, for a fixed positive integer k, a graph G on the set S is constructed by connecting each point "a" in S to every point "b" in S if "b" is one of "a's" k-nearest neighbors and "a" is one of "b's" k-nearest neighbors under the given metric (i.e. they are symmetric k-nearest neighbors of each other). In some instances, k=20 produces good results. The edges of this graph may be weighted by the distance between the edge's endpoints. The partition generation module 3204 for this embodiment is a hierarchical single-linkage clusterer that uses the distance between points determined by the given metric. One or more of the score modules (e.g., the Q_Subset score module 3206, the Q_Max score module 3208, and/or the Q_Partition score module 3210) may use the modularity score built off of the weighted neighborhood graph G.

The result in this example is a partition P of the data points in the original space. For a fixed positive integer "j", we can expand each subset "a" of P by adding all the j-nearest neighbors of the elements in the subset "a". The new, expanded subsets may no longer be a partition as some points may now exist in multiple subsets but this new collection of subsets may form the open cover of the space for step 808 as described in FIG. 8. The partition P of the data points may include any number of segments.

The above-described functions and components can be comprised of instructions that are stored on a storage medium (e.g., a computer readable storage medium). The instructions can be retrieved and executed by a processor. Some examples of instructions are software, program code, and firmware. Some examples of storage medium are memory devices, tape, disks, integrated circuits, and servers. The instructions are operational when executed by the processor (e.g., a data processing device) to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

The invention claimed is:

1. A method comprising:
receiving a selection of data from a fact table and one or more dimension tables related to the fact table, the data including a plurality of values from a plurality of dimensions from the fact table and the one or more dimension tables, the fact table and the one or more dimension tables being stored in a data warehouse;
receiving a lens function identifier, a metric function identifier, and a resolution function identifier;
mapping data points from the selection of the data from the fact table and the one or more dimension tables to a reference space by applying a lens function to each of the data points from the selection of the data and mapping each result to the reference space, the lens function being identified by the lens function identifier;
generating a cover of the reference space, the cover including a plurality of overlapping sets in the reference space, the cover being generated using a resolution function identified by the resolution identifier;
clustering the data points mapped to the reference space based on each data point's position in at least one set in the cover and a metric function identified by the metric function identifier to determine each node of a plurality of nodes of a graph, each node including at least one data point of the data points;
determining a plurality of segments of the graph, each segment including at least one node of the plurality of nodes;
generating a segment data structure identifying each segment as well as membership of each segment, the membership of each segment including at least one node from the plurality of nodes in the graph;
receiving a selection of dimensions to enable identification of significant dimensions relevant to one or more of the plurality of segments;
for each segment, scoring significance for each dimension of the selection of the dimensions to a particular segment;
comparing the scored significance to a significance threshold;
identifying dimensions with particular significance based on the comparison;
generating a feature data structure including the identified dimensions with particular significance; and
providing the feature data structure to the data warehouse to be linked to at least one of the plurality of one or more dimension tables to enable further analysis of the fact table and the one or more dimension tables with the feature data structure.

2. The method of claim 1, wherein the fact table and the one or more dimension tables are in a star schema.

3. The method of claim 1, wherein the fact table and the one or more dimension tables are in a snowflake schema.

4. The method of claim 1, wherein each node of the plurality of nodes belongs to only one segment of the plurality of segments, each of the plurality of segments containing one or more nodes that are not shared with other segments of the plurality of segments.

5. The method of claim 1, wherein the segment table is provided to the data warehouse to be linked to at least one of the plurality of one or more dimension tables to enable further analysis of the fact table and the one or more dimension tables with the segment data structure.

6. The method of claim 1, wherein scoring significance for each of the dimensions of the selection of the dimensions and comparing the scored significance to the significance threshold comprises generating a p-value for each of the dimensions of the selection of the dimensions and comparing each p-value to a p-value threshold to determine significance.

7. The method of claim 1, wherein scoring significance for each of the dimensions of the selection of the dimensions and comparing the scored significance to the significance threshold comprises generating a Kolmogorov-Smirnov value for each of the dimensions of the selection of the dimensions and comparing each Kolmogorov-Smirnov to a Kolmogorov-Smirnov value threshold to determine significance.

8. The method of claim 1, further comprising:
receiving a selection of values from one or more dimensions to enable identification of significant values relevant to one or more of the plurality of segments;
for each segment, scoring significance for each value from one or more dimensions of the selection of the values to a particular segment;
comparing the scored significance to a significance threshold;
identifying values with particular significance based on the comparison; and
generating a feature data structure including the identified values with particular significance.

9. The method of claim 8, wherein the selection of values from the one or more dimensions include different particular outcomes.

10. A non-transitory computer readable medium comprising instructions executable by a processor to perform a method, the method comprising:
receiving a selection of data from a fact table and one or more dimension tables related to the fact table, the data including a plurality of values from a plurality of dimensions from the fact table and the one or more dimension tables, the fact table and the one or more dimension tables being stored in a data warehouse;
receiving a lens function identifier, a metric function identifier, and a resolution function identifier;
mapping data points from the selection of the data from the fact table and the one or more dimension tables to a reference space by applying a lens function to each of the data points from the selection of the data and mapping each result to the reference space, the lens function being identified by the lens function identifier;
generating a cover of the reference space, the cover including a plurality of overlapping sets in the reference space, the cover being generated using a resolution function identified by the resolution identifier;
clustering the data points mapped to the reference space based on each data point's position in at least one set in the cover and a metric function identified by the metric function identifier to determine each node of a plurality of nodes of a graph, each node including at least one data point of the data points;
determining a plurality of segments of the graph, each segment including at least one node of the plurality of nodes;
generating a segment data structure identifying each segment as well as membership of each segment, the membership of each segment including at least one node from the plurality of nodes in the graph;
receiving a selection of dimensions to enable identification of significant dimensions relevant to one or more of the plurality of segments;
for each segment, scoring significance for each dimension of the selection of the dimensions to a particular segment;
comparing the scored significance to a significance threshold;
identifying dimensions with particular significance based on the comparison;
generating a feature data structure including the identified dimensions with particular significance; and
providing the feature data structure to the data warehouse to be linked to at least one of the plurality of one or more dimension tables to enable further analysis of the fact table and the one or more dimension tables with the feature data structure.

11. The non-transitory computer readable medium of claim 10, wherein the fact table and the one or more dimension tables are in a star schema.

12. The non-transitory computer readable medium of claim 10, wherein the fact table and the one or more dimension tables are in a snowflake schema.

13. The non-transitory computer readable medium of claim 10, wherein each node of the plurality of nodes belongs to only one segment of the plurality of segments, each of the plurality of segments containing one or more nodes that are not shared with other segments of the plurality of segments.

14. The non-transitory computer readable medium of claim 10, wherein the segment table is provided to the data warehouse to be linked to at least one of the plurality of one or more dimension tables to enable further analysis of the fact table and the one or more dimension tables with the segment data structure.

15. The non-transitory computer readable medium of claim 10, wherein scoring significance for each of the dimensions of the selection of the dimensions and comparing the scored significance to the significance threshold comprises generating a p-value for each of the dimensions of the selection of the dimensions and comparing each p-value to a p-value threshold to determine significance.

16. The non-transitory computer readable medium of claim 10, wherein scoring significance for each of the dimensions of the selection of the dimensions and comparing the scored significance to the significance threshold comprises generating a Kolmogorov-Smirnov value for each of the dimensions of the selection of the dimensions and comparing each Kolmogorov-Smirnov to a Kolmogorov-Smirnov value threshold to determine significance.

17. The non-transitory computer readable medium of claim 10, the method further comprising:
receiving a selection of values from one or more dimensions to enable identification of significant values relevant to one or more of the plurality of segments;
for each segment, scoring significance for each value from one or more dimensions of the selection of the values to a particular segment;
comparing the scored significance to a significance threshold;
identifying values with particular significance based on the comparison; and
generating a feature data structure including the identified values with particular significance.

18. The non-transitory computer readable medium of claim 17, wherein the selection of values from the one or more dimensions include different particular outcomes.

19. A system comprising:
one or more processors; and
memory containing instructions executable by at least one of the one or more processors to:
- receive a selection of data from a fact table and one or more dimension tables related to the fact table, the data including a plurality of values from a plurality of dimensions from the fact table and the one or more dimension tables, the fact table and the one or more dimension tables being stored in a data warehouse;
- receive a lens function identifier, a metric function identifier, and a resolution function identifier;
- map data points from the selection of the data from the fact table and the one or more dimension tables to a reference space by applying a lens function to each of the data points from the selection of the data and mapping each result to the reference space, the lens function being identified by the lens function identifier;
- generate a cover of the reference space, the cover including a plurality of overlapping sets in the reference space, the cover being generated using a resolution function identified by the resolution identifier;
- cluster the data points mapped to the reference space based on each data point's position in at least one set in the cover and a metric function identified by the metric function identifier to determine each node of a plurality of nodes of a graph, each node including at least one data point of the data points;
- determine a plurality of segments of the graph, each segment including at least one node of the plurality of nodes;
- generate a segment data structure identifying each segment as well as membership of each segment, the membership of each segment including at least one node from the plurality of nodes in the graph;
- receive a selection of dimensions to enable identification of significant dimensions relevant to one or more of the plurality of segments;
- for each segment, score significance for each dimension of the selection of the dimensions to a particular segment;
- compare the scored significance to a significance threshold;
- identify dimensions with particular significance based on the comparison;
- generate a feature data structure including the identified dimensions with particular significance; and
  - provide the feature data structure to the data warehouse to be linked to at least one of the plurality of one or more dimension tables to enable further analysis of the fact table and the one or more dimension tables with the feature data structure.

* * * * *